(12) United States Patent
Hu et al.

(10) Patent No.: US 11,674,098 B2
(45) Date of Patent: Jun. 13, 2023

(54) METHANE AND METHANE-CARBON DIOXIDE ACTIVATED SYNERGYSTIC BIOMASS GASIFICATION FOR HYDROGEN RICH SYNGAS PRODUCTION

(71) Applicant: West Virginia University, Morgantown, WV (US)

(72) Inventors: Jianli Hu, Morgantown, WV (US); Amoolya D. Lalsare, Morgantown, WV (US); Ali C. Sivri, Morgantown, WV (US); Cosmin E. Dumitrescu, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 92 days.

(21) Appl. No.: 17/114,427

(22) Filed: Dec. 7, 2020

(65) Prior Publication Data

US 2021/0171846 A1 Jun. 10, 2021

Related U.S. Application Data

(60) Provisional application No. 62/944,120, filed on Dec. 5, 2019.

(51) Int. Cl.
| | | |
|---|---|---|
| *C10J 3/02* | (2006.01) | |
| *B01J 21/18* | (2006.01) | |
| *C10J 3/82* | (2006.01) | |
| *B01J 23/881* | (2006.01) | |

(52) U.S. Cl.
CPC .............. *C10J 3/02* (2013.01); *B01J 21/18* (2013.01); *B01J 23/881* (2013.01); *C10J 3/82* (2013.01); *C10J 2300/092* (2013.01); *C10J 2300/0946* (2013.01)

(58) Field of Classification Search
CPC ........ C10J 3/02; C10J 3/82; C10J 2300/0946; C10J 2300/092; B01J 21/18; B01J 23/881
See application file for complete search history.

(56) References Cited

U.S. PATENT DOCUMENTS

| | | | | |
|---|---|---|---|---|
| 2008/0161428 A1* | 7/2008 | Strait | ...................... | C07C 41/01 |
| | | | | 422/600 |
| 2010/0317748 A1* | 12/2010 | Hassan | .................. | C10G 2/344 |
| | | | | 518/700 |
| 2013/0144087 A1* | 6/2013 | Arora | ...................... | C10K 3/04 |
| | | | | 252/373 |

* cited by examiner

*Primary Examiner* — Cephia D Toomer
(74) *Attorney, Agent, or Firm* — Innovators Legal

(57) ABSTRACT

In one aspect, the disclosure relates to methods for biomass gasification to produce sustainable and renewable alternatives to fossil fuels including, but not limited to, syngas having a high $H_2$ content. The method can produce an $H_2/CO$ ratio close to 2:1, which is desirable for further chemical or transportation fuel synthesis. In another aspect, the methods disclosed herein have high yields and make use of agricultural and industrial waste (e.g., hardwood pellets and grain stovers) as starting materials. In a further aspect, the methods disclosed herein can produce useful byproducts including, but not limited to, carbon nanofibers (CNF). This abstract is intended as a scanning tool for purposes of searching in the particular art and is not intended to be limiting of the present disclosure.

20 Claims, 29 Drawing Sheets

Fixed Bed Reactor Setup

Bubbling Fluidized Bed Reactor Setup

METHANE AND METHANE-CARBON DIOXIDE ACTIVATED SYNERGYSTIC BIOMASS GASIFICATION FOR HYDROGEN RICH SYNGAS PRODUCTION

CROSS-REFERENCE TO RELATED APPLICATIONS

This application claims the benefit of U.S. Provisional Application No. 62/944,120, filed on Dec. 5, 2019, which is incorporated herein by reference in its entirety.

STATEMENT REGARDING FEDERALLY SPONSORED RESEARCH OR DEVELOPMENT

This invention was made with U.S. Government support under grant number NETL/Leidos Task #16, awarded by The National Energy Technology Laboratory of the United States Department of Energy. The U.S. government has certain rights in the invention.

BACKGROUND

Over the past decade, natural gas production in the United States has evolved to become one of the primary sources of fuel for power generation. Shale gas production in the United States surged sharply between 2005 and 2015, contributing 3% of natural gas production in 2005 and rising to 35% by 2012. Methane ($CH_4$) constitutes a major component of shale gas, with Marcellus shale gas, which is abundant in the Appalachian region, made up of more than 80-percent $CH_4$. Separately, there has been an increased demand for $CO_x$-free hydrogen ($H_2$) for the cost-effective production of fuels and value added chemicals. $H_2$ is considered as a reliable fuel source for automobiles, including both personal vehicles and public transportation. A traditional source of $H_2$ production has been through steam methane reforming (SMR) which is highly energy intensive and produces large amounts of carbon monoxide (CO) and carbon dioxide ($CO_2$). At the same time, there is a growing global consensus to move towards renewable energy sources such as biomass, solar, wind, geothermal, and hydropower. However, many renewable alternatives such as solar and wind energy may unreliable and/or subject to weather conditions. Most of the process technologies for power generation, chemical production, or refinery clusters currently in place are not resilient enough to adapt to such fluctuations. In the coming decades, there will be a real need for a viable, reliable, and sustainable energy source that can replace fossil fuels to a considerable extent while also drastically reducing carbon emissions The thermochemical conversion of solid renewable feedstock such as biomass from lignocellulosic hardwood and agricultural waste (e.g. stovers) to high heating value synthesis gas (syngas) is an efficient and clean way to harness renewable energy, which could dramatically reduce the dependency on traditional fossil fuels like coal and crude oil. Biomass fast pyrolysis and gasification have potential to produce both hydrocarbon fuels and value added chemicals. Pyrolysis has been extensively researched and applied for the production of biofuels for direct use in transportation and other related applications. However, the decomposition of the highly aromatic lignin structure in lignocellulosic biomass leads to the formation of bio-oil at temperatures below 700° C. Bio-oil is high in oxygen content and has limited direct application as a fuel due to its high acidity, poor resistance to extreme weather conditions, and instability. These limitations are the result of the highly-oxygenated aromatic structure of biomass.

The thermochemical conversion of biomass to energy and fuels has been studied extensively for the past few decades. Biomass decomposes rapidly between 300° C. and 550° C. to produce devolatilization components including CO, $CO_2$, $CH_4$, bio-oil, aerosols, and bio-char. Numerous attempts have been made to upgrade the yields from biomass to produce value added chemicals such as benzene, toluene, ethylbenzene, and xylene (BTEX), and $H_2$-rich syngas. In situ tar cracking, hydrodeoxygenation (HDO), and rearrangement to form ketonic intermediates leading to alkanes are the typical reaction steps necessary to convert biomass to value-added chemicals.

Despite advances in biomass gasification and conversion research, there is still a scarcity of methods that result in efficient syngas production while avoiding production of undesired $CO_x$ species, tar, char, bio-oil, and other waste materials. These needs and other needs are satisfied by the present disclosure.

SUMMARY

In accordance with the purpose(s) of the present disclosure, as embodied and broadly described herein, the disclosure, in one aspect, relates to methods for biomass gasification to produce sustainable and renewable alternatives to fossil fuels including, but not limited to syngas having a high $H_2$ content. The method can produce an $H_2$/CO ratio close to 2:1, which is desirable for further chemical or transportation fuel synthesis. In another aspect, the methods disclosed herein have high yields and make use of agricultural and industrial waste (e.g., hardwood pellets and grain stovers) as starting materials. In a further aspect, the methods disclosed herein can produce useful byproducts including, but not limited to, carbon nanofibers (CNF).

In various aspects, disclosed herein are methods for producing syngas, the method comprising: (a) placing a first reactant and a second reactant in a reactor; (b) reacting the first reactant and the second reactant at a first temperature for a first period of time to produce a product gas mixture; and (c) collecting the product gas mixture; wherein the first reactant comprises a source of biomass; wherein the second reactant comprises a coal, a plastic, or combinations; and wherein the product gas mixture comprises syngas.

In a further aspect, disclosed herein are methods for producing syngas, the method comprising: (a) placing or continuously feeding a source of biomass in a reactor; (b) providing a flow of feed gas through the reactor; (c) reacting the source of biomass and the feed gas at a first temperature for a first period of time to produce a product gas mixture; and (d) collecting the product gas mixture; wherein the product gas mixture comprises syngas.

In a further aspect, disclosed herein are syngas compositions prepared by a disclosed method.

In a further aspect, disclosed herein are catalyst compositions comprising at least one metal atom, metal oxide, or metal ion.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 17A shows catalyst supported on carbon nanofibers and FIG. 17B shows catalyst supported on ZSM-5 using a disclosed process.

FIG. 19A shows an image obtained at 15 kV with a working distance of 12.4 mm and scale 10 µm. FIG. 19B shows an image obtained at 15 kV with a working distance of 12.4 mm and scale 2 µm.

FIG. 21A shows a fixed bed reactor setup and FIG. 21B shows a bubbling fluidized bed reactor setup. In FIG. 21A, "MFC" indicates a "mass flow controller".

FIG. 22A shows a schematic of synergistic steam methane reforming using lignocellulosic biomass components and FIG. 22B shows a schematic of synergistic bi-reforming using lignocellulosic biomass components. In the figure, the reference numbers and letters are as follows: 1:

Syngas storage tank; 2: Compressor air pressure vessel; 3: Condenser/impinger for tar collection; 4: Fluidized bed gasifier reactor; 5: Lucifer Furnace; 6: Outlet gas line; 7: Sampling line; 8: Outlet line 2; 9: Tap for liquid tar collection; 10: Air inlet line; 11: Syngas bypass line; T: Thermocouple; and P: Pressure transducer.

Figure 23A:
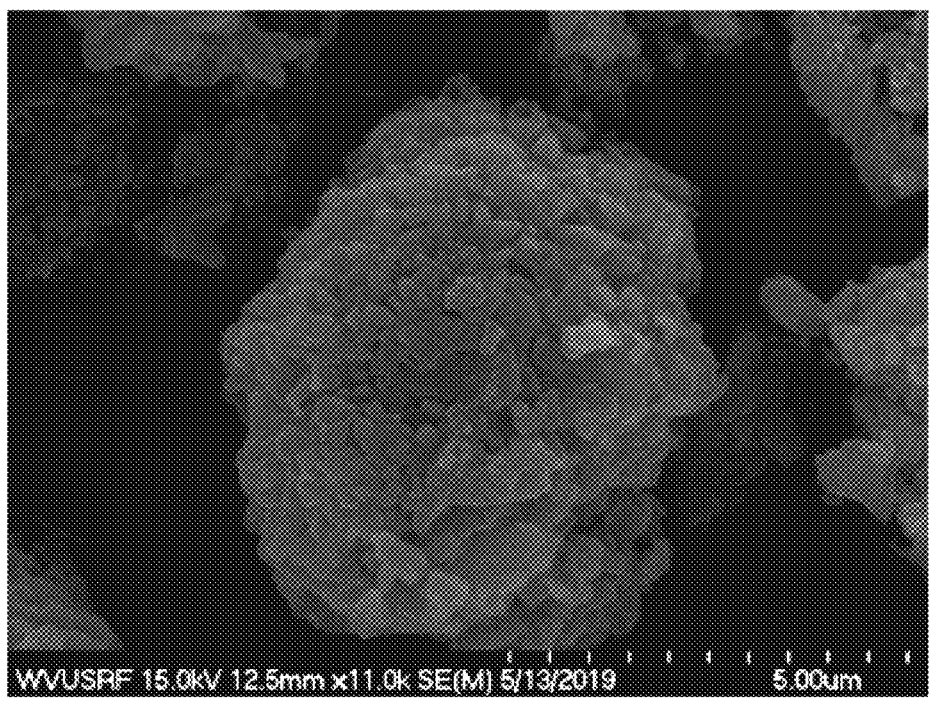
Figure 23B:
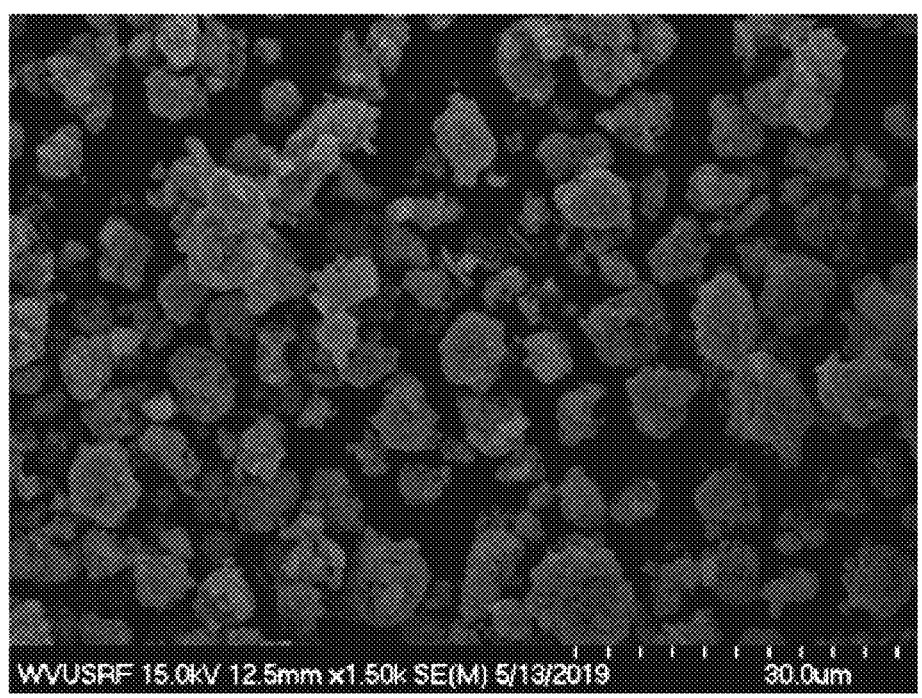

FIGS. 23A-23B show representative SEM images of coke deposition visible on ZSM-5 clusters of agglomerated crystals. FIG. 23A shows an SEM image obtained at 5 μm with 15 kV at a working distance of 12.5 mm. FIG. 23B shows an SEM image obtained at 30 μm with 15 kV at a working distance of 12.5 mm.

Figure 24A:
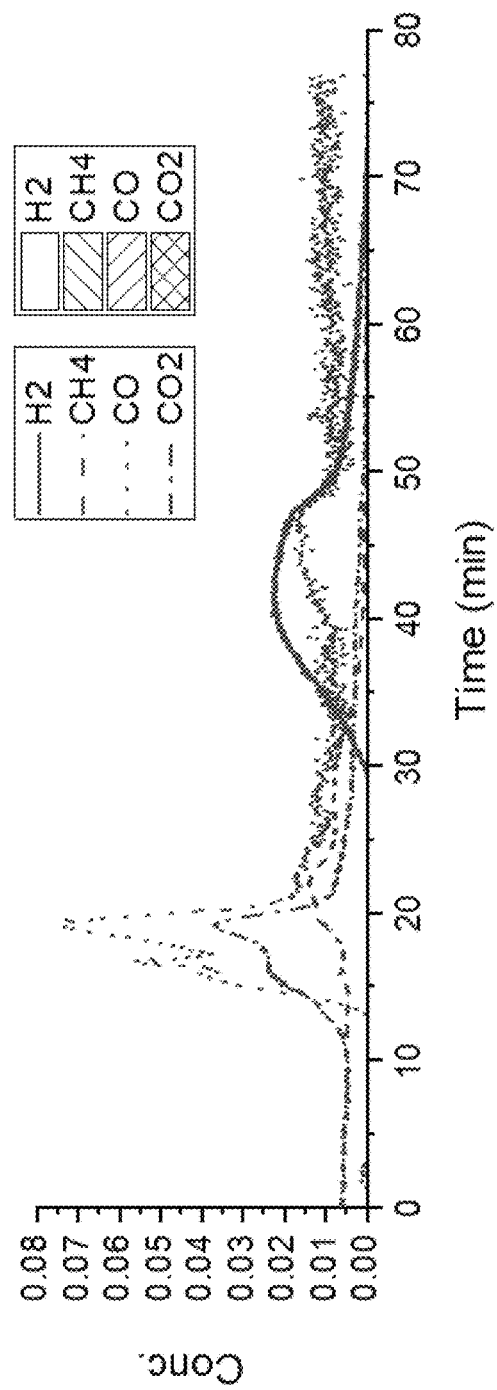
Figure 24B:
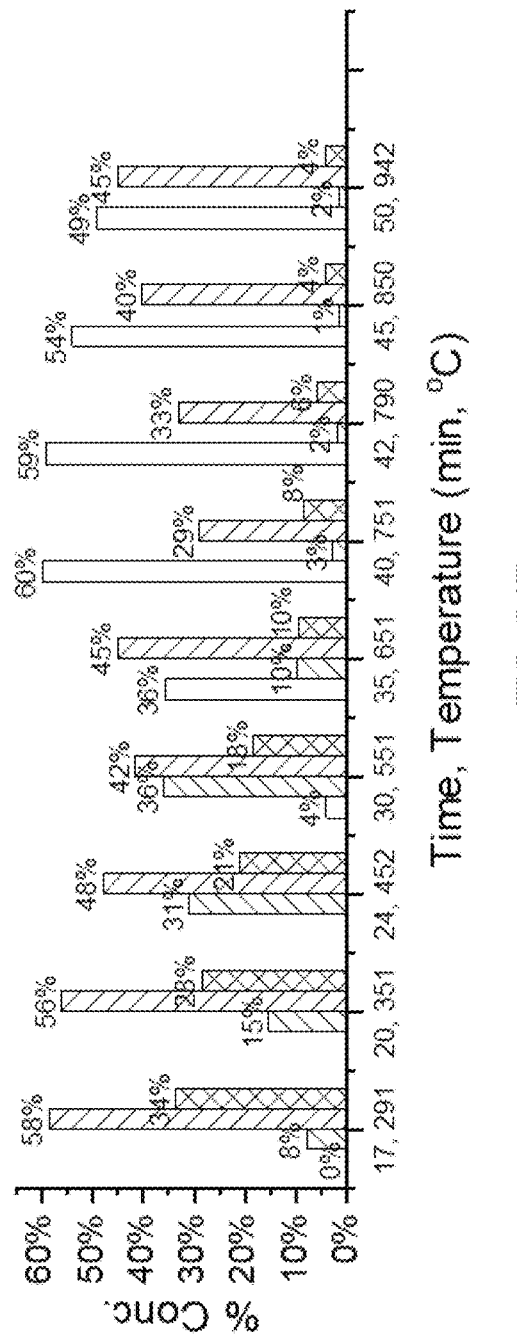

FIGS. 24A-24B show representative biomass gasification of a hardwood pellet on ZSM-5 over time, with a heating rate of 20° C./min until 950° C. is reached, then 30 minutes at 950° C. using a disclosed process. Helium flow was 100 sccm. FIG. 24A shows concentration of gases over time (top panel) and relative percentages of hydrogen, methane, carbon monoxide, and carbon dioxide at various time points (bottom panel). FIG. 24B shows concentration of gases at discrete time and temperature (in ° C.) points as indicated.

Figure 25B:
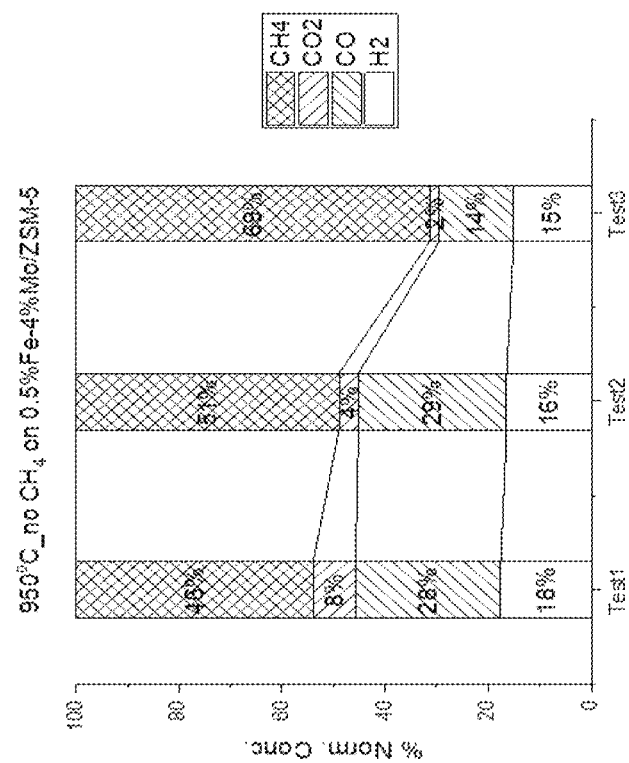
Figure 25A:
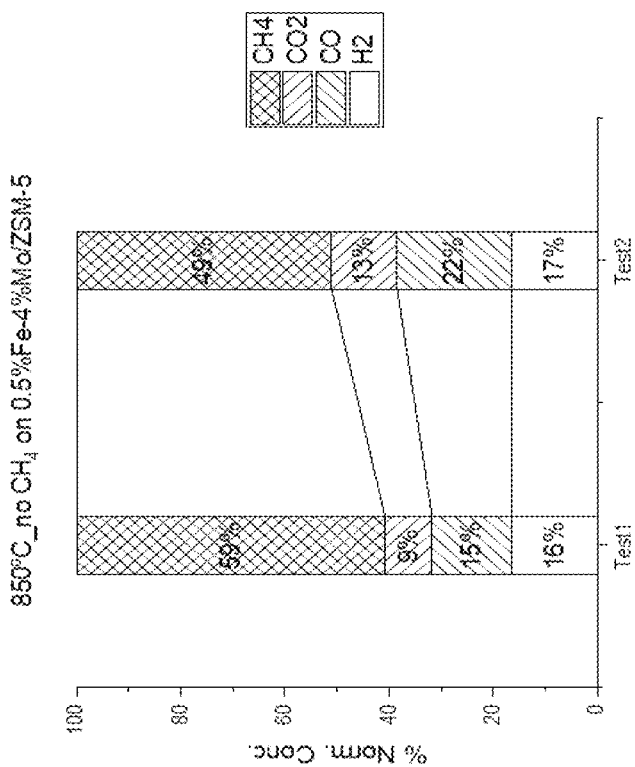

FIGS. 25A-25B shows representative biomass gasification in a fixed bed reactor in the absence of $CH_4$ on FeMo/ZSM-5 using a disclosed process. FIG. 25A shows the normalized concentration of product gases at 850° C. FIG. 25B shows the normalized concentration of product gases at 950° C.

Figure 26:
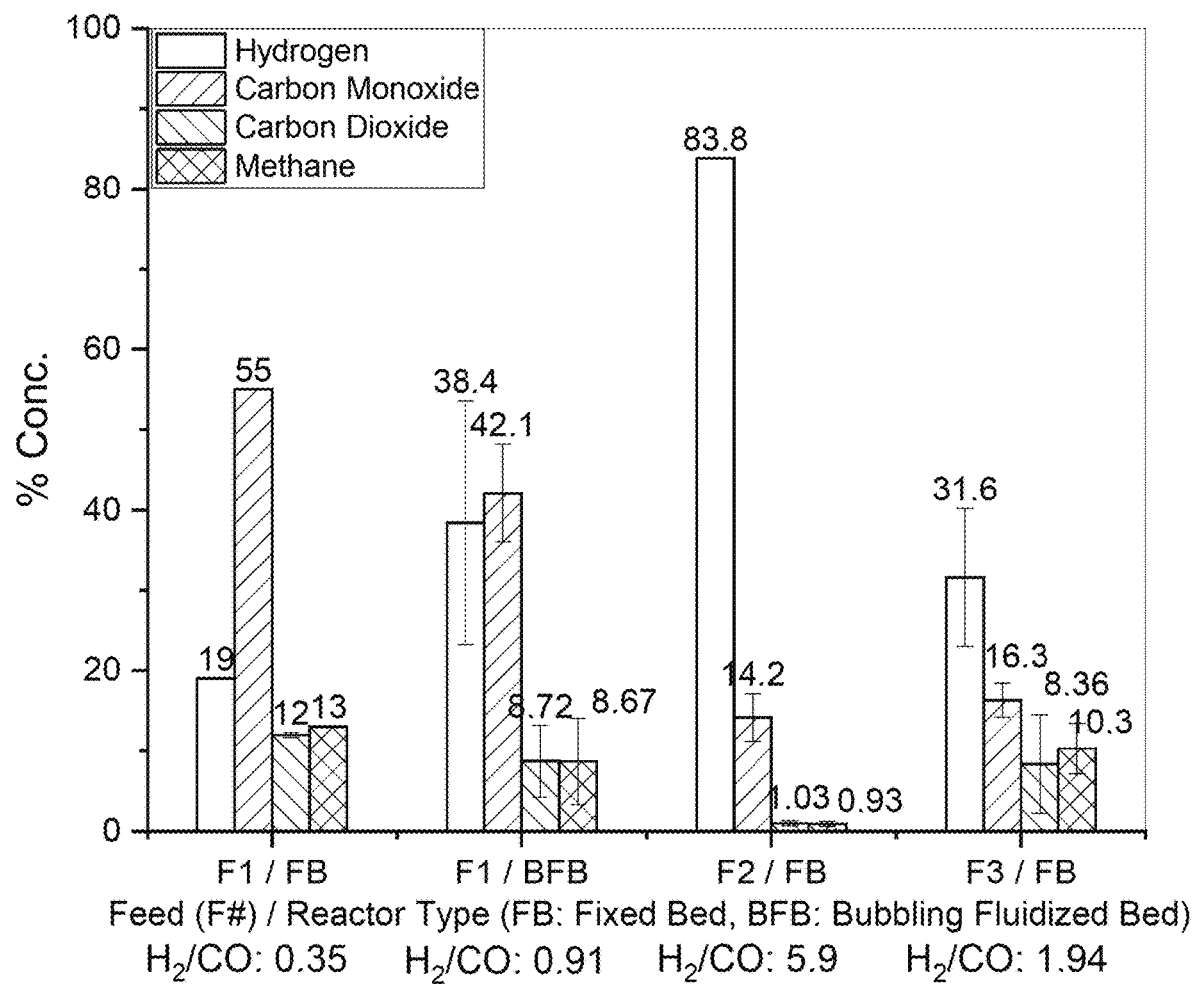

FIG. 26 shows representative product gas yields in different reactor configurations for biomass alone or biomass with added methane and/or carbon dioxide in the gas feed using a disclosed process. F1 represents biomass alone; a comparison between a fixed bed reactor and a bubbling fluidized reactor are shown (first and second sets of bars). F2 represents biomass+5% $CH_4$ in the feed gas mixture. F3 represents 5% $CH_4$ and 1% $CO_2$ in the feed gas mixture.

Figure 27:
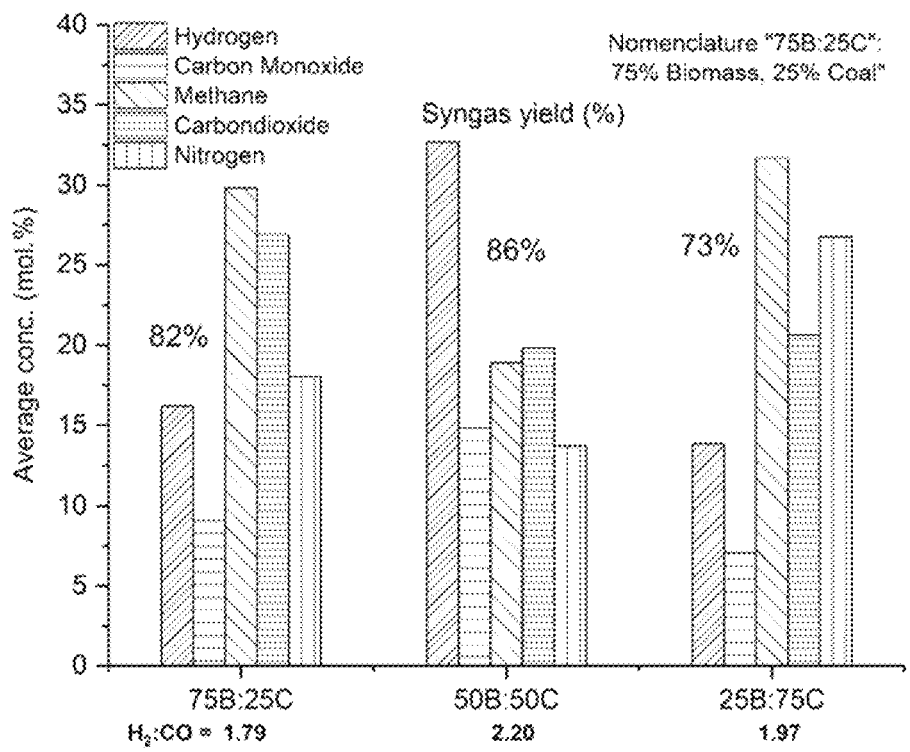

FIG. 27 shows representative gasification of southern pine biomass and Illinois #6 coal mixtures: 75% biomass with 25% coal mixture (75B:25C), 50% biomass with 50% coal mixture (50B:50C), 25% biomass with 75% coal mixture (25B:75C) using a disclosed process.

Figure 28:
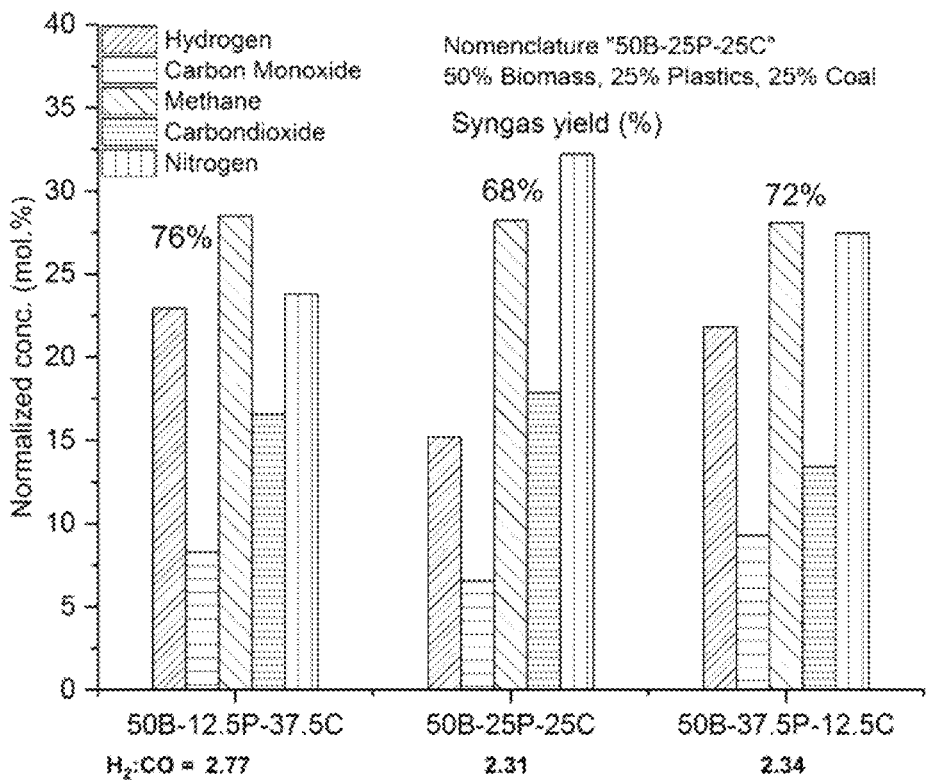

FIG. 28 shows representative gasification of southern pine biomass, Illinois #6 coal, and waste plastics mixtures: 50% biomass common in all three mixtures using a disclosed process. Coal:Plastics ratio of 75/251, 50/50, 25/75. Overall composition: 50B-37.5C-12.5P, 50B-25C-25P, 50B-12.5C-37.5P.

Figure 29:
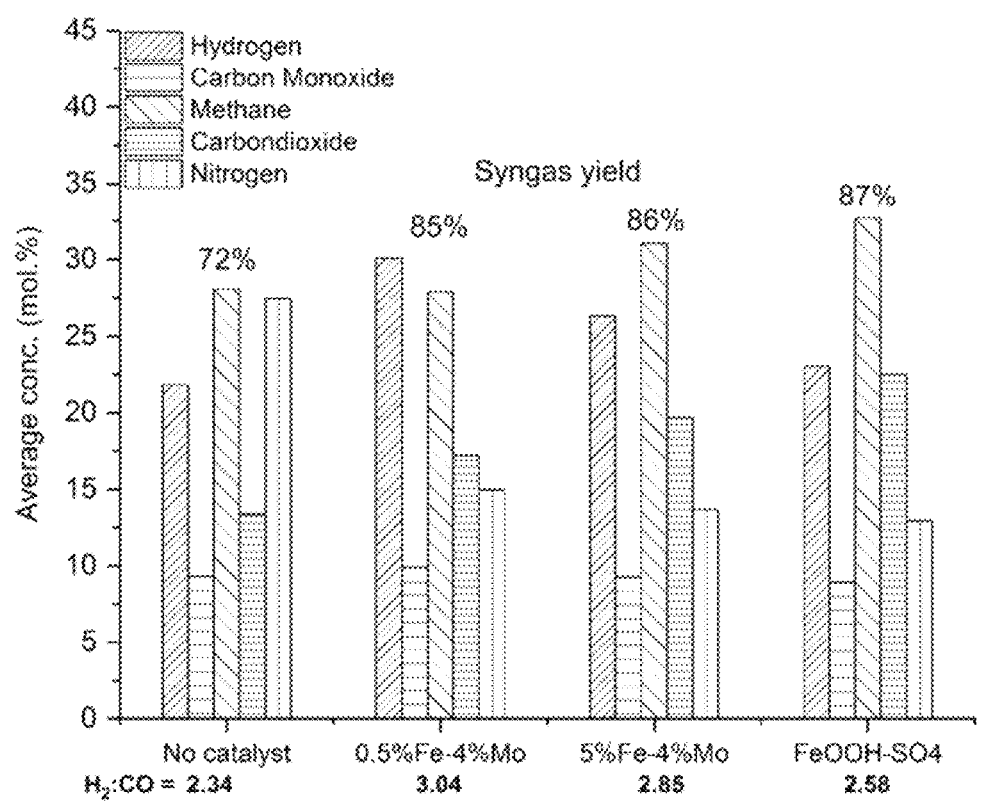

FIG. 29 shows representative catalyic gasification of southern pine biomass, Illinois #6 coal, and waste plastics mixture (50B-12.5C-37.5P) over 0.5% Fe-4% $Mo_2C$-GNS, 5% Fe-4% $Mo_2C$—CNF, and FeOOH—$SO_4$ catalysts using a disclosed process.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

DEFINITIONS

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a catalyst" or "a product gas" include, but are not limited to, mixtures of two or more such catalysts or product gases, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a catalyst refers to an amount that is sufficient to achieve the desired improvement in the property modulated by the formulation component, e.g. achieving the desired reaction turnover rate. The specific level in terms of wt % in a composition required as an effective amount will depend upon a variety of factors including the amounts and identities of metals in the catalyst, amount and type of catalyst support, reaction temperature, amount of time the reaction will be run, and desired product gas mixture.

As used herein, the terms "optional" or "optionally" means that the subsequently described event or circumstance can or cannot occur, and that the description includes instances where said event or circumstance occurs and instances where it does not.

"Biomass" as used herein refers to organic matter used for energy production or in a related industrial process. Biomass is a renewable resource and can be obtained from agricultural and/or forestry waste, animal waste, wood, municipal waste, and the like, or can be obtained from plants specifically grown for energy production purposes. In some aspects, energy generated from biomass can be considered carbon neutral if it does not result in destruction of forests for non-forestry uses. In one aspect, the biomass useful herein is lignocellulosic biomass such as, for example, hardwood pellets. In a further aspect, hardwood pellets can be made from waste materials such as, for example, sawdust, wastes from lumber milling, and waste material from the manufacture of wood products, furniture, and/or construction materials.

"Lignin" is a heterogeneous, cross-linked phenolic polymer found in vascular plants and algae. Lignin is deposited in cell walls and lends rigidity and resistance to decomposition, especially in woody plants. In some aspects, lignin represents a useful source of biomass for the processes and methods disclosed herein. A typical lignin subunit has the structure shown below, although lignin polymers overall lack a defined primary structure:

Lignin subunit

"Syngas," also sometimes referred to as "synthesis gas," as used herein is a mixture of hydrogen, carbon monoxide, and carbon dioxide. In one aspect, syngas components can be used as intermediates in creating synthetic natural gas (i.e., methane) and other desirable industrial products. In a further aspect, disclosed herein is a process for producing syngas. In a still further aspect, disclosed herein are process for producing syngas that also produce methane.

As used herein, "gasification" refers to a process that converts organic, carbon-based materials into gases such as, for example, carbon monoxide, hydrogen, and carbon dioxide. Depending on experimental parameters, the gasification processes disclosed herein also produce methane.

"Tar" as used herein is primarily composed of organic products of gasification that condense under thermal, steam, oxidative, and/or catalytic operating conditions. Tar is a diverse substance with a significant aromatic component and its composition can vary based on reaction temperature as well as components already mentioned. In one aspect, low or no tar formation is desired in the processes disclosed herein.

"Char" as used herein is a low-value byproduct of biomass gasification. Char can be used as an energy resource, can be added to soil as a fertilizer, can be recycled back to the gasification reactor as a source of heat and/or additional carbon. In one aspect, the methods and processes disclosed herein produce low amounts of char.

A "catalyst" is any substance that can increase the rate of a chemical reaction without being consumed. Catalysts are reusable and/or recyclable. In some aspects, the methods and processes disclosed herein use catalysts. In one aspect, the catalysts include metal atoms, oxides, or ions. In a further aspect, the metal atoms or ions can be selected from nickel, iron, molybdenum, rhodium, cerium, alkali metals, magnesium, manganese, platinum, palladium, ruthenium, and combinations thereof, including combinations where one metal is doped with another metal, as well as minerals including dolomite, olivine, and the like.

Catalysts may be "supported." Catalyst "support" as used herein can be a metal oxide or combination of metal oxides or a carbon product. In one aspect, the metal oxide can be $La_2O_3$, $SiO_2$, $TiO_2$, $\alpha$-$Al_2O_3$, $\gamma$-$Al_2O_3$, MgO, $CeO_2$, or a combination thereof. In one aspect, a catalyst support is a porous material with a high surface area.

In a further aspect, the catalyst or catalyst support can be a zeolite. "Zeolites" are microporous aluminosilicates that can accommodate a variety of cations, including, but not limited to, sodium, potassium, calcium, and magnesium. Zeolites can be produced synthetically or can be mined, have a well-defined pore structure, and can be tuned to different levels of acidity through cation exchange.

Mass flow rate is indicated herein as "sccm," which is an abbreviation for "standard cubic centimeter per minute".

Volume fraction is indicated by the abbreviation, "vol %", which represents the percent volume of the indicated component as a percentage of as the volume of all constituents in the mixture.

In one aspect, the catalyst support used herein can be a carbon product. In a further aspect, the carbon product can include, but is not limited to, nanoparticles, fullerenes, carbon filaments, single- and multi-walled carbon nanotubes (CNTs), carbon nanofibers (CNFs), graphene-based materials, e.g., graphene nanosheets (GNS), and combinations thereof. "Carbon nanotubes" are tubes made from carbon atoms with diameters in the nanometer range (i.e., from about 1 nm to over 100 nm). As used herein, "carbon nanotubes," unless otherwise specified, refers collectively to a variety of carbon nanotubes, including helical carbon nanotubes, multi-wall carbon nanotubes, double-wall carbon nanotubes, and single-wall carbon nanotubes. It is to be understood that a material or composition referred to as carbon nanotubes can contain, unless otherwise specified, varying proportions of these sub-types of carbon nanotubes. In some aspects, the carbon nanotubes referred to are essentially all one particular sub-type, e.g., multi-wall carbon nanotubes. Meanwhile, "carbon nanofibers" can consist of several different forms or layers of carbon and may not be hollow, whereas CNTs may typically be hollow. In any of the above aspects, CNTs and CNFs can be used as catalyst supports for the processes disclosed herein.

In one aspect, the reactions disclosed herein can be performed in a "fixed bed reactor." In another aspect, a fixed bed reactor can include a tube filled with catalyst pellets or supported catalyst pellets. Further in this aspect, reactants flow through the bed, contact the catalyst particles, and are converted into products. In one aspect, a fixed bed reactor can have one bed or multiple beds. In another aspect, the bed or beds can be vertical or horizontal. In still another aspect, catalyst pellets used in a fixed bed reactor can be any shape.

In another aspect, the reactions disclosed herein can be performed in a "fluidized bed reactor" or a "bubbling fluidized bed reactor." As used herein, a fluidized bed reactor contains small particles of catalyst or supported catalyst in a fluid such as, for example, a gas. In another aspect, the fluid (i.e., gas) to be reacted moves upwards, contacting the catalyst particles, enabling the desired reaction(s) to occur. In a further aspect, a fluidized bed reactor may be advantageous because it can easily achieve and maintain a uniform temperature throughout the whole reactor.

"Steam methane reforming" as used herein is a process for the production of hydrogen from natural gas. In steam methane reforming, methane is heated with steam, typically in the presence of a catalyst, to produce a mixture of $CO_x$ species and hydrogen. CO and $CO_2$ produced may be reacted further in separate processes.

"Bi-reforming" as used herein is a process that produces syngas from methane and carbon dioxide. Bi-reforming is typically accomplished with steam at elevated pressures and/or temperatures. In one aspect, catalyst deactivation by carbon deposition is lower in bi-reforming than with other methods for producing syngas. In one aspect, the processes and methods disclosed herein accomplish $CH_4/CO_2$ activated biomass gasification through bi-reforming.

Unless otherwise specified, temperatures referred to herein are based on atmospheric pressure (i.e. one atmosphere).

I. Method for Biomass Gasification to Produce Syngas

In one aspect, disclosed herein is a method for biomass gasification to produce syngas. In a further aspect, the method comprises at least the following steps:
a) Placing a source of biomass in a reactor;
b) Providing a flow of feed gas through the reactor;

c) Reacting the source of biomass and the feed gas at a first temperature for a first period of time to produce a product gas mixture; and d) Collecting the product gas mixture.

In another aspect, prior to reacting the source of biomass with the feed gas, the source of biomass can be contacted with a catalyst. In a further aspect, the catalyst may be supported on or by a catalyst support. In any of these aspects, the reaction can be repeated for multiple cycles using the same catalyst and support, if catalyst and support are used. If the reaction is repeated, in one aspect, a fresh source of biomass is added to the reactor prior to repeating the reaction. Various modifications and variations of the source of biomass, feed gas, temperature, time period, product gas mixture, catalyst, support, and the like are disclosed in the detailed description and examples that follow.

II. Catalyst and Support

Zeolite Catalyst Support

In one aspect, the method disclosed herein makes use of a zeolite. In another aspect, the zeolite can be a natural zeolite or can be an industrially-produced zeolite. In still another aspect, the zeolite can provide support for a catalyst useful for biomass gasification. In an alternative aspect, the zeolite has a catalytic role on its own, without the need for an additional, external catalyst. In any of these aspects, the zeolite can have a number of surface cations or atoms including, but not limited to, $NH_3^+$, $Na^+$, $K^+$, $Ca^{2+}$, $Mg^{2+}$, Fe species, Mo species, and combinations thereof. In some aspects, these cations or atoms are naturally present on the zeolite surface and/or throughout the zeolite structure. In other aspects, one or more of these cations or atoms can be added to the zeolite surface through an ion exchange process or by another means.

In one aspect, the zeolite can be any commonly known or industrially important zeolite, including, but not limited to, zeolites known by the structural designations NAT, EDI, THO, ANA, LAU, YUG, GOO, MON, PHI, GIS, BOG, MER, MAZ, PAU, LTL, CHA, FAU, MOR, OFF, WEN, TMA, BIK, ERI, FER, GME, LEV, DAC, EPI, HEU, STI, BRE, ZSM, MFI, BEA, LTA, or a combination thereof. In a further aspect, the zeolite can be a ZSM zeolite such as, for example, ZSM-5.

In a further aspect, the zeolite can be used as purchased or mined or can be treated prior to use in synthesis. In one aspect, the zeolite can be a commercial zeolite such as, for example, $NH_4$-ZSM-5. In a further aspect, the zeolite can have a silica/alumina ratio (SAR) of from about 5 to about 30, or of about 5, 6, 7, 8, 9, 10, 11, 12, 13, 14, 15, 16, 17, 18, 19, 20, 21, 22, 23, 24, 25, 26, 27, 28, 29, or about 30, or a combination of any of the foregoing values, or a range encompassing any of the foregoing values. In one aspect, the silica/alumina ratio is about 23.

In one aspect, $NH_4$-ZSM-5 can be treated to convert it to H-ZSM-5. In a further aspect, H-ZSM-5 is useful in the methods and processes disclosed herein. In one aspect, treatment can include calcination at an increased temperature to drive off $NH_3$ molecules from the zeolite surface. In a further aspect, calcination can be accomplished at a temperature of from about 400° C. to about 600° C., or of about 400, 425, 450, 475, 500, 525, 550, 575, or about 600° C., or a combination of any of the foregoing values, or a range encompassing any of the foregoing values. In one aspect, calcination is performed at 500° C. In another aspect, calcination can be carried out for from about 1 to about 5 hours, or for about 1, 1.5, 2, 2.5, 3, 3.5, 4, 4.5, or about 5 hours, or a combination of any of the foregoing values, or a range encompassing any of the foregoing values. In one aspect, calcination is carried out for about 3 hours. In any of these aspects, following calcination, H-ZSM-5 can be used alone during biomass gasification or can be used as a support for one or more catalysts.

In one aspect, the ZSM-5 may need to be reduced prior to use, either with or without the presence of additional catalyst or metal particles. In a further aspect, reduction can be accomplished under a gas stream that includes from about 5 vol % to about 15 vol % $H_2$ and from about 85 vol % to about 95 vol % of an inert gas. In one aspect, the inert gas is $N_2$. In another aspect, the gas stream includes about 5, 6, 7, 8, 9, 10, 11, 12, 13, 14, or about 15 vol % $H_2$, or a combination of any of the foregoing values, or a range encompassing any of the foregoing values. In one aspect, the gas stream includes about 10 vol % $H_2$. In another aspect, reduction is accomplished at an increased temperature such as, for example, from about 500 to about 700° C., or at about 500, 525, 550, 575, 600, 625, 650, 675, or about 700° C., or a combination of any of the foregoing values, or a range encompassing any of the foregoing values. In one aspect, reduction is conducted at about 600° C. In another aspect, reduction is carried out for from about 1 to about 5 hours, or for about 1, 1.5, 2, 2.5, 3, 3.5, 4, 4.5, or about 5 hours, or a combination of any of the foregoing values, or a range encompassing any of the foregoing values. In one aspect, reduction is carried out for about 3 hours.

In another aspect, metal ions or metal atoms can be added to the zeolite prior to use in the biomass gasification methods and processes disclosed herein. In a further aspect, the metal can be iron, molybdenum, cobalt, nickel, tin, zinc, copper, manganese, chromium, or a combination thereof. In one aspect, the metal can be added to the catalyst using an incipient wetness technique. In a further aspect, incipient wetness involves use of a metal precursor dissolved in an aqueous or organic solution, which is added to a catalyst support. In a further aspect, the pore volume of the catalyst support is the same as the volume of the aqueous or organic solution of metal. Further in this aspect, the solution is drawn into the pores of the catalyst via capillary action.

In one aspect, when the metal is molybdenum, the metal precursor can be a molybdate salt. In a further aspect, the molybdate salt can be $(NH_4)_6Mo_7O_{24} \cdot 4H_2O$, $Na_2MoO_4$, $Na_2MoO_4 \cdot 2H_2O$, $K_2MoO_4$, another molybdate salt, or a combination thereof. In one aspect, the molybdate salt has a volatile counter ion such as, for example, ammonia or ammonium, so that the counter ion can be driven off during a calcination process. Further in this aspect, the molybdate salt can be $(NH_4)_6Mo_7O_{24} \cdot 4H_2O$. In one aspect, when the metal is iron, the metal precursor can be $Fe(NO_3)_3 \cdot 9H_2O$, $FeSO_4 \cdot xH_2O$, $FeSO_4 \cdot 7H_2O$, $FeBr_2$, $FeCO_3$, $FeCl_2$, $Fe(OH)_2$, $Fe(NO_3)_2 \cdot 6H_2O$, $FeC_2O_4 \cdot 2H_2O$, $FeCl_3 \cdot 6H_2O$, $Fe_2(SO_4)_3 \cdot 9H_2O$, another iron salt, or a combination thereof. In one aspect, the metal precursor is an iron(III) compound. Further in this aspect, the iron salt can be $Fe(NO_3)_3 \cdot 9H_2O$.

In any of these aspects, following mixing by the incipient wetness technique, the catalyst can be dried to remove water. In one aspect, drying is accomplished at a temperature of from about 95 to about 115° C., or at about 95, 96, 97, 98, 99, 100, 101, 102, 103, 104, 105, 106, 107, 108, 109, 110, 111, 112, 113, 114, or about 115° C., or a combination of any of the foregoing values, or a range encompassing any of the foregoing values. In one aspect, drying is conducted at 105° C. overnight. In some aspects, following drying, the catalyst is further calcined. In one aspect, calcination of the dried catalyst is conducted at a temperature of from about 450° C. to about 650° C., or at about 450, 475, 500, 525, 550, 575, 600, 625, or 650° C., or a combination of any of the foregoing values, or a range encompassing any of the foregoing values. In one aspect, calcination is accomplished at 550° C. In a further aspect, the dried catalyst is calcined for a period of from about 2 to about 6 hours, or for 2, 2.5, 3, 3.5, 4, 4.5, 5, 5.5, or about 6 hours, or a combination of any of the foregoing values, or a range encompassing any of the foregoing values. In one aspect, the dried powder catalyst is calcined for about 4 hours. In another aspect, the dried powder catalyst is calcined in air.

In one aspect, the catalyst is bimetallic. In a further aspect, the bimetallic catalyst includes Mo and Fe. In still another aspect, the catalyst can include from about 0.1 wt % Fe to about 2 wt % Fe, or about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or about 2 wt % Fe, or a combination of any of the foregoing values, or a range encompassing any of the foregoing values. In another aspect, the catalyst can include from about 3 wt % Mo to about 5 wt % Mo, or about 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or about 5 wt % Mo, or a combination of any of the foregoing values, or a range encompassing any of the foregoing values. In one aspect, the catalyst includes a ZSM-5 support prepared as described previously with 4 wt % Mo and 0.5 wt % Fe (herein referred to as FeMo1). In another aspect, the catalyst includes a ZSM-5 support with 4 wt % Mo and 1.5 wt % Fe (herein referred to as FeMo2).

Carbon Nanofiber Catalyst Support

In some aspects, catalysts are supported on a carbon-based material instead of or in addition to a zeolite. In one aspect, the carbon material can be a carbon nanomaterial such as, for example, a nanoparticle, fullerene, carbon filament, single-walled or multi-walled carbon nanotube (CNT), a graphene-based material, e.g., graphene nanosheets (GNS), or a carbon nanofiber (CNF). In one aspect, the carbon material is a CNF. In a further aspect, a CNF can consist of several different forms of carbon including, but not limited to, graphene layers with different geographical arrangements. In one aspect, the CNF or other carbon-based material useful herein can be purchased from a commercial source or can be generated in situ.

In a further aspect, metals can be added to existing CNF to form a supported catalyst. In an alternative aspect, CNF-based support and metal-containing catalyst can be generated simultaneously. In one aspect, CNF can be generated from a hardwood pellet or other source of biomass. In one aspect, a hardwood pellet can be ground to a desired particle size and further sifted using a sieve or mesh or series of sieves or meshes to eliminate excessively large and/or small particles and further delineate desired particle size. In one aspect, the mean particle size useful herein is from about 200 to about 400 µm, or is about 200, 225, 250, 275, 300, 325, 350, 375, or about 400 µm, or a combination of any of the foregoing values, or a range encompassing any of the foregoing values. In one aspect, the mean particle size is about 300 µm.

In another aspect, one or more metal salts, where the cations are desired as catalyst particles, can be dissolved in water or an organic solvent. In a further aspect, these can be iron or molybdenum salts such as, for example, those described previously (e.g., $Fe(NO_3)_3 \cdot 9H_2O$ and $(NH_4)_6Mo_7O_{24} \cdot 4H_2O$). In a further aspect, the dissolved metal salts can be mixed with biomass particles by any known means including, but not limited to, stirring on a magnetic stirring hot plate, with or without added heat. In one aspect, following mixing, the mixture can be allowed to dry. In still another aspect, the dried mixture of metal salts and biomass can be pyrolyzed to generate CNF-supported catalyst. In one aspect, pyrolysis can be conducted in a tubular fixed bed reactor or another reactor capable of reaching the desired temperature. In another aspect, pyrolysis is conducted at a temperature of from about 600 to about 800° C., or at about 600, 625, 650, 675, 700, 725, 750, 775, or about 800° C., or a combination of any of the foregoing values, or a range encompassing any of the foregoing values. In one aspect, pyrolysis is conducted at about 700° C. In another aspect, pyrolysis is conducted under an inert gas such as, for example, He or $N_2$. In any of these aspects, pyrolysis of metal-impregnated wood chips can lead to CNF formation due to thermal cracking of biomass. In still another aspect, cracking and devolatilization can lead to deposition of carbon.

In one aspect, when CNF support is used for the catalysts disclosed herein, Mo can be present from about 3 to about 5 wt %, or at about 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or about 5 wt %, or a combination of any of the foregoing values, or a range encompassing any of the foregoing values. In another aspect, Fe can be present in an amount of from about 1 to about 2 wt %, or at about 1. 1.1, 1.2, 1.3, 1.4, 1.5, 1.6, 1.7, 1.8, 1.9, or about 2 wt %, or a combination of any of the foregoing values, or a range encompassing any of the foregoing values. In one aspect, Mo can be present at about 4 wt % and Fe can be present at about 1.5 wt %. In one aspect, CNF-based catalyst does not require reduction prior to use.

III. Biomass Preparation and Characterization

In one aspect, the biomass used for gasification reactions has approximately the following composition. In one aspect, the biomass is from about 40 to about 50 wt % carbon, or about 40, 41, 42, 43, 44, 45, 46, 47, 48, 49, or about 50 wt % carbon, or a combination of any of the foregoing values, or a range encompassing any of the foregoing values. In another aspect, the biomass is from about 1 to about 10 wt % hydrogen, or is about 1, 2, 3, 4, 5, 6, 7, 8, 9, or about 10 wt % hydrogen, or a combination of any of the foregoing values, or a range encompassing any of the foregoing values. In still another aspect, the biomass is from about 45 to about 55 wt % oxygen, or is about 45, 46, 47, 48, 49, 50, 51, 52, 53, 54, or about 55 wt % oxygen, or a combination of any of the foregoing values, or a range encompassing any of the foregoing values. In one aspect, the biomass is from about 2 to about 12 wt % moisture, or is about 2, 3, 4, 5, 6, 7, 8, 9, 10, 11, or about 12 wt % moisture, or a combination of any of the foregoing values, or a range encompassing any of the foregoing values. In still another aspect, the biomass is from about 0.05 to about 1 wt % ash, or is about 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or about 1 wt % ash, or a combination of any of the foregoing values, or a range encompassing any of the foregoing values. In one aspect, the hardwood biomass can be about 45.25 wt % carbon, about 4.65 wt % hydrogen, about 49.2 wt % oxygen, about 7.16 wt % moisture, and about 0.32 wt % ash.

In one aspect, biomass useful herein can be ground and screened to a mean particle diameter of from about 350 to about 500 µm, or of about 350, 360, 370, 380, 390, 400, 410, 420, 430, 440, 450, 460, 470, 480, 490, or about 500 µm, or a combination of any of the foregoing values, or a range encompassing any of the foregoing values. In one aspect, the mean particle diameter is about 432 μm. In another aspect, the particle size selected for biomass useful herein is compatible with a fixed bed reactor, a bubbling fluidized bed reactor, or any other reactor useful herein.

In one aspect, when the biomass useful herein includes some amount of oxygen, an external source of oxygen such as, for example, carbon dioxide or water, is not required for hydrogen-rich syngas production. In a further aspect, inclusion of substantial amounts of external oxygen in the catalyst-biomass system may result in high concentrations of undesired side products such as, for example, carbon monoxide and carbon dioxide.

In one aspect, lignin includes aromatic components with branched functional groups including, but not limited to, carbonyl carbons and hydroxyl carbons. In a further aspect, these functional groups can interact with catalyst support when, for example, the catalyst is supported by a zeolite with acidic sites. In a further aspect, without wishing to be bound by theory, oxygen in the biomass can undergo surface reactions with available hydrogen to undergo reverse steam methane reforming, especially when there is no external source of methane available (e.g., in the reactor feed).

In one aspect, the structure of the biomass (i.e., of lignin) can affect the mechanism and yield of the gasification reaction. In one aspect, the lignin structure is highly aromatic. In another aspect, the lignin structure is extensively oxygenated. In one aspect, lignin contains aromatic and furfural chains as well as hydroxyl functional groups. In a further aspect, loosely bound oxygen and hydroxyl groups on the surface may be capable of reacting with hydrogen generated when biomass devolatilizes. In a further aspect, this process can produce $H_2O$ adsorbates on catalyst active sites such as, for example, Fe and/or Mo active sites. In some aspects, intermediate hydrogen species may assist in cracking the oxygenated aromatic structure of lignin via hydrodeoxygenation, decarbonylation, and/or decarboxylation reactions.

IV. Effect of Catalyst on Biomass Gasification

In one aspect, catalyst (reduced, if necessary) and biomass can be mixed prior to the gasification reaction. In a further aspect, catalyst and biomass can be mixed in a ratio of from about 0.25:1 to about 1:0.25, or of about 0.25:1, 0.5:1, 0.75:1, 1:1, 1:0.75, 1:0.5, about 1:0.25, or a combination of any of the foregoing values, or a range encompassing any of the foregoing values. In one aspect, catalyst and biomass are mixed at a ratio of about 0.75:1. In another aspect, mixing can be carried out by any means known in the art including, but not limited to, mechanical mixing.

In another aspect, an initial temperature ramp can be conducted in the processes and methods disclosed herein. In a further aspect, during the initial temperature ramp, an inert gas such as, for example, nitrogen or helium, can be fed into the reactor. In a still further aspect, gas flow can be from about 200 to about 400 sccm, or can be about 200, 225, 250, 275, 300, 325, 350, 375, or about 400 sccm, or a combination of any of the foregoing values, or a range encompassing any of the foregoing values. In one aspect, gas flow is about 300 sccm. In another aspect, the initial temperature ramp involves raising the temperature of the reactor above room temperature. In a further aspect, the temperature of the reactor can be raised from room temperature to about 100° C. In a further aspect, when air and moisture have been removed from the reactor, gas flow is maintained until the reactor pressure has reached from about 40 to about 60 psig, or about 40, 41, 42, 43, 44, 45, 46, 47, 48, 49, 50, 51, 52, 53, 54, 55, 56, 57, 58, 59, about 60 psig, or a combination of any of the foregoing values, or a range encompassing any of the foregoing values. In one aspect, gas flow is maintained until the reactor pressure reaches 50 psig. In one aspect, the feed gas can be an inert gas such as, for example, nitrogen, or can contain nitrogen and one or more other gases as described below.

In any of the foregoing aspects, when the reactor has reached the desired temperature (e.g., 100° C.) and pressure (e.g., 50 psig), the temperature can be increased to the desired gasification temperature. In one aspect, desired gasification temperature can be reached via a temperature ramp. In a further aspect, the temperature ramp can be from about 10° C./min to about 30° C./min, or can be about 10, 11, 12, 13, 14, 15, 16, 17, 18, 19, 20, 21, 22, 23, 24, 25, 26, 27, 28, 29, or about 30° C./min, or a combination of any of the foregoing values, or a range encompassing any of the foregoing values. In one aspect, the temperature ramp is about 20° C./min. In some aspects, reactor valves are closed or shut until the temperature ramp is complete. In another aspect, the method can be adapted for replication of continuous feeding of biomass in a fluidized bed or moving bed reactor at the desired temperature.

In one aspect, biomass gasification yields a low amount of $H_2$ relative to the amount of CO yielded (i.e., on the order of 0.35). In a further aspect, based on the rough molar amounts of atomic carbon and hydrogen in biomass, a ratio of $H_2$:CO should be between 0.5 and 1. Without wishing to be bound by theory, in the absence of a catalyst, thermal cracking may dominate over gasification reactions, producing more methane and carbon dioxide relative to hydrogen.

In another aspect, when biomass is mixed with a zeolite such as, for example, ZSM-5, $H_2$:CO ratio improves. In a further aspect, $H_2$ yield relative to CO yield is at least 0.57 in this situation. In a still further aspect, and without wishing to be bound by theory, gasification reactions become more important in the presence of a zeolite or other supporting material. In a still further aspect, one such reaction is the high temperature water gas shift reaction. In one aspect, when CO concentration in the product gas mixture is reduced and $CO_2$ concentration is increased, the water gas shift reaction is likely to be occurring. In any of the above aspects, an external hydrogen source is required to hydrogenate and reduce tar and to form carbon monoxide. In some aspects, a percentage of methane in the feed gas mixture can serve as the hydrogen source. In still another aspect, the presence of a catalyst such as a metal-containing catalyst can assist with the thermodynamic activation of methane as hydrogen source in the processes disclosed herein.

In one aspect, material used for catalyst support can be altered in order to optimize desired product mixture and yield. In another aspect, CNF and zeolite supports result in nearly equal $H_2$:CO ratios in the product gas mixture. In a further aspect, from about 0.5 to about 2.5 moles of $H_2$ for every mole of CO are produced with either catalyst support, or about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, or about 2.5 moles of $H_2$ per mole of CO, or a combination of any of the foregoing values, or a range encompassing any of the foregoing values. In one aspect, with zeolite support, about 1.94 moles of $H_2$ are produced for every mole of CO. In an alternative aspect, about 1.18 moles of $H_2$ are produced for every mole of CO. In another aspect, with CNF support, about 1.97 moles of $H_2$ are produced for every mole of CO. In another aspect, about 0.96 moles of $H_2$ are produced for every mole of CO. In another aspect, despite these similar ratios, CNF-supported catalysts may produce higher overall gas yields in the disclosed reactions. In still another aspect, at lower temperatures (e.g., 750° C.), the ratio of $H_2$ to CO produced is smaller (i.e., around 1) than at higher temperatures (e.g., 850° C., with ratio of around 2).

In one aspect, when the catalyst support is a zeolite such as, for example, ZSM-5, hydrogen yield can be from about 25 to about 40 mole %, or can be about 25, 26, 27, 28, 29, 30, 31, 32, 33, 34, 35, 36, 37, 38, 39, or about 40 mole %, or a combination of any of the foregoing values, or a range encompassing any of the foregoing values. In one aspect, hydrogen yield is about 29% or is about 32%. In another aspect, when the catalyst support is a zeolite, carbon monoxide yield can be from about 10 to about 30 mole %, or can be about 10, 11, 12, 13, 14, 15, 16, 17, 18, 19, 20, 21, 22, 23, 24, 25, 26, 27, 28, 29, or about 30 mole %, or a combination of any of the foregoing values, or a range encompassing any of the foregoing values. In one aspect, carbon monoxide yield is about 16 mole % or is about 24 mole %. In still another aspect, carbon dioxide yield in this situation is from about 5 to about 25 mole %, or is about 5, 6, 7, 8, 9, 10, 11, 12, 13, 14, 15, 16, 17, 18, 19, 20, 21, 22, 23, 24, or about 25 mole %, or a combination of any of the foregoing values, or a range encompassing any of the foregoing values. In one aspect, carbon dioxide yield is about 8 mole % or is about 21 mole %. In yet another aspect, when the catalyst support is zeolite, methane yield in the product gas mixture is from about 5 to about 20 mole %, or is about 5, 6, 7, 8, 9, 10, 11, 12, 13, 14, 15, 16, 17, 18, 19, or about 20 mole %, or a combination of any of the foregoing values, or a range encompassing any of the foregoing values. In one aspect, the methane yield is about 10 mole % or about 17 mole %.

In another aspect, when the catalyst support is CNF, hydrogen yield can be from about 40 to about 65 mole %, or can be about 40, 41, 42, 43, 44, 45, 46, 47, 48, 49, 50, 51, 52, 53, 54, 55, 56, 57, 58, 59, 60, 61, 62, 63, 64, or about 65 mole %, or a combination of any of the foregoing values, or a range encompassing any of the foregoing values. In one aspect, hydrogen yield can be about 56% or can be about 43%. In another aspect, carbon monoxide yield when the catalyst support is CNF can be from about 20 to about 50 mole %, or can be about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or about 50 mole %, or a combination of any of the foregoing values, or a range encompassing any of the foregoing values. In one aspect, carbon monoxide yield can be about 29 mole % or about 44 mole %. In still another aspect, carbon dioxide yield when the catalyst support is CNF can be from about 10 to about 20 mole %, or can be about 10, 11, 12, 13, 14, 15, 16, 17, 18, 19, or about 20 mole %, or a combination of any of the foregoing values, or a range encompassing any of the foregoing values. In one aspect, carbon dioxide yield is about 16 mole % or is about 10 mole %. In still another aspect, under these conditions, methane yield can be from about 0 to about 10 mole %, or can be about 0, 1, 2, 3, 4, 5, 6, 7, 8, 9, or about 10 mole %, or a combination of any of the foregoing values, or a range encompassing any of the foregoing values. In one aspect, methane yield is about 6 mole % or about 10 mole %.

In still another aspect, catalyst metal ratio, temperature, percentage of methane and/or carbon dioxide in feed gas, and other parameters can be altered by the skilled artisan in order to fine-tune the product gas mixture as disclosed herein.

V. Modifications of Feed Gas Stream

Methane-Activated Gasification

In one aspect, the feed gas stream can include one or more added gases.

In a further aspect, the feed gas stream includes any desired concentration of methane desired. In one aspect, methane concentration is from about 0% to about 25%, or is about 0, 1, 2, 3, 4, 5, 6, 7, 8, 9, 10, 11, 12, 13, 14, 15, 16, 17, 18, 19, 20, 21, 22, 23, 24, or about 25%, or a combination of any of the forgoing values, or a range encompassing any of the foregoing values. In one aspect, the feed gas stream includes 5% methane, or 10% methane, or 15% methane. In an alternative aspect, the feed gas stream is substantially free of methane.

In one aspect, a small amount of methane in the feed gas mixture can result in a much higher hydrogen yield from biomass gasification than the same reaction performed in an atmosphere substantially free of methane. In one aspect, hydrogen gas yield is significantly enhanced relative to CO yield when some methane is present in the feed gas mixture. In one aspect, $H_2$:CO ratio for reactions with methane in the feed gas mixture can be from about 3.5 to about 7.5, or can be about 3.5, 4, 4.5, 5, 5.5, 6, 6.5, 7, or about 7.5, or a combination of any of the foregoing values, or a range encompassing any of the foregoing values. In a further aspect, the $H_2$:CO ratio can be about 3.7, 4.2, 5, 6, or about 7.4.

In another aspect, hydrogen yield when there is a percentage of methane in the feed gas mixture can be from about 70 to about 90 mole %, or can be about 70, 71, 72, 73, 74, 75, 76, 77, 78, 79, 80, 81, 82, 83, 84, 85, 86, 87, 88, 89, or about 90 mole %, or a combination of any of the foregoing values, or a range encompassing any of the foregoing values. In another aspect, CO yield can be from about 10 to about 25 mole %, or can be about 10, 11, 12, 13, 14, 15, 16, 17, 18, 19, 20, 21, 22, 23, 24, or about 25 mole %, or a combination of any of the foregoing values, or a range encompassing any of the foregoing values, when the feed gas contains a portion of methane. In still another aspect, yields of carbon dioxide and methane in the product gas mixture are less than or equal to 5 mole % when there is a proportion of methane in the feed gas mixture. In still another aspect, hydrogen yield is somewhat reduced at the highest methane concentrations (e.g., 15% in the feed gas mixture) and somewhat higher at the lowest methane concentrations e.g., 5% in the feed gas mixture).

Carbon Dioxide-Activated Gasification

In some aspects, the feed gas stream includes carbon dioxide. In a further aspect, when the feed gas includes carbon dioxide, the feed gas also includes methane. In one aspect, methane can have a concentration of from about 5 to about 15 sccm, or about 5, 6, 7, 8, 9, 10, 11, 12, 13, 14, or about 15 sccm, or a combination of any of the foregoing values, or a range encompassing any of the foregoing values. In another aspect, carbon dioxide can have a concentration of from about 0 to about 5 sccm, or of about 0, 1, 2, 3, 4, or about 5 sccm, or a combination of any of the foregoing values, or a range encompassing any of the foregoing values. In still another aspect, the feed gas includes an inert gas such as, for example, nitrogen or helium. In one aspect, nitrogen can be present in an amount of from about 175 to about 200 sccm, or of about 175, 176, 177, 178, 179, 180, 181, 182, 183, 184, 185, 186, 187, 188, 189, 190, 191, 192, 193, 194, 195, 196, 197, 198, 199, or about 200 sccm, or a combination of any of the foregoing values, or a range encompassing any of the foregoing values. In one aspect, methane has a concentration of 10 sccm, carbon dioxide has a concentration of 2 sccm, and nitrogen has a concentration of 188 sccm. In any of the above aspects, when carbon dioxide is used, a temperature ramp of from about 5 to about 15° C./min can be used to reach the desired reaction temperature, or about 5, 6, 7, 8, 9, 10, 11, 12, 13, 14, or about 15° C./min, or a combination of any of the foregoing values, or a range encompassing any of the foregoing values. In one aspect, the temperature ramp can be 10° C./min.

In one aspect, reactor pressure can vary based on desired reaction temperature. In a further aspect, reaction temperature can be from about 700 to about 950° C., or can be 700, 725, 750, 775, 800, 825, 850, 875, 900, 925, or about 950° C., or a combination of any of the foregoing values, or a range encompassing any of the foregoing values. In one aspect, the reaction temperature can be about 750° C., 850° C., or about 900° C. In another aspect, reactor pressure can vary from about ambient pressure to about 1500 psig depending on reaction temperature, or can be about 0, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, or about 1500 psig, or a combination of any of the foregoing values, or a range encompassing any of the foregoing values. In one aspect, when reaction temperature is 750° C., pressure is about 250 psig. In another aspect, when reaction temperature is 850° C., pressure is about 380 psig. In still another aspect, when reaction temperature is 900° C., pressure is about 420 psig.

In a further aspect, an external source of oxygen such as water would produce steam and lead to steam methane reforming, which may not be desirable. Unexpectedly, although greater than 5 vol % of $CO_2$ added to the feed gas stream results in formation of large amounts of CO and $CO_2$ in the product mixture, addition of about 1 vol % of $CO_2$ yields an $H_2$:CO ratio of from about 1 to about 4, or of about 1, 1.5, 2, 2.5, 3, 3.5, or about 4, or a combination of any of the foregoing values, or a range encompassing any of the foregoing values. In one aspect, the $H_2$:CO ratio is about 2.

In one aspect, in the processes disclosed herein, addition of carbon dioxide at a level of about 1% to the feed gas mixture results in slightly increased methane production and somewhat reduced hydrogen production compared to the carbon dioxide-free system. In another aspect, overall gas yield in $CO_2$-activated reactions can be higher when the catalyst is supported by CNF as opposed to by a zeolite such as, for example, ZSM-5. In one aspect, a zeolite-supported catalyst in a carbon dioxide activated reaction can produce about 25% of the amount of gas as a CNF-supported catalyst. In any of the above aspects, the skilled artisan will be able to choose a catalyst support based on the present disclosure depending upon desired reaction time and temperature, feed gas mixture, desired product gas mixture, and the like.

VI. Time and Temperature of Reaction

In one aspect, when gasification reactions are conducted at a lower temperature such as, for example, 650° C., hydrogen yield is lower than desired. In one aspect, at 650° C., hydrogen yield is from about 0% to about 10%, or is 0, 1, 2, 3, 4, 5, 6, 7, 8, 9, or about 10%, or a combination of any of the foregoing values, or a range encompassing any of the foregoing values. In one aspect, hydrogen yield is about 7% at 650° C. In another aspect, when reaction temperature is below 300° C., the primary products may be CO and/or $CO_2$. Without wishing to be bound by theory, products at lower temperatures may result from thermal cracking oxygenated aromatic rings from the lignin structure of the biomass.

In one aspect, product gas composition can vary depending on reaction temperature, when all other variables (e.g., presence and composition of catalyst, particular catalyst support, feed gas composition) remain constant. In a further aspect, $H_2$:CO ratio tends to be higher at higher temperatures. In one aspect, $H_2$:CO ratio in the product gas mixture can be about 1 for a 750° C. reaction or can be about 2 for an 850° C. or 900° C. reaction. In another aspect, side products such as, for example, tar may be present in higher amounts following lower temperature reactions (e.g., 750° C.) while higher temperature reactions (e.g., 900° C.) may produce little or no tar. In still another aspect, overall gas yield is typically higher for higher-temperature reactions (i.e., 98.5 mole % for 900° C., 88.2 mole % for 850° C., and 37.5 mole % for 750° C.).

In one aspect, the processes and methods disclosed herein allow for a shortened reaction time compared to known procedures. In one aspect, the reactions disclosed herein can be carried out for from about 1 to about 10 hours, or for about 1, 2, 3, 4, 5, 6, 7, 8, 9, or about 10 hours, or a combination of any of the foregoing values, or a range encompassing any of the foregoing values. In one aspect, the reactions disclosed herein are carried out for about 4 hours.

VII. Re-Use and Waste Products of Gasification Reaction

Re-Use of Catalyst

In one aspect, the catalysts disclosed herein can be re-used for multiple runs of the reactions disclosed herein. In some aspects, the catalysts are recycled or regenerated (i.e., by acid treatment or another method) prior to re-use. In any of these aspects, similar product gas compositions are obtained for the same catalyst reused 1, 2, 3, 4, 5, or more times. In a still further aspect, both zeolite-supported and CNF-based catalysts can be reused multiple times in the reactions disclosed herein.

Coke Deposition on Catalyst

In one aspect, coke is deposited on the metal-containing catalyst during the reactions disclosed herein. In a further aspect, coke deposition can deactivate the catalyst by, for example, blocking catalyst active sites. Without wishing to be bound by theory, CNF-supported catalysts can absorb coke and/or ash more effectively than conventional supports due to topography at the nanometer scale. In any of these aspects, minimizing coke production is beneficial for continued gasification without having to renew or regenerate catalyst.

In another aspect, coke production in the disclosed reactions can be from about 5 to about 40 wt % of the original catalyst weight after reduction, or can be about 5, 10, 15, 20, 25, 30, 35, or about 40 wt % of the original catalyst weight after reduction, or a combination of any of the foregoing values, or a range encompassing any of the foregoing values. In one aspect, coke production is from about 10 to 30 wt % of the original weight of the catalyst. Alternatively, in some aspects, coke production can be essentially 0 wt % of the original weight of the catalyst.

In a further aspect, without wishing to be bound by theory, coke production correlates with the amount of methane in the gas feed, with lower concentrations of methane (e.g., 5 vol %) resulting in lower coke yields, and with higher concentrations of methane resulting in higher coke yields (e.g., 15 vol %). In one aspect, when the gas feed is free of methane, coke formation is not observed. In still another aspect, when methane is present in the gas feed, coke production is lower at higher temperatures. In some aspects, coke is not formed, for example, with the FeMo2 catalyst at 950° C.

In any of the above aspects, coke production can be minimized to an acceptable level by modifying catalyst identity, concentration of methane, reaction temperatures, and the like as disclosed herein.

Gas, Tar, and Char Production

In one aspect, in the methods and processes disclosed herein, it is desirable to maximize production of the desired gas(es) while minimizing productions of side products such as, for example, tar and char. In one aspect, the methods and processes disclosed herein produce at least 80 mole % product gas, or produce at least 80, 81, 82, 83, 84, 85, 86, 87, 88, 89, 90, 91, 92, 93, 94, 95, 96, 97, 98, or about 99 mole % product gas, or a combination of any of the foregoing values, or a range encompassing any of the foregoing values.

In a further aspect, gas, tar, and char production can be optimized as desired by varying experimental parameters as disclosed herein. In another aspect, small amounts of char may be produced when the feed gas contains a proportion of methane. In one aspect, char production represents less than about 10 mole % of the total reaction products, or is about 0, 1, 2, 3, 4, 5, 6, 7, 8, 9, or 10 mol % of the total reaction products, or a combination of any of the foregoing values, or a range encompassing any of the foregoing values. In one aspect, when the feed gas contains 0% methane, char is not produced (i.e., char production is 0 mole %). In another aspect, when methane proportion in feed gas increases, char production increases, regardless of temperature. In still another aspect, proportion of char does not strongly depend on reaction temperature.

In one aspect, small amounts of tar are produced in the reactions disclosed herein. In one aspect, tar production is from about 9 to about 15 mole % of total reaction products, or is about 9, 10, 11, 12, 13, 14, or about 15 mole % of the total reaction products, or a combination of any of the foregoing values, or a range encompassing any of the foregoing values.

Without wishing to be bound by theory, in any of the above aspects, tar and char formation may increase when available catalyst active sites are occupied by methane. In any of the above aspects, the processes disclosed herein are designed and optimized to maximize production of desired product gases and minimize production of side products such as tar and char.

VIII. Reactor Configuration and Effects of Reactor

In one aspect, the reactions disclosed herein can be performed in a fixed bed reactor. In a further aspect, the fixed bed reactor can be a downdraft fixed bed reactor. In some aspects, the reactor is made from stainless steel.

In another aspect, the reactions disclosed herein can be performed in a bubbling fluidized bed reactor. In another aspect, the fluidized-bed reactor is bench scale and allows for a continuous reaction.

IX. Aspects

The following listing of exemplary aspects supports and is supported by the disclosure provided herein.

Aspect 1. A method for producing syngas, the method comprising: (a) placing a first reactant and a second reactant in a reactor; (b) reacting the first reactant and the second reactant at a first temperature for a first period of time to produce a product gas mixture; and (c) collecting the product gas mixture; wherein the first reactant comprises a source of biomass; wherein the second reactant comprises a coal, a plastic, or combinations; and wherein the product gas mixture comprises syngas.

Aspect 2. The method of Aspect 1, wherein the biomass comprises a lignocellulosic material.

Aspect 3. The method of Aspect 1 or Aspect 2, wherein the biomass comprises agricultural waste, forestry waste, wood, sawdust, a byproduct of lumber milling, waste material from the manufacture of wood products, a plant grown for energy production purposes, or a combination thereof.

Aspect 4. The method of any of Aspect 1-Aspect 3, wherein biomass comprises hardwood pellets.

Aspect 5. The method of any of Aspect 1-Aspect 4, wherein the biomass comprises from about 45 to about 55 wt % oxygen.

Aspect 6. The method of any of Aspect 1-Aspect 4, wherein the biomass comprises from about 40 to about 50 wt % carbon.

Aspect 7. The method of any of Aspect 1-Aspect 6, further comprising contacting the first reactant with a catalyst prior to reacting the source of biomass and the feed gas.

Aspect 8. The method of Aspect 7, wherein the catalyst comprises at least one metal atom, metal oxide, or metal ion.

Aspect 9. The method of Aspect 8, wherein the metal atom or metal ion comprises nickel, iron, molybdenum, tin, zinc, copper, chromium, rhodium, cerium, an alkali metal, magnesium, manganese, platinum, palladium, ruthenium, or a combination thereof.

Aspect 10. The method of Aspect 8 or Aspect 9, wherein the metal atom or metal ion comprises iron and molybdenum.

Aspect 11. The method of any of Aspect 7-Aspect 10, further comprising providing contacting the catalyst with a catalyst support.

Aspect 12. The method of Aspect 11, wherein the catalyst support comprises a metal oxide, a zeolite, a carbon product, or a combination thereof.

Aspect 13. The method of Aspect 12, wherein the metal oxide comprises $La_2O_3$, $SiO_2$, $\alpha\text{-}Al_2O_3$, $\gamma\text{-}Al_2O_3$, MgO, $CeO_2$, $TiO_2$, $ZrO_2$, or a combination thereof.

Aspect 14. The method of Aspect 12, wherein the zeolite comprises a ZSM zeolite.

Aspect 15. The method of Aspect 14, wherein the ZSM zeolite comprises ZSM-5.

Aspect 16. The method of Aspect 12, wherein the carbon product comprises nanoparticles, fullerenes, carbon filaments, single-walled carbon nanotubes, multi-walled carbon nanotubes, carbon nanofibers, graphene-based materials, or a combination thereof.

Aspect 17. The method of Aspect 16, wherein the carbon product comprises carbon nanofibers.

Aspect 18. The method of any of Aspect 11-Aspect 17, wherein the metal atom or metal ion comprises iron in an amount of from about 0.1 to about 10 wt % of the total weight of the catalyst and the catalyst support and molybdenum in an amount of from about 0.12 to about 6 wt % of the total weight of the catalyst and catalyst support.

Aspect 19. The method of Aspect 18, wherein the metal atom or metal ion comprises iron in an amount of 0.1 wt % to 6 wt % and molybdenum in an amount of 0.5 wt % to 6 wt % of the total weight of the catalyst and catalyst support.

Aspect 20. The method of Aspect 18, wherein the metal atom or metal ion comprises iron in an amount of 1.5 wt % and molybdenum in an amount of 4 wt % of the total weight of the catalyst and catalyst support.

Aspect 21. The method of any of Aspect 1-Aspect 20, wherein the reactor comprises a fixed bed reactor or a bubbling fluidized bed reactor.

Aspect 22. The method of Aspect 21, wherein the fixed bed reactor comprises a downdraft fixed-bed reactor.

Aspect 23. The method of any of Aspect 1-Aspect 22, wherein the second reactant comprises the coal.

Aspect 24. The method of any of Aspect 1-Aspect 22, wherein the second reactant comprises the plastic.

Aspect 25. The method of Aspect 24, wherein the plastic comprises one or more plastic.

Aspect 26. The method of Aspect 24 or Aspect 25, wherein the plastic is a waste plastic.

Aspect 27. The method of any one of Aspect 24-Aspect 26, wherein the plastic comprises an acrylic, a polyester, a nylon, a thermoplastic, a thermoset, or combinations thereof.

Aspect 28. The method of Aspect 27, wherein the plastic comprises the acrylic.

Aspect 29. The method of any one of 1-Aspect 28, wherein the first reactant is present in a first amount; wherein the second reactant is present in a second; wherein the first amount is from about 5 wt % to about 90 wt %; wherein the second amount is from about 5 wt % to about 90 wt %; and wherein weight percent amounts are based on a total weight of the first reactant and the second reactant.

Aspect 30. The method of Aspect 29, wherein the first amount is from about 15 wt % to about 85 wt %; and wherein the second amount is from about 15 wt % to about 85 wt %.

Aspect 31. The method of Aspect 29, wherein the first amount is from about 25 wt % to about 75 wt %; and wherein the second amount is from about 25 wt % to about 75 wt %.

Aspect 32. The method of Aspect 29, wherein the first amount is from about 35 wt % to about 65 wt %; and wherein the second amount is from about 35 wt % to about 65 wt %.

Aspect 33. The method of Aspect 29, wherein the first amount is from about 45 wt % to about 55 wt %; and wherein the second amount is from about 45 wt % to about 55 wt %.

Aspect 34. The method of Aspect 29, wherein the first amount is from about 10 wt % to about 30 wt %; and wherein the second amount is from about 90 wt % to about 70 wt %.

Aspect 35. The method of Aspect 29, wherein the first amount is from about 30 wt % to about 60 wt %; and wherein the second amount is from about 70 wt % to about 40 wt %.

Aspect 36. The method of Aspect 29, wherein the first amount is from about 60 wt % to about 80 wt %; and wherein the second amount is from about 40 wt % to about 20 wt %.

Aspect 37. The method of any one of Aspect 29-Aspect 36, wherein the second reactant comprises coal.

Aspect 38. The method of any one of Aspect 29-Aspect 36, wherein the second reactant comprises plastic.

Aspect 39. The method of any one of Aspect 29-Aspect 36, wherein the second reactant comprises coal and plastic.

Aspect 40. The method of Aspect 39, wherein the weight ratio of coal to plastic is from about 1:0.1 to about 1:10.

Aspect 41. The method of Aspect 39, wherein the weight ratio of coal to plastic is from about 1:0.1 to about 1:5.

Aspect 42. The method of Aspect 39, wherein the weight ratio of coal to plastic is from about 1:0.3 to about 1:10.

Aspect 43. The method of Aspect 39, wherein the weight ratio of coal to plastic is from about 1:0.3 to about 1:5.

Aspect 44. The method of Aspect 39, wherein the weight ratio of coal to plastic is from about 1:1 to about 1:10.

Aspect 45. The method of Aspect 39, wherein the weight ratio of coal to plastic is from about 1:1 to about 1:5.

Aspect 46. The method of Aspect 39, wherein the weight ratio of coal to plastic is from about 1:0.3 to about 1:0.6.

Aspect 47. The method of Aspect 39, wherein the weight ratio of coal to plastic is from about 1:0.7 to about 1:1.5.

Aspect 48. The method of Aspect 39, wherein the weight ratio of coal to plastic is from about 1:1 to about 1:3.

Aspect 49. The method of any one of 1-Aspect 48, wherein the placing the first reactant comprises continuously providing the first reactant.

Aspect 50. The method of any one of 1-Aspect 48, wherein the placing the first reactant comprises placing an amount of the first reactant in a reactor, followed by continuously providing the first reactant at a desired feed rate to the reactor.

Aspect 51. The method of any one of 1-Aspect 48, wherein the placing the second reactant comprises continuously providing the second reactant.

Aspect 52. The method of any one of 1-Aspect 48, wherein the placing the second reactant comprises placing an amount of the second reactant in a reactor, followed by continuously providing the second reactant at a desired feed rate to the reactor.

Aspect 53. The method of any one of Aspect 1-Aspect 52, wherein the first temperature is from about 650° C. to about 1500° C.

Aspect 54. The method of Aspect 53, wherein the first temperature is about 750° C.

Aspect 55. The method of Aspect 53, wherein the first temperature is about 850° C.

Aspect 56. The method of Aspect 53, wherein the first temperature is about 900° C.

Aspect 57. The method of any of Aspect 1-Aspect 56, wherein the first time period is from about 2 to about 10 hours.

Aspect 58. The method of Aspect 57, wherein the first time period is about 4 hours.

Aspect 59. The method of any of Aspect 1-Aspect 58, wherein the reaction is repeated from at least 1 to at least 5 times.

Aspect 60. The method of any of Aspect 1-Aspect 59, wherein gas yield is at least about 80 mole % based on starting moles of the source of biomass.

Aspect 61. The method of Aspect 60, wherein gas yield is at least about 85 mole % based on starting moles of the source of biomass.

Aspect 62. The method of Aspect 60, wherein gas yield is at least about 90 mole % based on starting moles of the source of biomass.

Aspect 63. The method of any of Aspect 1-Aspect 62, wherein less than about 10 mole % char is produced based on starting moles of the source of biomass.

Aspect 64. The method of Aspect 63, wherein less than about 5 mole % char is produced based on starting moles of the source of biomass.

Aspect 65. The method of Aspect 63, wherein no char is produced.

Aspect 66. The method of any of Aspect 1-Aspect 65, wherein less than about 15 mole % tar is produced based on starting moles of the source of biomass.

Aspect 67. The method of Aspect 66, wherein less than about 10 mole % tar is produced based on starting moles of the source of biomass.

Aspect 68. The method of Aspect 66, wherein less than about 5 mole % tar is produced based on starting moles of the source of biomass.

Aspect 69. The method of any of Aspect 1-Aspect 68, wherein the syngas comprises hydrogen, carbon monoxide, carbon dioxide, methane, or a combination thereof.

Aspect 70. The method of Aspect 69, wherein the syngas comprises hydrogen, carbon monoxide, carbon dioxide, methane, or a combination thereof.

Aspect 71. The method of Aspect 69 or Aspect 70, wherein the syngas comprises from about 20 to about 90 mole % hydrogen.

Aspect 72. The method of Aspect 71, wherein the syngas comprises from about 30 to about 85 mole % hydrogen.

Aspect 73. The method of Aspect 71, wherein the syngas comprises about 80 mole % hydrogen.

Aspect 74. The method of any of Aspect 69-Aspect 73, wherein the syngas comprises from about 1 to about 25 mole % methane.

Aspect 75. The method of Aspect 74, wherein the syngas comprises from about 1 to about 10 mole % methane.

Aspect 76. The method of any of Aspect 69-Aspect 75, wherein the syngas comprises from about 1 to about 25 mole % carbon dioxide.

Aspect 77. The method of Aspect 76, wherein the syngas comprises from about 1 to about 10 mole % carbon dioxide.

Aspect 78. The method of any of Aspect 69-Aspect 77, wherein the syngas comprises from about 9 to about 55 mole % carbon monoxide.

Aspect 79. The method of Aspect 78, wherein the syngas comprises from about 10 to about 30 mole % carbon monoxide.

Aspect 80. The method of Aspect 78, wherein the syngas comprises from about 15 to about 20 mole % carbon monoxide.

Aspect 81. The method of any of Aspect 69-Aspect 80, wherein the ratio of $H_2$ to CO in the syngas is from about 0.5 to about 10.

Aspect 82. The method of Aspect 81, wherein the ratio of $H_2$ to CO in the syngas is from about 1 to about 8.

Aspect 83. The method of Aspect 81, wherein the ratio of $H_2$ to CO in the syngas is from about 1.5 to about 4.

Aspect 84. Syngas produced by the method of any of Aspect 1-Aspect 68.

Aspect 85. The syngas of Aspect 84, wherein the syngas comprises hydrogen, carbon monoxide, carbon dioxide, methane, or a combination thereof.

Aspect 86. The syngas of Aspect 84 or Aspect 85, wherein the syngas comprises from about 20 to about 90 mole % hydrogen.

Aspect 87. The syngas of Aspect 86, wherein the syngas comprises from about 30 to about 85 mole % hydrogen.

Aspect 88. The syngas of Aspect 86, wherein the syngas comprises about 80 mole % hydrogen.

Aspect 89. The syngas of any of Aspect 84-Aspect 88, wherein the syngas comprises from about 1 to about 25 mole % methane.

Aspect 90. The syngas of Aspect 89, wherein the syngas comprises from about 1 to about 10 mole % methane.

Aspect 91. The syngas of any of Aspect 84-Aspect 90, wherein the syngas comprises from about 1 to about 25 mole % carbon dioxide.

Aspect 92. The syngas of Aspect 91, wherein the syngas comprises from about 1 to about 10 mole % carbon dioxide.

Aspect 93. The syngas of any of Aspect 84-Aspect 92, wherein the syngas comprises from about 9 to about 55 mole % carbon monoxide.

Aspect 94. The syngas of Aspect 93, wherein the syngas comprises from about 10 to about 30 mole % carbon monoxide.

Aspect 95. The syngas of Aspect 93, wherein the syngas comprises from about 15 to about 20 mole % carbon monoxide.

Aspect 96. The syngas of any of Aspect 84-Aspect 95, wherein the ratio of $H_2$ to CO in the syngas is from about 0.5 to about 10.

Aspect 97. The syngas of Aspect 96, wherein the ratio of $H_2$ to CO in the syngas is from about 1 to about 8.

Aspect 98. The syngas of Aspect 96, wherein the ratio of $H_2$ to CO in the syngas is from about 1.5 to about 4.

Aspect 99. A method for producing syngas, the method comprising: (a) placing or continuously feeding a source of biomass in a reactor; (b) providing a flow of feed gas through the reactor; (c) reacting the source of biomass and the feed gas at a first temperature for a first period of time to produce a product gas mixture; and (d) collecting the product gas mixture; wherein the product gas mixture comprises syngas.

Aspect 100. The method of Aspect 99, wherein the source of biomass comprises a lignocellulosic material.

Aspect 101. The method of Aspect 99 or Aspect 100, wherein the source of biomass comprises agricultural waste, forestry waste, wood, sawdust, a byproduct of lumber milling, waste material from the manufacture of wood products, a plant grown for energy production purposes, or a combination thereof.

Aspect 102. The method of any of Aspect 99-Aspect 101, wherein the source of biomass comprises hardwood pellets.

Aspect 103. The method of any of Aspect 99-Aspect 102, wherein the source of biomass comprises from about 45 to about 55 wt % oxygen.

Aspect 104. The method of any of Aspect 99-Aspect 102, wherein the source of biomass comprises from about 40 to about 50 wt % carbon.

Aspect 105. The method of any of Aspect 99-Aspect 104, further comprising contacting the source of biomass with a catalyst prior to reacting the source of biomass and the feed gas.

Aspect 106. The method of Aspect 105, wherein the catalyst comprises at least one metal atom, metal oxide, or metal ion.

Aspect 107. The method of Aspect 105, wherein the metal atom or metal ion comprises nickel, iron, molybdenum, tin, zinc, copper, chromium, rhodium, cerium, an alkali metal, magnesium, manganese, platinum, palladium, ruthenium, or a combination thereof.

Aspect 108. The method of Aspect 106 or Aspect 107, wherein the metal atom or metal ion comprises iron and molybdenum.

Aspect 109. The method of any of Aspect 105-Aspect 108, further comprising providing contacting the catalyst with a catalyst support.

Aspect 110. The method of Aspect 109, wherein the catalyst support comprises a metal oxide, a zeolite, a carbon product, or a combination thereof.

Aspect 111. The method of Aspect 110, wherein the metal oxide comprises $La_2O_3$, $SiO_2$, $\alpha$-$Al_2O_3$, $\gamma$-$Al_2O_3$, MgO, $CeO_2$, $TiO_2$, $ZrO_2$, or a combination thereof.

Aspect 112. The method of Aspect 110, wherein the zeolite comprises a ZSM zeolite.

Aspect 113. The method of Aspect 112, wherein the ZSM zeolite comprises ZSM-5.

Aspect 114. The method of Aspect 110, wherein the carbon product comprises nanoparticles, fullerenes, carbon filaments, single-walled carbon nanotubes, multi-walled carbon nanotubes, carbon nanofibers, graphene-based materials, or a combination thereof.

Aspect 115. The method of Aspect 114, wherein the carbon product comprises carbon nanofibers.

Aspect 116. The method of any of Aspect 109-Aspect 115, wherein the metal atom or metal ion comprises iron in an amount of from about 0.1 to about 10 wt % of the total weight of the catalyst and the catalyst support and molybdenum in an amount of from about 0.12 to about 6 wt % of the total weight of the catalyst and catalyst support.

Aspect 117. The method of Aspect 116, wherein the metal atom or metal ion comprises iron in an amount of 0.1 wt % to 6 wt % and molybdenum in an amount of 0.5 wt % to 6 wt % of the total weight of the catalyst and catalyst support.

Aspect 118. The method of Aspect 116, wherein the metal atom or metal ion comprises iron in an amount of 1.5 wt % and molybdenum in an amount of 4 wt % of the total weight of the catalyst and catalyst support.

Aspect 119. The method of any of Aspect 99-Aspect 118, wherein the reactor comprises a fixed bed reactor or a bubbling fluidized bed reactor.

Aspect 120. The method of Aspect 119, wherein the fixed bed reactor comprises a downdraft fixed-bed reactor.

Aspect 121. The method of any of Aspect 99-Aspect 120, wherein the feed gas comprises from 0 to 100 vol % nitrogen, from 0 to 100 vol % methane, from 0 to 20 vol % carbon dioxide, or a combination thereof.

Aspect 122. The method of Aspect 121, wherein the feed gas comprises 5 vol % methane and 95 vol % nitrogen.

Aspect 123. The method of Aspect 121, wherein the feed gas comprises 10 vol % methane and 90 vol % nitrogen.

Aspect 124. The method of Aspect 121, wherein the feed gas comprises 15 vol % methane and 85 vol % nitrogen.

Aspect 125. The method of Aspect 121, wherein the feed gas comprises 1 vol % carbon dioxide, 5 vol % methane, and 94 vol % nitrogen.

Aspect 126. The method of Aspect 121, wherein the feed gas comprises 1 vol % carbon dioxide, 10 vol % methane, and 89 vol % nitrogen.

Aspect 127. The method of Aspect 121, wherein the feed gas comprises 1 vol % carbon dioxide, 15 vol % methane, and 84 vol % nitrogen.

Aspect 128. The method of any of Aspect 99-Aspect 127, wherein the first temperature is from about 650° C. to about 1500° C.

Aspect 129. The method of Aspect 128, wherein the first temperature is about 750° C.

Aspect 130. The method of Aspect 128, wherein the first temperature is about 850° C.

Aspect 131. The method of Aspect 128, wherein the first temperature is about 900° C.

Aspect 132. The method of any of Aspect 99-Aspect 131, wherein the first time period is from about 2 to about 10 hours.

Aspect 133. The method of Aspect 132, wherein the first time period is about 4 hours.

Aspect 134. The method of any of Aspect 99-Aspect 133, wherein the reaction is repeated from at least 1 to at least 5 times.

Aspect 135. The method of any of Aspect 99-Aspect 134, wherein gas yield is at least about 80 mole % based on starting moles of the source of biomass.

Aspect 136. The method of Aspect 135, wherein gas yield is at least about 85 mole % based on starting moles of the source of biomass.

Aspect 137. The method of Aspect 135, wherein gas yield is at least about 90 mole % based on starting moles of the source of biomass.

Aspect 138. The method of any of Aspect 99-Aspect 137, wherein less than about 10 mole % char is produced based on starting moles of the source of biomass.

Aspect 139. The method of Aspect 138, wherein less than about 5 mole % char is produced based on starting moles of the source of biomass.

Aspect 140. The method of Aspect 138, wherein no char is produced.

Aspect 141. The method of any of Aspect 99-Aspect 140, wherein less than about 15 mole % tar is produced based on starting moles of the source of biomass.

Aspect 142. The method of Aspect 141, wherein less than about 10 mole % tar is produced based on starting moles of the source of biomass.

Aspect 143. The method of Aspect 141, wherein less than about 5 mole % tar is produced based on starting moles of the source of biomass.

Aspect 144. The method of any of Aspect 99-Aspect 143, wherein the syngas comprises hydrogen, carbon monoxide, carbon dioxide, methane, or a combination thereof.

Aspect 145. The method of Aspect 144, wherein the syngas comprises hydrogen, carbon monoxide, carbon dioxide, methane, or a combination thereof.

Aspect 146. The syngas of Aspect 144 or Aspect 145, wherein the syngas comprises from about 20 to about 90 mole % hydrogen.

Aspect 147. The method of Aspect 146, wherein the syngas comprises from about 30 to about 85 mole % hydrogen.

Aspect 148. The method of Aspect 146, wherein the syngas comprises about 80 mole % hydrogen.

Aspect 149. The method of any of Aspect 144-Aspect 148, wherein the syngas comprises from about 1 to about 25 mole % methane.

Aspect 150. The method of Aspect 149, wherein the syngas comprises from about 1 to about 10 mole % methane.

Aspect 151. The method of any of Aspect 144-Aspect 150, wherein the syngas comprises from about 1 to about 25 mole % carbon dioxide.

Aspect 152. The method of Aspect 151, wherein the syngas comprises from about 1 to about 10 mole % carbon dioxide.

Aspect 153. The method of any of Aspect 144-Aspect 152, wherein the syngas comprises from about 9 to about 55 mole % carbon monoxide.

Aspect 154. The method of Aspect 153, wherein the syngas comprises from about 10 to about 30 mole % carbon monoxide.

Aspect 155. The method of Aspect 153, wherein the syngas comprises from about 15 to about 20 mole % carbon monoxide.

Aspect 156. The method of any of Aspect 144-Aspect 155, wherein the ratio of $H_2$ to CO in the syngas is from about 0.5 to about 10.

Aspect 157. The method of Aspect 156, wherein the ratio of $H_2$ to CO in the syngas is from about 1 to about 8.

Aspect 158. The method of Aspect 156, wherein the ratio of $H_2$ to CO in the syngas is from about 1.5 to about 4.

Aspect 159. Syngas produced by the method of any of Aspect 99-Aspect 144.

Aspect 160. The syngas of Aspect 159, wherein the syngas comprises hydrogen, carbon monoxide, carbon dioxide, methane, or a combination thereof.

Aspect 161. The syngas of Aspect 159 or Aspect 160, wherein the syngas comprises from about 20 to about 90 mole % hydrogen.

Aspect 162. The syngas of Aspect 161, wherein the syngas comprises from about 30 to about 85 mole % hydrogen.

Aspect 163. The syngas of Aspect 161, wherein the syngas comprises about 80 mole % hydrogen.

Aspect 164. The syngas of any of Aspect 159-Aspect 163, wherein the syngas comprises from about 1 to about 25 mole % methane.

Aspect 165. The syngas of Aspect 164, wherein the syngas comprises from about 1 to about 10 mole % methane.

Aspect 166. The syngas of any of Aspect 159-Aspect 165, wherein the syngas comprises from about 1 to about 25 mole % carbon dioxide.

Aspect 167. The syngas of Aspect 166, wherein the syngas comprises from about 1 to about 10 mole % carbon dioxide.

Aspect 168. The syngas of any of Aspect 159-Aspect 167, wherein the syngas comprises from about 9 to about 55 mole % carbon monoxide.

Aspect 169. The syngas of Aspect 168, wherein the syngas comprises from about 10 to about 30 mole % carbon monoxide.

Aspect 170. The syngas of Aspect 168, wherein the syngas comprises from about 15 to about 20 mole % carbon monoxide.

Aspect 171. The syngas of any of Aspect 159-Aspect 170, wherein the ratio of $H_2$ to CO in the syngas is from about 0.5 to about 10.

Aspect 172. The syngas of Aspect 171, wherein the ratio of $H_2$ to CO in the syngas is from about 1 to about 8.

Aspect 173. The syngas of Aspect 171, wherein the ratio of $H_2$ to CO in the syngas is from about 1.5 to about 4.

Aspect 174. A catalyst composition comprising at least one metal atom, metal oxide, or metal ion.

Aspect 175. The catalyst composition of Aspect 174, wherein the metal atom or metal ion comprises nickel, iron, molybdenum, tin, zinc, copper, chromium, rhodium, cerium, an alkali metal, magnesium, manganese, platinum, palladium, ruthenium, or a combination thereof.

Aspect 176. The catalyst composition of Aspect 174 or Aspect 175, wherein the metal atom or metal ion comprises iron and molybdenum.

Aspect 177. The catalyst composition of any of Aspect 174-Aspect 176, further comprising providing contacting the catalyst with a catalyst support.

Aspect 178. The catalyst composition of Aspect 177, wherein the catalyst support comprises a metal oxide, a zeolite, a carbon product, or a combination thereof.

Aspect 179. The catalyst composition of Aspect 178, wherein the metal oxide comprises $La_2O_3$, $SiO_2$, $\alpha$-$Al_2O_3$, $\gamma$-$Al_2O_3$, MgO, $CeO_2$, $TiO_2$, $ZrO_2$, or a combination thereof.

Aspect 180. The catalyst composition of Aspect 178, wherein the zeolite comprises a ZSM zeolite.

Aspect 181. The catalyst composition of Aspect 180, wherein the ZSM zeolite comprises ZSM-5.

Aspect 182. The catalyst composition of Aspect 178, wherein the carbon product comprises nanoparticles, fullerenes, carbon filaments, single-walled carbon nanotubes, multi-walled carbon nanotubes, carbon nanofibers, graphene-based materials, or a combination thereof.

Aspect 183. The catalyst composition of Aspect 182, wherein the carbon product comprises carbon nanofibers.

Aspect 184. The catalyst composition of any of Aspect 174-Aspect 183, wherein the metal atom or metal ion comprises iron in an amount of from about 0.1 to about 10 wt % of the total weight of the catalyst and the catalyst support and molybdenum in an amount of from about 0.12 to about 6 wt % of the total weight of the catalyst and catalyst support.

Aspect 185. The catalyst composition of Aspect 184, wherein the metal atom or metal ion comprises iron in an amount of 0.1 wt % to 6 wt % and molybdenum in an amount of 0.5 wt % to 6 wt % of the total weight of the catalyst and catalyst support.

Aspect 186. The catalyst composition of Aspect 184, wherein the metal atom or metal ion comprises iron in an amount of 1.5 wt % and molybdenum in an amount of 4 wt % of the total weight of the catalyst and catalyst support.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Materials and Preparation

Catalyst Preparation

For experiments performed using zeolites, the catalyst (Zeolyst, Inc.) support was $NH_4$-ZSM-5 zeolite with a silica/alumina ratio (SAR) of 23. Ammonium molybdate (VI) tetrahydrate and iron (III) nitrate nonahydrate were purchased from Acros Organics. The zeolite catalyst was first calcined at 500° C. in air for 3 h to convert $NH_4$-ZSM-5 to H-ZSM-5. A conventional incipient wetness technique was then used to prepare Mo—Fe/ZSM-5. After drying the catalyst overnight at 105° C. to remove water, the dry powder catalyst was further calcined in air at 550° C. for 4 h. The chemical compositions of the zeolite-supported are shown in Table 1.

A carbon nanofiber catalyst impregnated with iron (Fe) and molybdenum (Mo) was used in experiments related to bi-reforming in synergistic, methane-activated biomass gasification. About 10 g of hardwood pellet biomass particles were ground and screened to a mean particle size of 300 μm and used as starting materials for the preparation of carbon nanofibers. 400 mL solutions containing 0.01 M $Fe^{3+}$ and 0.01 M $Mo^{6+}$ were prepared from iron (III) nitrate nonahydrate and ammonium molybdate (VI) tetrahydrate salts, respectively. These solutions were mixed with biomass particles and stirred for about 4 hours using a magnetic stirring hot plate. The mixture was allowed to dry for about 24 hours. Dried wood chips impregnated with Fe and Mo prepared as described were then pyrolyzed using a tubular fixed bed reactor at 700° C. with 200 sccm of nitrogen ($N_2$). This pyrolysis of metal impregnated wood chips led to nanofiber formation due to thermal cracking of the biomass, which, along with devolatilization, led to deposition of carbon. The chemical composition of the CNF-supported catalyst used in the following experiments is shown in Table 1 below.

TABLE 1

Impregnation of Mo and Fe on ZSM-5 or CNF

| Catalyst | Support | Mo | Fe |
|---|---|---|---|
| FeMo1 | ZSM-5 | 4 wt % | 0.5 wt % |
| FeMo2 | ZSM-5 | 4 wt % | 1.5 wt % |
| FeMo—CNF | CNF | 4 wt % | 1.5 wt % |

Elemental composition of the hardwood biomass used in all experiments presented herein is shown in Table 2 below.

TABLE 2

Elemental Composition, Moisture, and Ash Wt % of Hardwood Biomass

| Carbon | Hydrogen | Oxygen | Moisture | Ash |
|---|---|---|---|---|
| 45.25 | 4.65 | 49.2 | 7.16 | 0.32 |

Reaction Conditions

The following general reaction conditions and procedures were employed throughout the examples that follow. Changed parameters (e.g., temperature, etc.) are noted where applicable.

Catalytic hardwood-pellet biomass gasification was performed in a downdraft fixed bed reactor (12.7 mm diameter, 915 mm long) stainless steel (316SS) reactor tube (Charleston Valve and Fitting Co.). In a typical experimental test, 0.75 g of Mo—Fe/ZSM-5 catalyst was premixed with 1 g lignocellulose hardwood-pellet biomass. Biomass was ground and screened to a mean particle diameter of 432 μm. This particle size was selected to maintain consistency with a bench-scale continuous-bubbling fluidized-bed reactor that was used for some experiments.

A Carbolite furnace was used for some high temperature reactions using a programmable controller. Reactor bed temperature was measured using a K-type thermocouple (Omega™) Prior to loading into the reactor, the zeolite catalyst was subjected to reduction with 10 vol. % hydrogen ($H_2$) with nitrogen ($N_2$) at 600° C. for 3 h; the carbon nanofiber-based catalyst did not require further reduction.

After reduction (if performed), catalyst and biomass were mechanically mixed in a ratio of 0.75:1. Nitrogen total flow of 300 sccm was maintained while the temperature was raised from room temperature to 100° C. After moisture and air removal from the reactor, a constant flow of 300 sccm with the desired methane concentration was maintained until the reactor pressure reached 50 psig. A fixed bed temperature ramp from 100° C. to the reaction temperature was initiated; ramp rate was 20° C./min. Reactor valves were shut until the temperature ramp was complete. This method was further adapted for replication of continuous feeding of biomass in a fluidized bed or moving bed reactor at the reaction temperature.

In reactions involving $CO_2$ in the gas feed, the fixed-bed reactor tube was filled to 50 psig with a mixture of 10 sccm methane, 2 sccm carbon dioxide, and 188 sccm nitrogen. Once the reactor bed was filled to the required pressure, a 10° C./min temperature ramp was used to reach the desired temperature. Depending on reaction temperature, reactor pressure varied and was about 250 psig for 750° C. reactions, 380 psig for 850° C. reactions, and 420 psig for 900° C. reactions.

It was observed through elemental composition analysis of hardwood lignocellulosic biomass that oxygen accounts for 49 wt % of the biomass on a dry basis (Table 2). Therefore, for hydrogen-rich syngas production, an external source of oxygen is not required for typical biomass. With the use of an external oxygen as gasifying agent such as $CO_2$ or $H_2O$, it was observed that when >5 vol % of $CO_2$ was added along with 5 vol % $CH_4$ in the catalyst-biomass system, high concentrations of CO and $CO_2$ were observed in the product gas. However, 1% $CO_2$-5% $CH_4$ with biomass on Fe—Mo/ZSM-5 and Fe—Mo/CNF catalysts produced an $H_2$:CO ratio of 2. $CO_2$ thermal activation occurs in the neighborhood of atomic hydrogen (from methane, biomass) on the catalyst active sites. Moreover, external steam addition would lead to direct steam methane reforming thus hindering the possible synergy between natural gas and biomass.

Sample Analysis

Preliminary biomass gasification studies were also performed using a thermogravimetric analyzer (TGA) instrument (TA Instruments—Waters LLC, Model SDT 650). Reaction conditions in the TGA were similar to conditions in the fixed-bed reactor. Reactions were performed at several temperatures ranging from 750° C. to 950° C. Helium was used as the carrier gas for these tests. Continuous product composition analysis was performed by a mass spectrometer connected downstream. Sample size for a typical test varied from 20 mg for biomass without catalyst to 70 mg for biomass-ZSM-5.

Product gases collected in 0.5 L Tedlar sampling bags (SKC, PA, USA) from the fixed bed reactor tests were analyzed using a four-column gas chromatograph (Inficon Fusion Micro-GC). The four columns consisted of a molecular sieve with a 3 m long PLOT U pre-column, an 8 m long RT-PLOT U with a 1 m long PLOT Q pre-column, an 8 m long aluminum column, and a 20 m long RTX-1. The four columns allowed for calibrated (ppm level) detection of hydrogen, methane, carbon monoxide, carbon dioxide (complete syngas profile), ethylene, ethane, acetylene, water, nitrogen, and ammonia. All gases used for calibration were ultra-high purity (UHP) grade and were obtained from AirGas.

Example 2: Gasification Over Time and Dependence on Temperature

Figure 1:
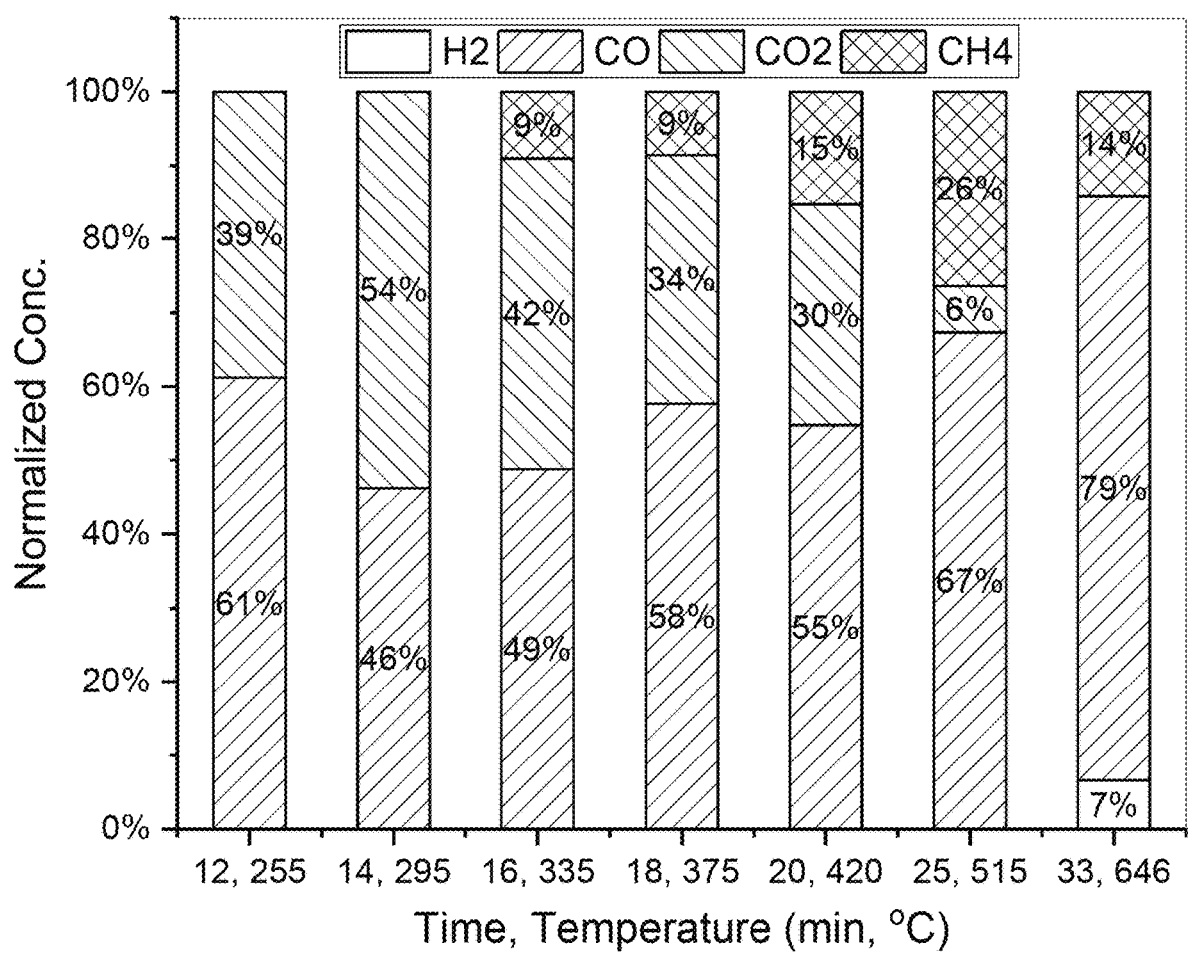
FIG. 1 shows representative results of biomass gasification over time using a disclosed process. Biomass used in these experiments was a hardwood pellet; heating rate was 20° C./min to 650° C., followed by holding the reactor at 650° C. for 30 min. Horizontal axis values are time in minutes, ° C. Helium flow was 100 sccm.

The TGA-MS instrument was used to perform the initial biomass gasification screening tests to identify temperature range for hydrogen and carbon monoxide evolution. A hardwood pellet as described previously was used as biomass, with an initial heating rate of 20° C. followed by holding for 30 min at 650° C., with 100 sccm helium flow. FIG. 1 shows the concentration profile versus time of the four major syngas components obtained from the TGA-mass spectrometry studies. For devolatilization and gasification at 650° C., only 7% $H_2$ yield was obtained. CO and $CO_2$ made up most of the gas yield obtained at temperatures less than 300° C. with methane evolving beyond 300° C., possibly indicating thermal cracking of the array of oxygenated aromatic rings in the lignin structure of biomass was occurring.

As methane started appearing in the gas products, carbon dioxide yield began to fall and only 6% carbon dioxide remained at 515° C. This suggested that the reverse steam methane reforming (SMR) reaction dominated between 335° C. and 515° C., where all the hydrogen that was bonded to saturated and/or unsaturated carbon in biomass reacted with the $CO_2$ from devolatilization and thermal cracking, forming CO. Higher CO concentrations were detected at higher temperatures as the char oxidation reaction began to occur. Hydrogen started to appear as a predominant species in the normalized concentrations obtained from the mass spectrometry ionization signals only after a threshold temperature of about 650° C.

Figure 2:
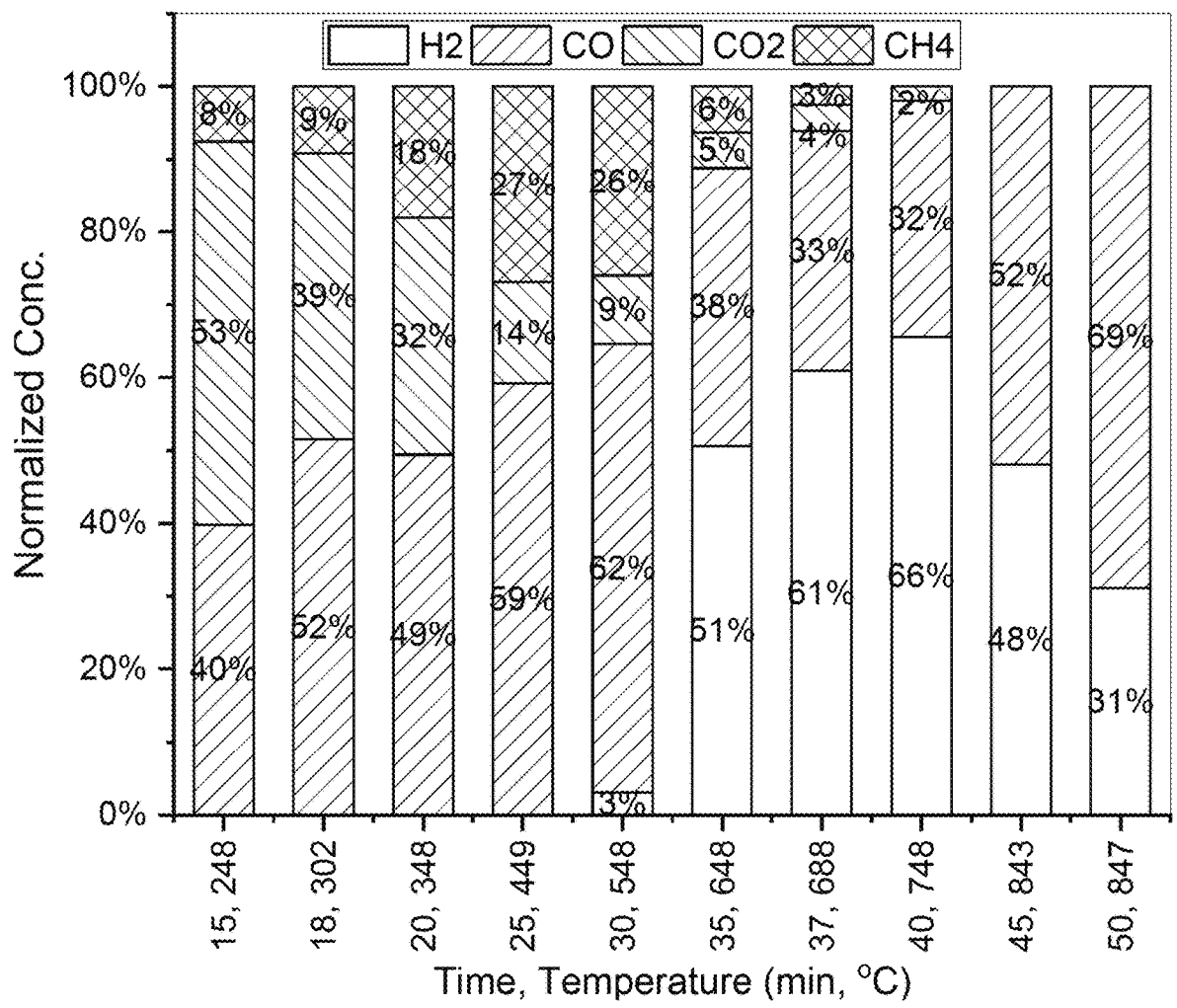
FIG. 2 shows representative results of biomass gasification over time using a disclosed process. Biomass used in these experiments was a hardwood pellet; heating rate was 20° C./min to 850° C., followed by holding the reactor at 850° C. for 30 min. Horizontal axis values are time in minutes, ° C. Helium flow was 100 sccm.
Figure 3:
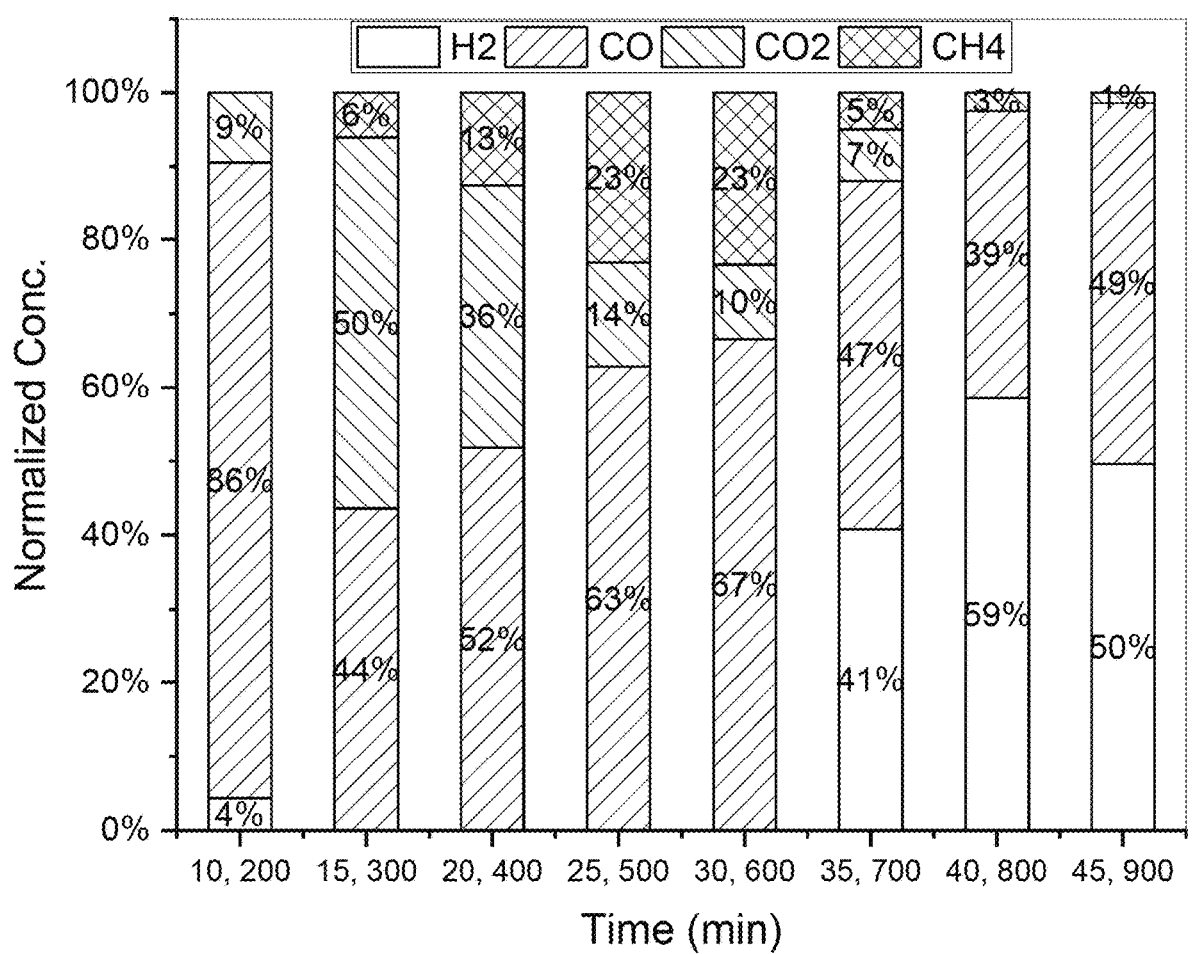
FIG. 3 shows representative results of biomass gasification over time using a disclosed process. Biomass used in these experiments was a hardwood pellet; heating rate was 20° C./min to 950° C., followed by holding the reactor at 950° C. for 30 min. Horizontal axis values are time in minutes, ° C. Helium flow was 100 sccm.

Results in FIG. 2 (hold temperature 850° C.) and FIG. 3 (hold temperature 950° C.) show that between 650° C. and 950° C., hydrogen and carbon monoxide constituted most of the gas yield. This indicated that, without an oxidative atmosphere, devolatilization and bio-char formation occurred between 200° C. and 600° C. In the TGA tests, the biomass sample size was too small (~20 mg) to trace tar formation. In the alumina crucible used for these experiments, only ash residue was observed with the end weight of the tared crucible being around ~0.5 mg $CH_4$ constituted more than 30 mol. % of the product gas between 450 and 550° C. which possibly indicated the thermal cracking of light to moderately heavy aromatics such as phenols to $CH_4$, $CO_2$, and CO. Up to 700° C., product composition was dominated by CO which decreased from 45 to 29 mol % at around 700° C. $H_2$ increased from just 36 to 60 mol % at 700° C. and 790° C., respectively. The maximum $H_2$:CO ratio obtained at 800° C. was 2. This analysis is shown in FIG. 24.

The isothermal reaction time at the test temperatures was sufficient to completely gasify bio-char. Char gasification reactions were observed at higher temperatures, evident by the high $H_2$:CO and CO/$CO_2$ ratios at temperatures beyond 650° C.-700° C. as shown in Table 3 below.

TABLE 3

$H_2$:CO and CO:$CO_2$ Ratios of TGA Biomass Gasification Tests

| Temperature (° C.) | $H_2$/CO | CO/$CO_2$ |
|---|---|---|
| 750 | 1.87 | 16.2 |
| 850 | 1.1 | N/A |
| 950 | 1.1 | 23 |

Surprisingly, no methane formation was observed at char gasification temperatures (650° C.-950° C.), possibly indicating a Boudouard reaction was occurring (Equation 1), converting carbon to CO due to its highly endothermic nature:

$$C+CO_2 \rightleftharpoons 2CO \quad \Delta H_{298K}°=172 \text{ kJ/mol} \quad \text{(Equation 1)}$$

Similarly, a sharp increase in $H_2$ and improvement in $H_2$/CO ratio may also be due to continuous heat being supplied, thus driving the endothermic gasification reactions forward. Between 650° C. and 950° C., methane was not observed in the product, probably because of reforming with water or $CO_2$, which is evidenced by the increase in CO and $H_2$ concentrations shown in FIG. 3 (see also Equations 2 and 3).

$$CH_4+H_2O \rightleftharpoons CO+H_2 \text{ (steam reforming)}$$
$$\Delta H_{298K}°=206 \text{ kJ/mol} \quad \text{(Equation 2)}$$

$$CH_4+CO_2 \rightleftharpoons 2CO+H_2 \text{ (dry reforming) } \Delta H_{298K}°= 247 \text{ kJ/mol} \quad \text{(Equation 3)}$$

Typically, methane decomposition occurs at temperatures higher than 1000° C. in the absence of a catalyst. Due to the presence of mineral materials in biomass, the methane decomposition reaction cannot be ruled out here. The proportion of tar in dry woody biomass ranges between 5-12 mg/g (0.5-1.2 wt % on a dry basis) of dry biomass. With only 20 mg of biomass in the TGA tests, possibility of traceable tar formation is very low. Endothermic equilibrium reactions in the regime of char gasification and homogeneous volatile reactions may have pronounced effects on the $H_2$:CO and CO/$CO_2$ ratios.

Example 3: Reactions Using Zeolite Catalysts

Figure 4:
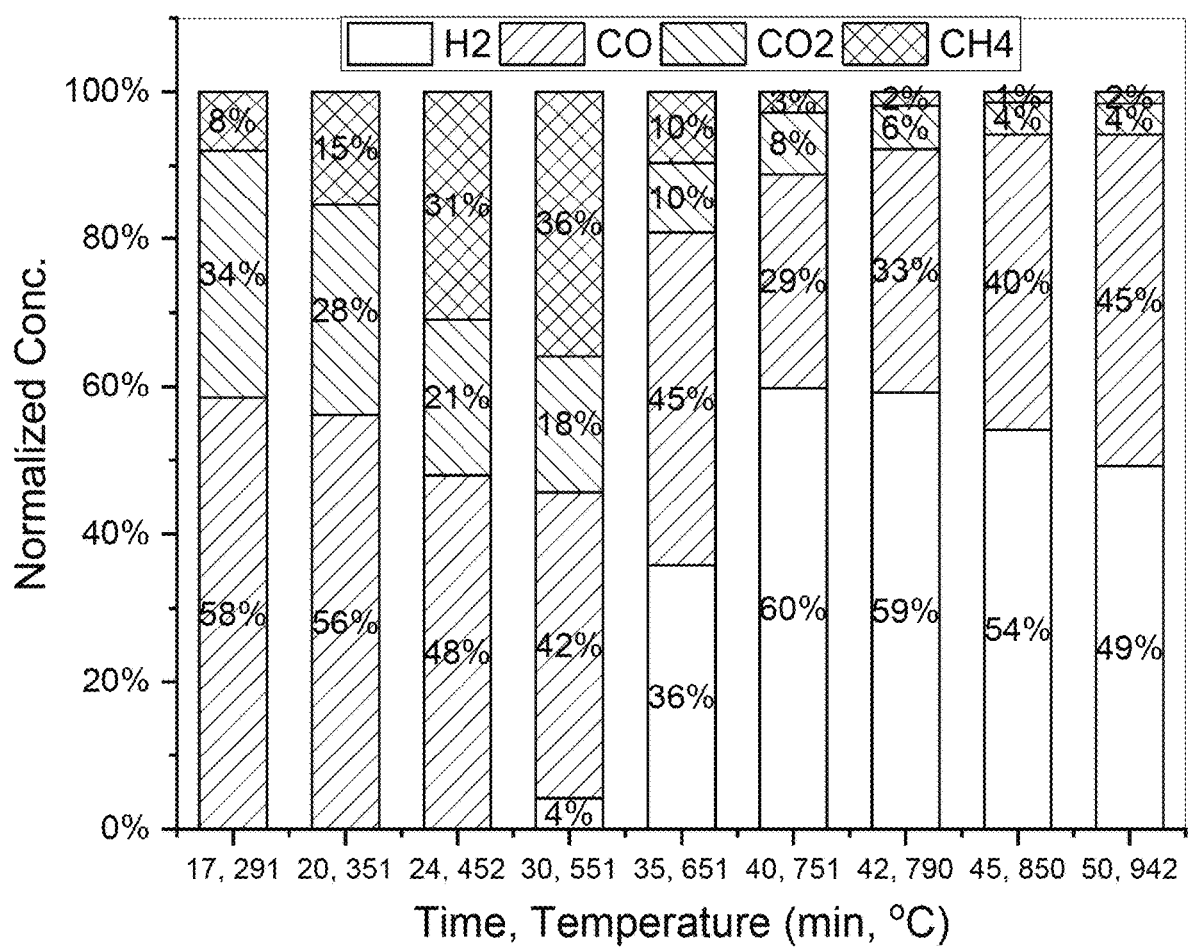
FIG. 4 shows representative results of biomass gasification over time using a disclosed process. Biomass used in these experiments was a hardwood pellet and was mixed with ZSM-5; heating rate was 20° C./min to 650° C., followed by holding the reactor at 650° C. for 30 min. Horizontal axis values are time in minutes, ° C. Helium flow was 100 sccm.

In some experiments, TGA test were performed using biomass was mixed with ZSM-5 and gasified under identical reaction conditions as used in the previous TGA tests (FIG. 4). It was observed that the $H_2$:CO ratio improved significantly at 750° C.-800° C. The presence of ZSM-5 may have enabled cracking reactions at higher temperatures. Notably, a high concentration of methane was observed between 450° C. and 550° C., indicating hydrogenation of higher aromatics and some aliphatic chains forming almost as much $CH_4$ as CO at ~400° C. More CO and $H_2$ was observed as temperature in the reactor increased. This indicated that the presence of a catalyst like zeolite helped to improve syngas quality with in situ tar reformation and cracking. The fixed-bed reactor biomass and methane-biomass gasification reactions used a significantly different reaction environment, heat flux, and heat flux direction than the TGA sample crucible. For example, the fixed bed reactor operated as a downdraft gasifier, whereas gas flow was horizontal in the case of TGA. The interaction between catalyst active sites, char, and gaseous products was also different in the case of the fixed bed reactor compared to the TGA experiments. However, TGA provided a better study of the evolution and profiles of possible gasification reactions occurring in a reactor like the fixed-bed studies presented in later Examples.

Catalytic and Non-Catalytic Biomass Gasification

Figure 12:
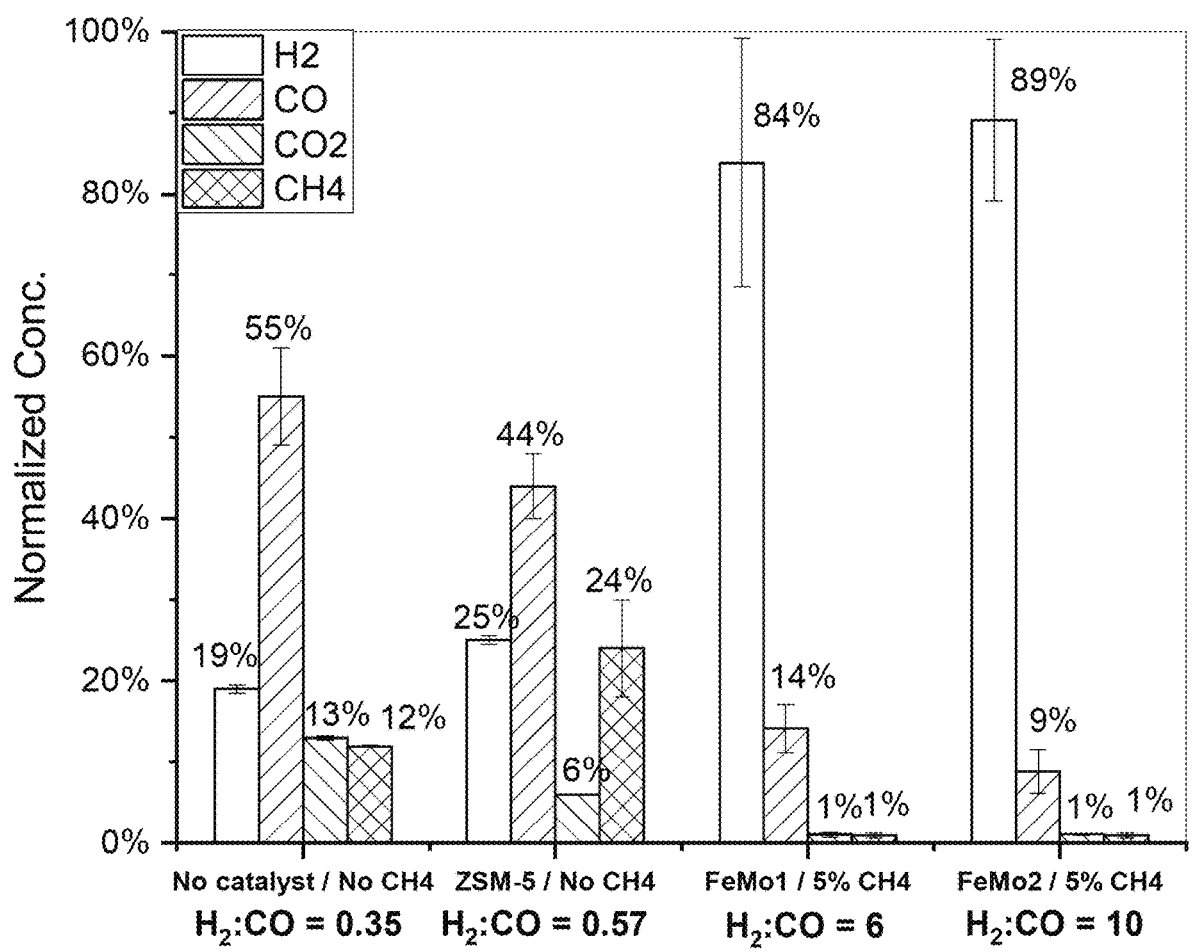
FIG. 12 shows representative biomass gasification without catalyst and without external methane, biomass gasification on ZSM-5 catalytic support and without methane, and methane-activated biomass gasification with 5 vol % methane on two different catalysts (i.e., FeMo1 and FeMo2) using a disclosed process.
Figure 13:
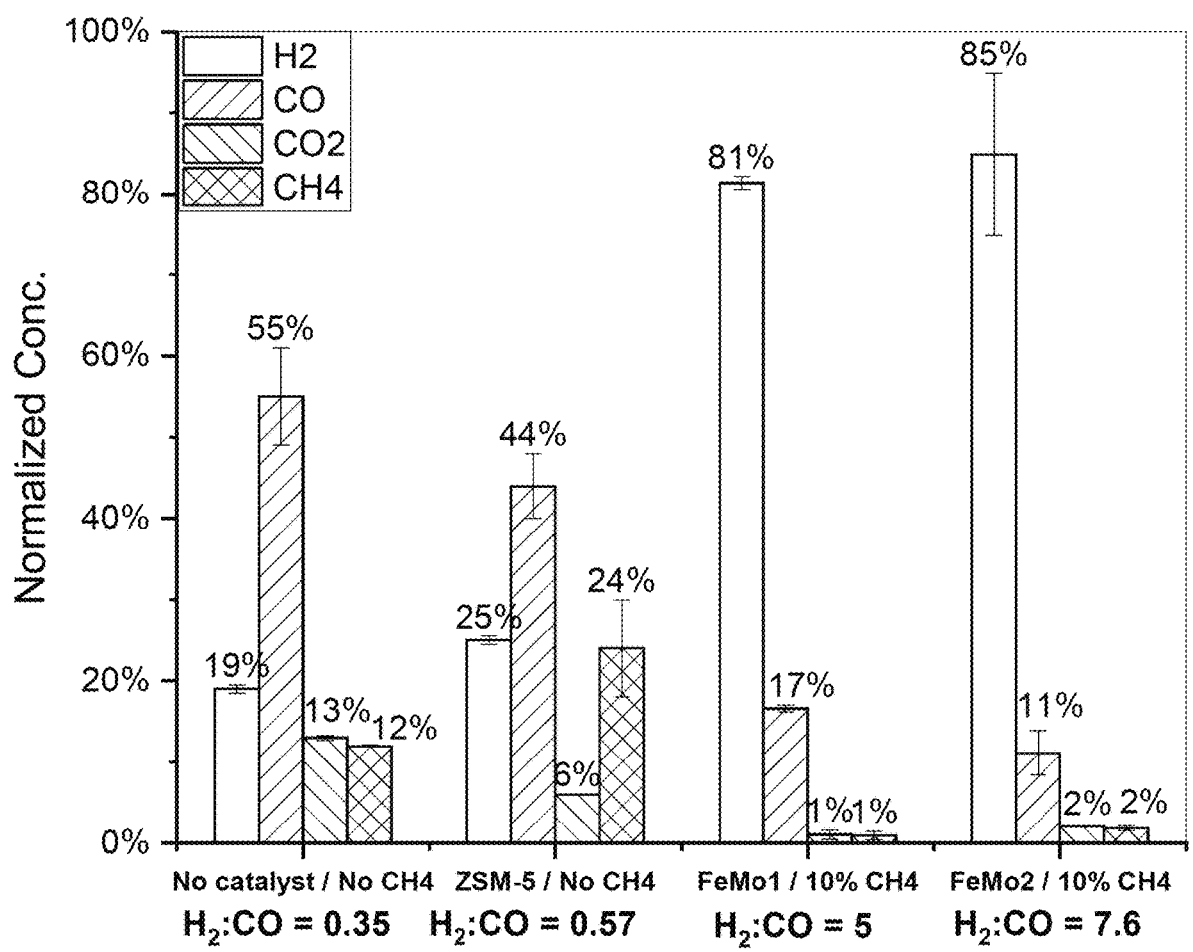
FIG. 13 shows representative biomass gasification without catalyst and without external methane, biomass gasification on ZSM-5 catalytic support and without methane, and methane-activated biomass gasification with 10 vol % methane on two different catalysts (i.e., FeMo1 and FeMo2) using a disclosed process.

FIGS. 12 and 13 compare the product composition and $H_2$:CO ratios for hardwood biomass gasification without catalyst and external methane, biomass gasification on ZSM-5 catalytic support without methane, and methane activated biomass gasification with 5 vol % and 10 vol % $CH_4$ on FeMo1 and FeMo2 catalysts. Biomass-only gasification was performed non-catalytically and on ZSM-5. On FeMo1 and FeMo2 catalysts, biomass-methane experiments were performed with methane concentrations of 5% and 10%. The $H_2$:CO ratio on ZSM-5 more than doubled compared to a typical non-catalytic test. This indicated that the presence of acid sites on ZSM-5 along with Fe active sites provide favorable atmosphere for the water gas shift and SMR reactions. The addition of Fe and Mo to ZSM-5 leads to the synergistic interaction between methane and biomass to produce hydrogen rich syngas. $H_2$:CO increases significantly when methane-biomass gasification was performed on FeMo1 and FeMo2 catalysts. With 5% $CH_4$ in the gas feed, an $H_2$:CO ratio of ~7 was obtained on FeMo1 which increased further to 10 on the FeMo2 catalyst. With 10% $CH_4$ in the feed, $H_2$:CO ratio is lower than that for 5% $CH_4$, at 5 for FeMo1 and ~8 for FeMo2, respectively. Lower $H_2$:CO ratios observed for higher methane concentrations may be due to rapid catalyst deactivation due to coke deposition at high temperature.

Figure 14:
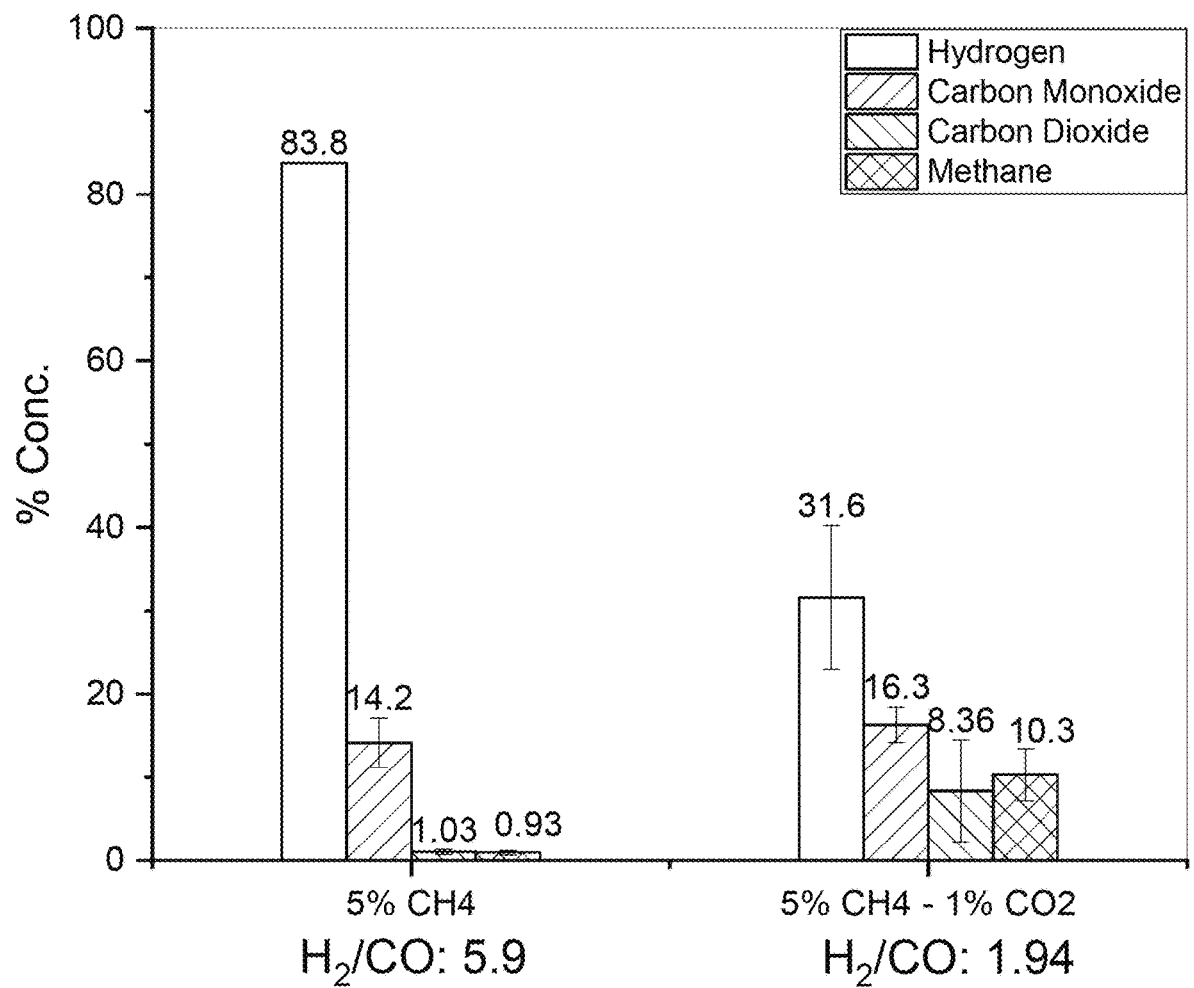
FIG. 14 shows representative data comparing methane and methane/carbon dioxide activated hardwood biomass gasification at 850° C. with gas feed composition as follows: $CH_4$=10 sccm, $CO_2$=2 sccm (when used), $N_2$=188 sccm, and catalyst 0.5% Fe-4% Mo/ZSM-5. Vol % methane and/or carbon dioxide is shown on the horizontal axis using a disclosed process.

FIG. 12 (first two sets of bars, with no catalyst/no methane and ZSM-5/no methane) and FIG. 14 show comparison of product gas composition obtained with biomass, biomass-methane, and biomass-methane-carbon dioxide gasification at 850° C. Without a catalyst or catalyst support, biomass gasification yields low $H_2$:CO ratio of 0.35. Based on the molar composition of atomic carbon and hydrogen in biomass, the expected $H_2$:CO ratio is between 0.5 and 1. However, without a catalytic support, thermal cracking dominates over gasification reactions, thus producing more methane and carbon dioxide. When identical reaction conditions were subjected to biomass mixed with ZSM-5 zeolite support, $H_2$:CO ratio improved from 0.35 to 0.57, indicating gasification reactions like high temperature water gas shift (HT-WGS) became dominant.

A similar biomass gasification reaction was performed in a fixed bed reactor setup in the absence of $CH_4$ on a Fe—Mo/ZSM-5 catalyst. In the absence of $CH_4$, biomass gasification yield in a fixed bed reactor averaged 55 and 58 mol % of $CH_4$ for the reaction at 850° C. and 950° C., respectively (FIG. 25). A $H_2$:CO ratio between 0.5 and 1.0 was obtained which was about in the range of conventional, non-catalytic gasification.

As it is clear from biomass-only gasification with and without support, an external hydrogen source is required to hydrogenate and reduce tar as well as carbon monoxide formation from oxygenates. Hydrodeoxygenation is an important sequence of reactions that is needed to upgrade biomass for thermochemical conversion to product synthesis gas and hydrogen rich product gas. Methane is the major constituent of natural gas produced in the US and could be used as a source of hydrogen for the deoxygenation and upgrade of biomass. However, methane is thermodynamically difficult to activate without transition metal catalysts at high temperatures.

FeMo-ZSM-5 catalysts with compositions described in Table 1 were used for methane activated and methane-carbon dioxide-activated biomass gasification studies (FIG. 14). It was observed that the addition of methane caused a sharp increase in hydrogen production with as much as 84% hydrogen concentration in the product gas mixture at 850° C. and 5 vol % $CH_4$. Hydrogen rich product gas is evidently the result of the steam methane reforming reaction dominating over other reactions. Steam adsorbates that are believed to cause reforming of methane are likely obtained from hydrodeoxygenation of alcohols, phenols, carbonyls, and carboxylic acids in biomass.

Hydrogen-rich product gas is suitable for hydrogen production with evident synergy in natural gas-biomass co-processing. However, for the synthesis of valuable chemicals including aromatics like benzene, toluene, ethylbenzene, and xylene (BTEX), it is important to produce synthesis gas with an $H_2$:CO ratio of between 2 and 2.5.

Several adjustments of experimental parameters were considered in order to achieve the desired $H_2$:CO ratio. Steam addition was considered; however, external high pressure steam addition would directly cause methane reforming, lowering the conversion of biomass and likely producing more hydrogen. Direct steam methane reforming would thermodynamically overshadow the methane-biomass synergy. The addition of even a small amount of external oxygen would cause direct combustion of biomass and methane at high temperatures. One of the best ways to obtain external oxygen at high temperatures is the thermal activation of carbon dioxide over a transition metal catalyst. Iron has been reported as one of the best transition metals for carbon dioxide activation at high temperatures. It is clear from the results presented herein that methane-carbon dioxide activation on FeMo-ZSM-5 produces syngas having the desired quality of an $H_2$:CO ratio of 2 (FIG. 14). However, adding 1 vol % $CO_2$ helps produce synthesis gas by catalytically activating methane and carbon dioxide.

Example 4: Zeolite Versus Carbon Nanofiber Catalyst Support

A Hitachi Scanning Electron Microscope (SEM) S-4700 was used for imaging fresh and spent Fe—Mo carbon nanofiber catalysts at with a voltage of 10 to 15.0 kV at a working distance around 12.0 mm with the electron current between 10 μm to 18 μm.

Figure 15:
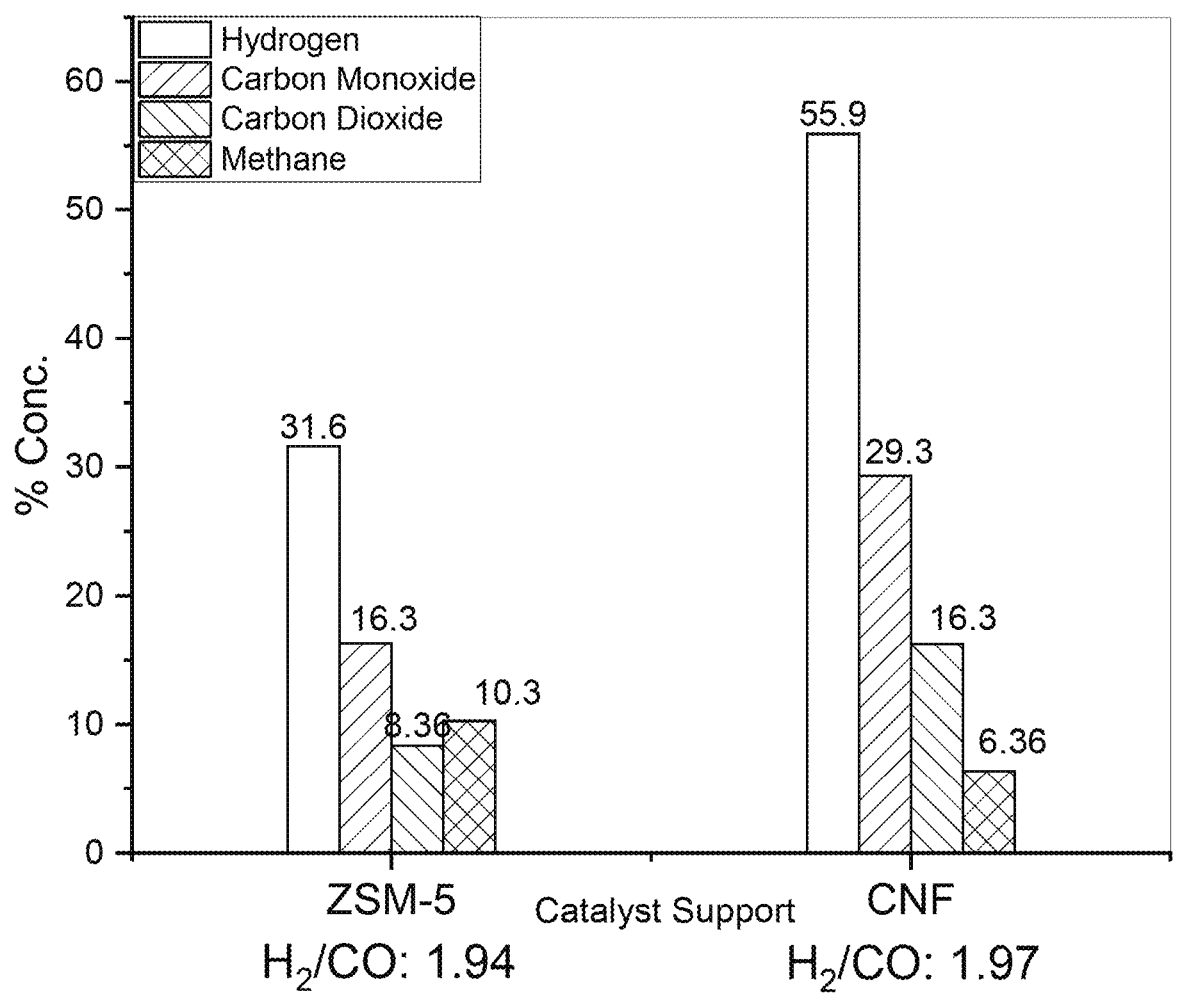
FIG. 15 shows representative data comparing a syngas composition based on catalyst supported by zeolite (ZSM-5) versus carbon nanofibers (CNF) at 850° C. with gas feed composition as follows: $CH_4$=10 sccm, $CO_2$=2 sccm, $N_2$=188 sccm, and catalyst 0.5% Fe-4% Mo using a disclosed process.
Figure 16:
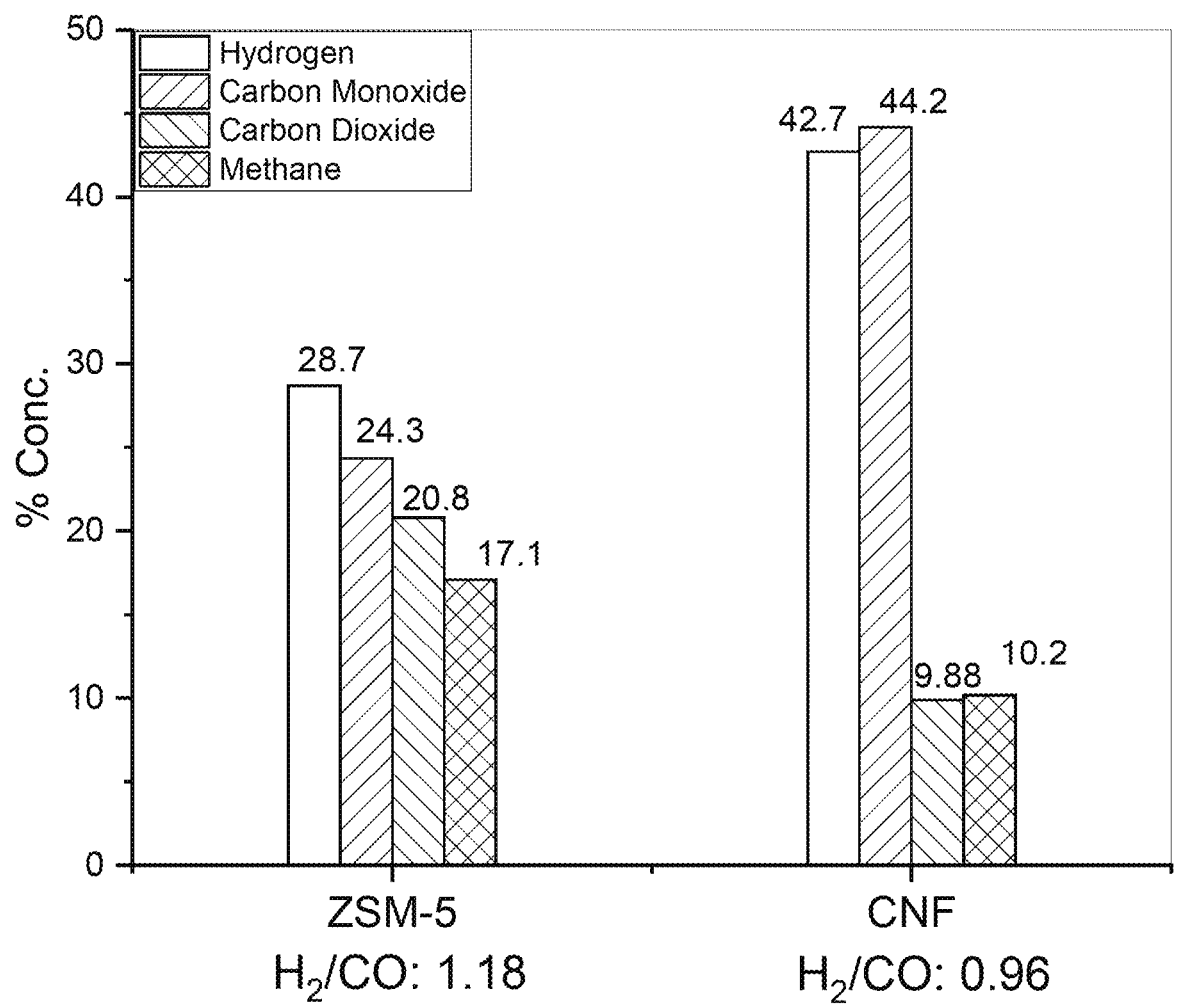
FIG. 16 shows representative data comparing a syngas composition based on catalyst supported by zeolite (ZSM-5) versus carbon nanofibers (CNF) at 750° C. with gas feed composition as follows: $CH_4$=10 sccm, $CO_2$=2 sccm, $N_2$=188 sccm, and catalyst 0.5% Fe-4% Mo using a disclosed process.
Figure 20:
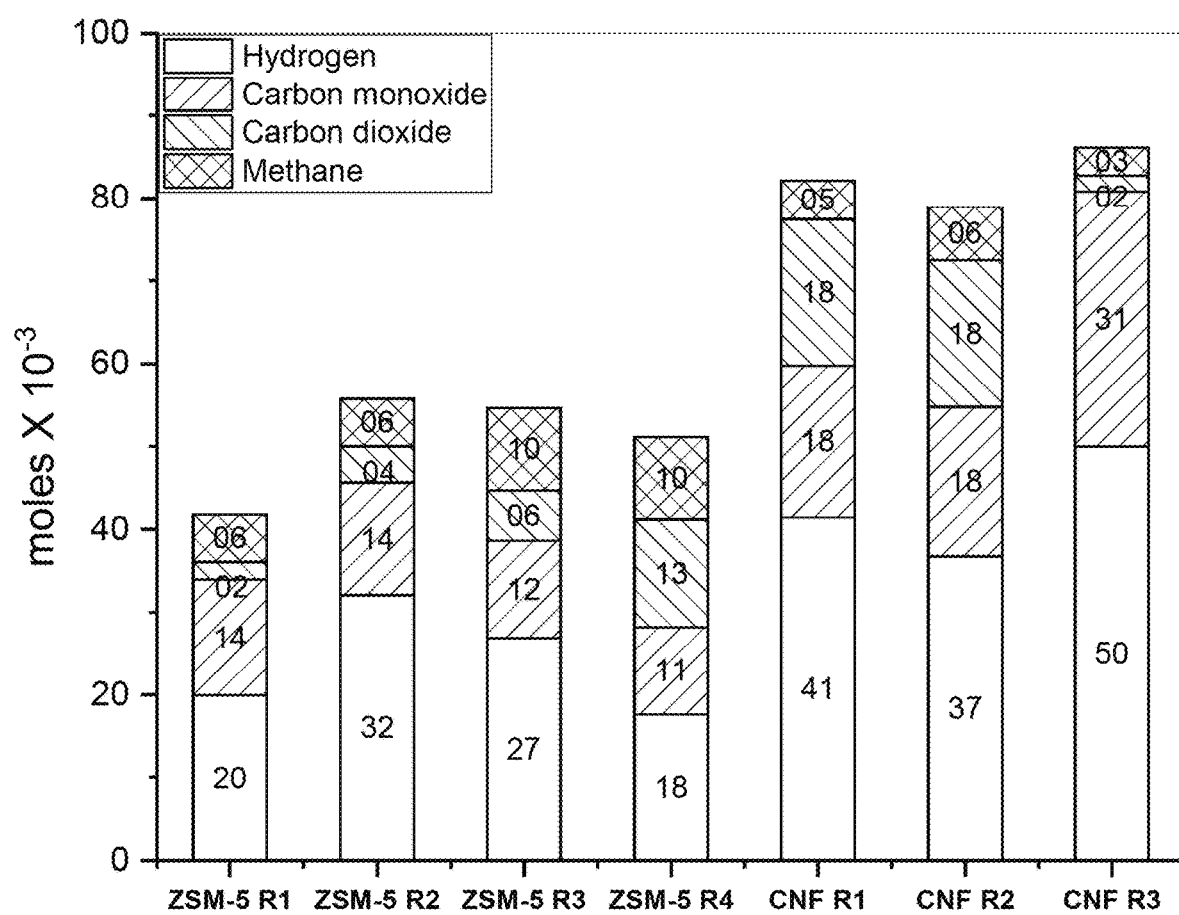
FIG. 20 shows representative molar yields of hydrogen, carbon monoxide, carbon dioxide, and methane using ZSM-5 or CNF supports for catalysts using a disclosed process. Temperature was 850° C. with gas feed composition as follows: $CH_4$=10 sccm, $CO_{2=2}$ sccm, $N_2$=188 sccm, and catalyst 0.5% Fe-4% Mo/CNF. Horizontal axis labels indicate catalyst support and round or reaction number (i.e., R1=first round, R3=third round, and so on).

FeMo catalyst support has a significant effect on overall reaction yield, if not so much on the gas composition of syngas species. For example, at 850° C., both FeMo-ZSM-5 and FeMo-CNF produced syngas with identical $H_2$:CO ratios (1.94 vs. 1.97, see FIG. 15). At a lower reaction temperature of 750° C., the $H_2$:CO ratio in the product gas was lower for FeMo-CNF than for the FeMo-ZSM-5 catalyst (0.96 and 1.18 respectively, see FIG. 16). However, overall gas yield for the ZSM-5 based reaction was significantly lower than CNF at both 850° C. and 750° C. On average, the FeMo-ZSM-5 reaction produced only about 55 millimoles of product gas ($H_2$, CO, $CH_4$, $CO_2$), whereas the FeMo-CNF catalyst-based reaction produced 80 millimoles of product gas on average as shown in FIG. 20. Numbers of moles of product gases obtained in these reactions were calculated based on inert gas and reaction pressure at given temperature. It can be conclusively said that for methane-carbon dioxide-biomass reaction system, catalyst support has a profound effect on the overall gas yield.

Molar yields from methane-carbon dioxide activated biomass gasification at 850° C. for tests conducted on FeMo-ZSM-5 and FeMo-CNF catalysts are shown in FIG. 20. Molar gas yield on the FeMo-CNF catalyst was on average 45% higher than that on the FeMo-ZSM-5 catalyst. Moles of product gas species were calculated based on molar volume of one mole of gas at temperature and reaction pressure. High turnover frequency is achievable on CNF based catalyst as it provides a much larger surface area for adsorption. Deactivation on CNF based catalyst is also much slower compared to ZSM-5 based catalyst due less coke deposition, better absorption of the deposited coke due to topography, and structural strength. Yields of gases and liquid tar are shown in Table 4 below.

TABLE 4

Average Yield in % Moles Based on Starting Total Mol of Biomass, CH$_4$, and CO$_2$

| Temperature | Gas Yield (% Moles) | mmol Tar |
|---|---|---|
| 750° C. | 37.5 | 54 |
| 850° C. | 88.2 | 10 |
| 900° C. | 98.5 | 2 |

SEM Characterization of Catalysts

Figure 17A:
FIGS. 17A-17B shows representative SEM images of FeMo catalysts on different supports.
Figure 17B:
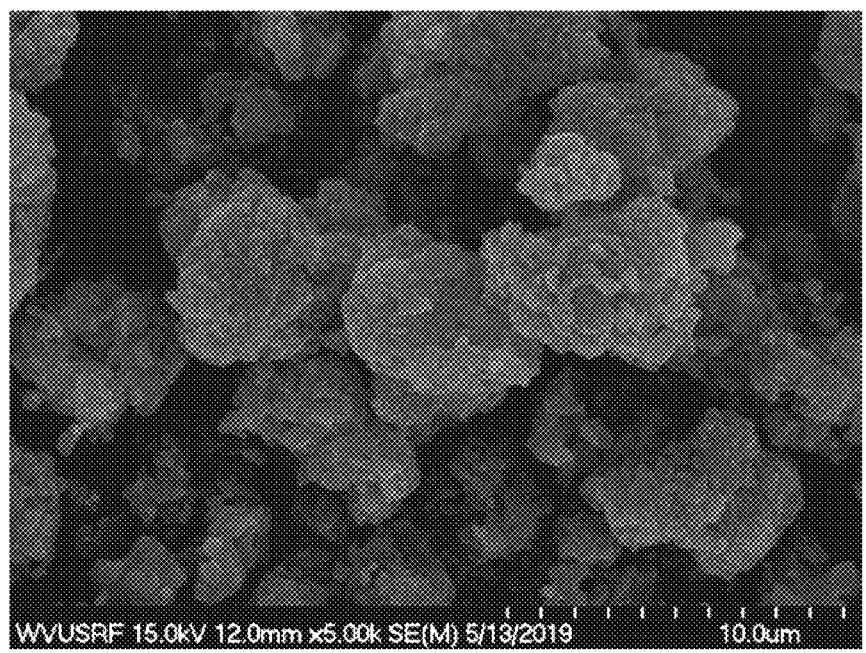

SEM characterization of the fresh FeMo-ZSM-5 and FeMo-CNF catalysts is presented in FIG. 17. In FIG. 17A, FeMo-CNF catalyst is observed at a larger scale of 10 µm; nanofiber and nanowire structures are highly intertwined. Although nanofibers are observed to be of a larger diameter (100 to 1000 nm), fine nanowire type structures in the subsurface of the CNF which are much smaller in diameter (<100 nm) are also present. The labyrinth of thick nanofibers and nanowires provides essential depth to the surface, thus increasing the surface area. A larger surface area provides more resistance to sintering and consequential permanent deactivation of the surface. Unlike the CNF, Fresh ZSM-5 based catalyst (FIG. 17B) contains clusters of zeolite agglomerates. It is evident by mere observation that ZSM-5 has much less surface area than the CNF. Furthermore, the CNF nanofiber-nanowire structure likely provides better adsorption through interlocking of adsorbed reactant species, thus allowing better contact.

Additionally, CNF has enough surface area to allow for deposition of unreacted carbon and ash. On ZSM-5, coke and ash deposition occur on the zeolite, thereby blocking the reactants. Upon examination of the respective topographies and morphologies of CNF and ZSM-5, CNF based catalyst has more depth and greater surface area compared to ZSM-5, which could make it less prone to deactivation at high temperatures. Higher gas yields with CNF-based supports can be explained by higher turnover frequency and/or higher reaction rates due to the structure of CNF. Although H$_2$:CO ratio is almost identical at 750° C. for FeMo-CNF and FeMo-ZSM-5 (FIG. 16), methane and carbon dioxide constitute ~42% of the total gas yield in the FeMo-ZSM-5 reaction, whereas they constitute only about 19% in the FeMo-CNF reaction. This indicates higher conversion of methane and carbon dioxide to hydrogen and carbon monoxide through several reactions including water gas shift, CO$_2$ dry reforming, and steam methane reforming. Higher conversion is a good indicator of higher turnover frequency, thus supporting the greater efficacy of CNF compared to ZSM-5 for the process disclosed herein.

Reaction Yield After Multiple Rounds of Gasification

The FeMo-CNF and ZSM-5 catalysts were subjected to multiple rounds of use at identical reaction conditions (T=850° C., 5% CH$_4$, 1% CO$_2$), with a similar syngas composition being obtained each time (see FIG. 20, where R1, R2, etc. signify separate reaction rounds).

Figure 5:
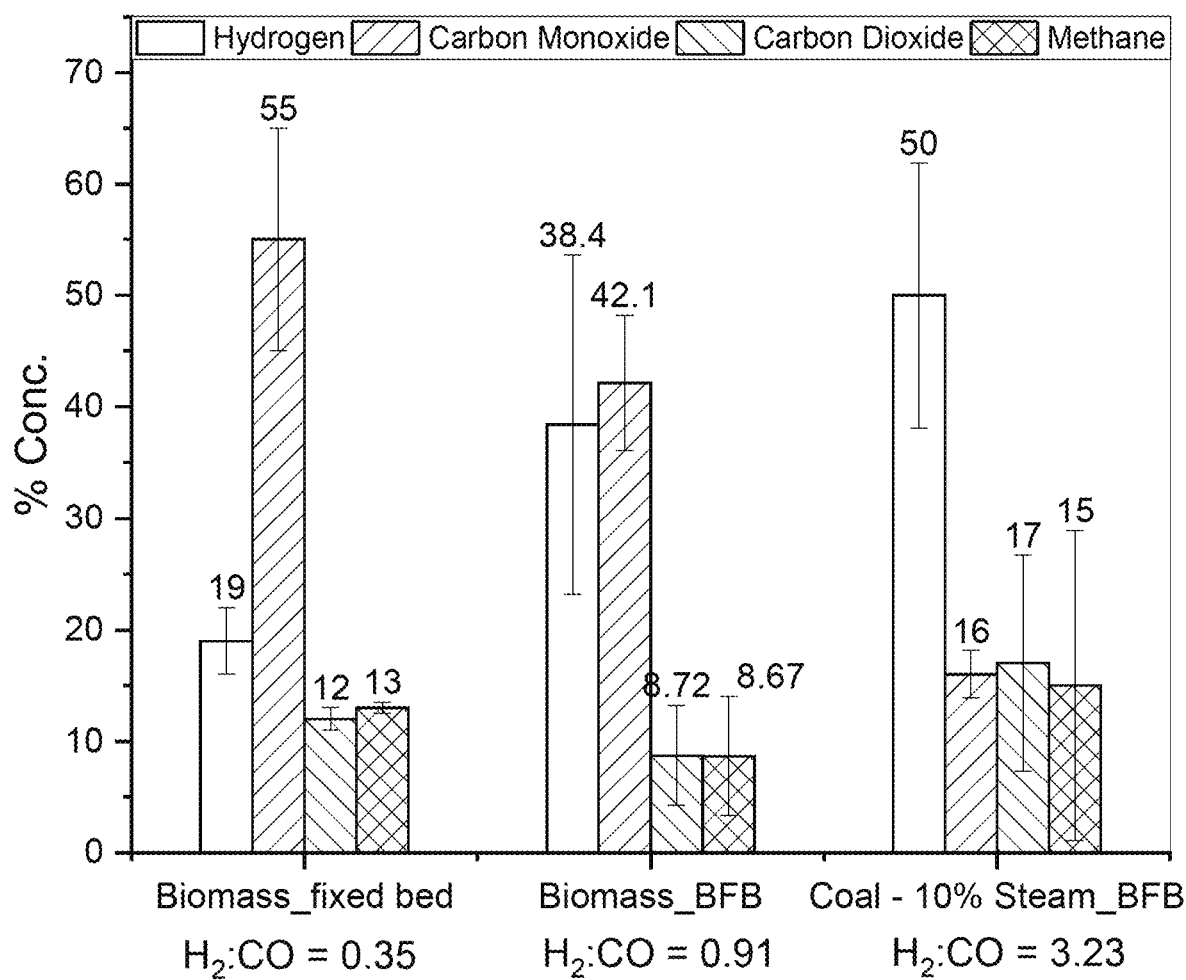
FIG. 5 shows representative biomass gasification in a fixed bed reactor compared to coal gasification in a fixed bed reactor using 10% steam using a disclosed process.

Example 5: Addition of Methane to Reactor Gas Feed and Effect of Methane Composition Catalytic Gasification in the Absence of Methane in a Fixed-Bed Reactor In the absence of methane, biomass gasification yields in a fixed-bed reactor were, on average, 55 mole % and 58 mole % methane for the reactions at 850° C. and 950° C., respectively (FIG. 5). A H$_2$:CO ratio between 0.5 and 1.0 was obtained, which was roughly in the range of conventional non-catalytic gasification. However, with almost 55-60% methane in the gas yield, as well as a very low CO$_2$ yield of 2-13%, the results suggested that the reverse steam methane reformation (Equation 2) was dominant at high temperature, since both of these reactions are endothermic. Reverse SMR leading to conversion of hydrogen and carbon monoxide into methane could be due to the presence of acidic active sites on Fe and Mo metals. In the case of biomass gasification on ZSM-5, the methane was 29 mole %, which is more than 3× the level seen in typical non-catalytic biomass gasification. This high methane yield was attributed to the thermal cracking of the aromatic array of the biomass. Moreover, in the absence of an acidic oxophilic transition metal like Fe or Mo, the oxygenated carbon in the biomass was converted to CO, CO$_2$, and H$_2$, which reacted on the surface. Also, without additional methane in the gas feed, the surface was deficient in methane, a condition favoring the formation of methane and water vapor as the adsorbed CO and H$_2$ underwent reverse SMR at high temperature.

These results suggest a synergy between methane and biomass that shifted the SMR equilibrium, forming hydrogen-rich syngas. Without an external methane feed, typical gasification reactions only yield about a 1:1 H$_2$:CO ratio as this is the molar ratio of the component elements in biomass.

Synergistic Methane-Activated Biomass Gasification

Figure 8:
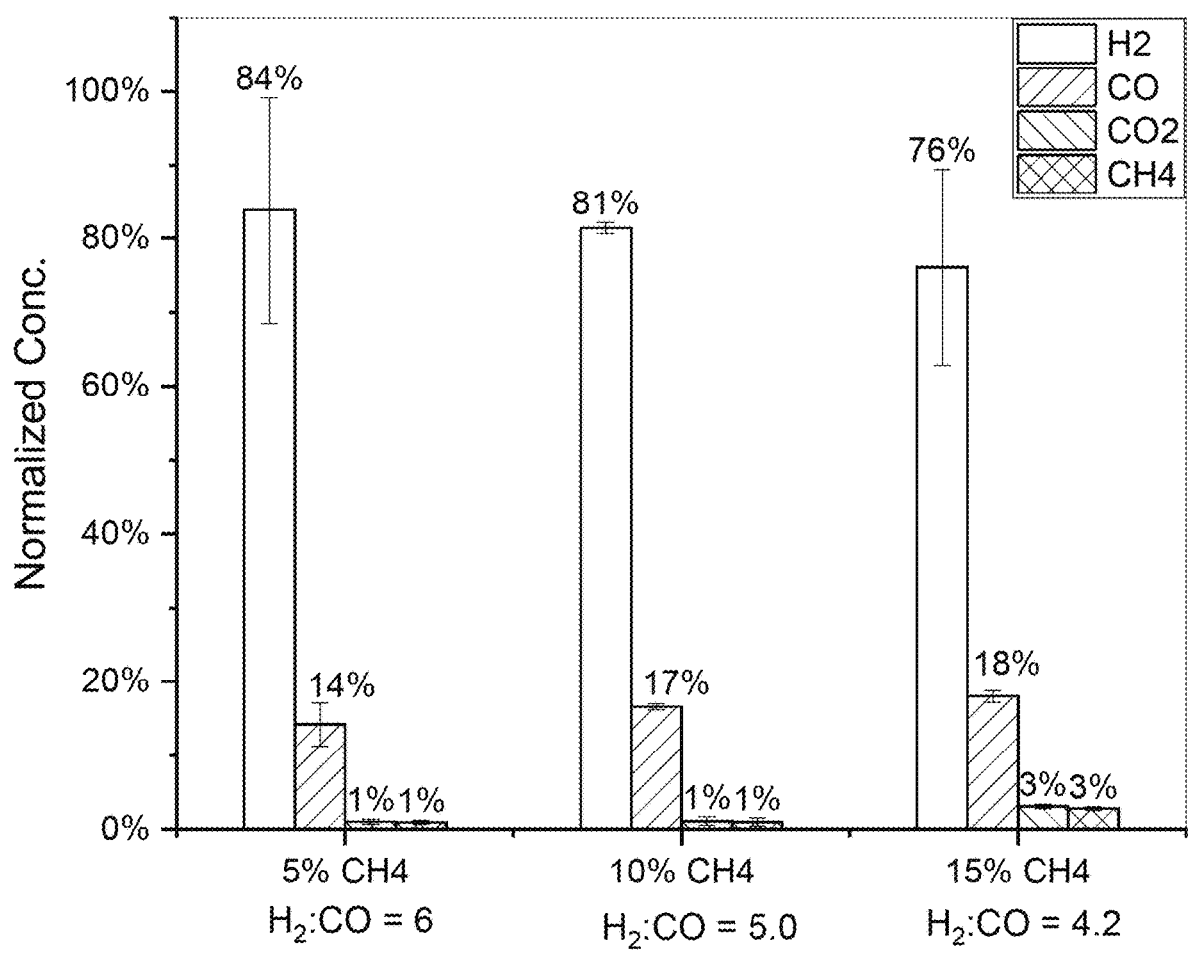
FIG. 8 shows representative methane-activated biomass gasification at 850° C. for methane concentrations of 5, 10, or 15 mol % using a Mo—Fe catalyst (identified herein as FeMo1) using a disclosed process.
Figure 9:
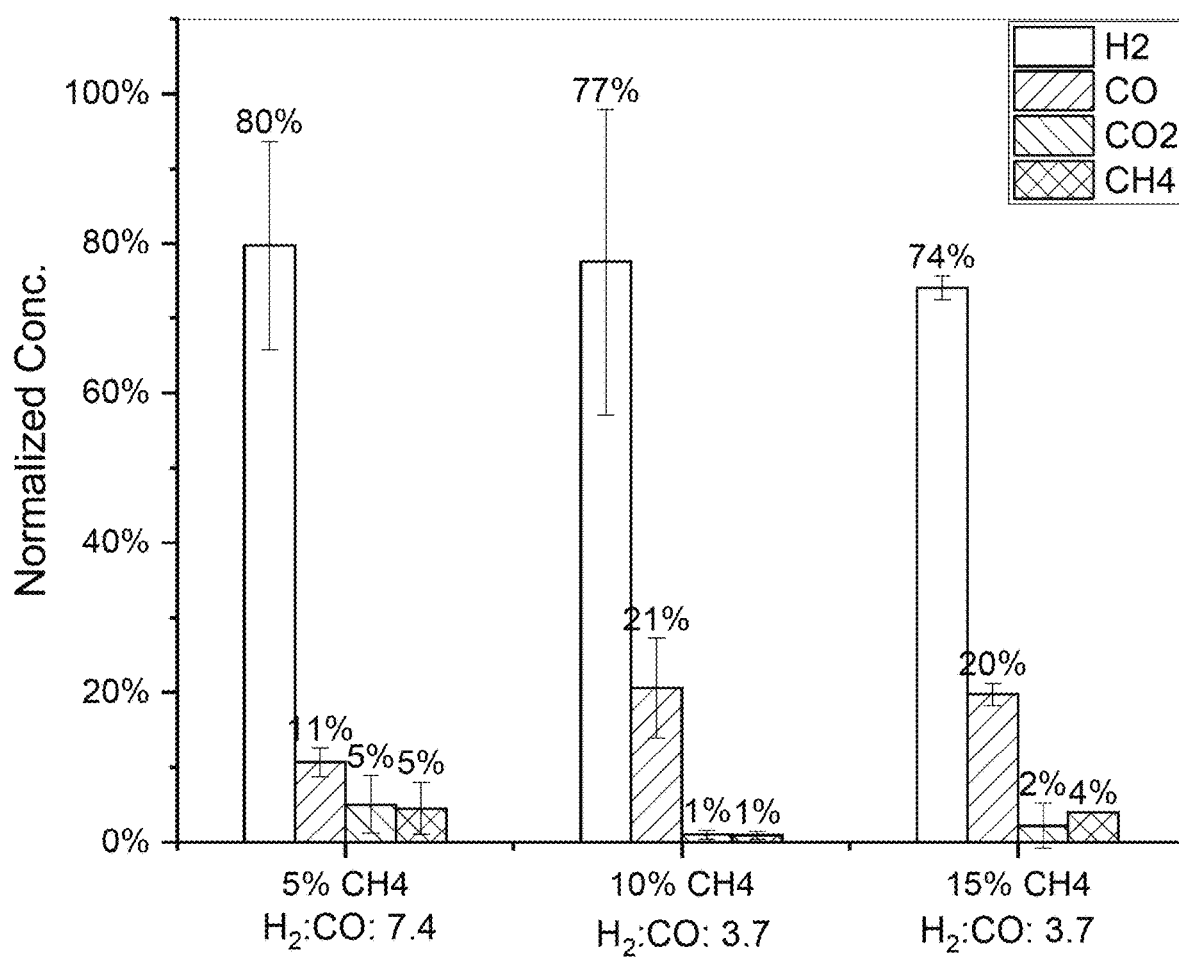
FIG. 9 shows representative methane-activated biomass gasification at 950° C. for methane concentrations of 5, 10, or 15 mol % using a Mo—Fe catalyst (identified herein as FeMo1) using a disclosed process.

Synergistic gasification of hardwood biomass with methane was studied in the fixed-bed reactor using FeMo1 and FeMo2 catalysts with methane concentrations ranging from 5 to 15 mole %. FIGS. 8 and 9 show the concentration of typical syngas components obtained from methane activated biomass gasification. Hydrogen was the dominant species in the product gas with hydrogen to carbon monoxide (H$_2$:CO) ratios as high as 7.5 when the reaction was performed at 950° C. under a 5% CH$_4$ concentration in the gas feed; the remaining 95% of the feed for these experiments was carrier gas N$_2$. As the methane concentration was further increased to 10% and 15%, the H$_2$:CO ratio dropped sharply at 950° C. to 3.8 and 3.7, respectively. For the same reaction performed at 850° C. for 5%, 10%, and 15% CH$_4$ in the feed, H$_2$:CO drops steadily from 6 to 4.2. In the absence of a catalyst, typical hardwood biomass gasification produced a H$_2$:CO ratio of 0.3 to 0.5.

Figure 6:
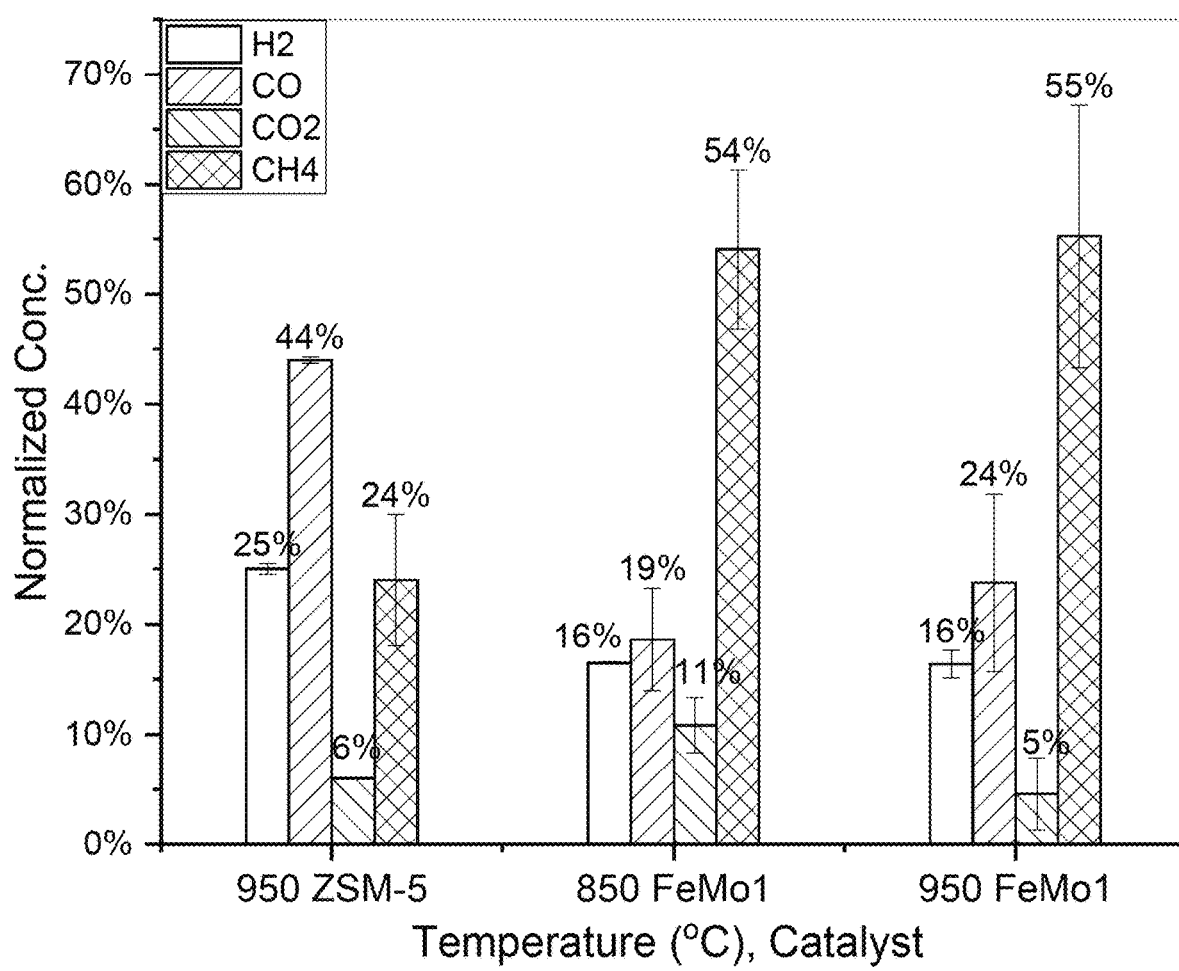
FIG. 6 shows representative biomass gasification in the absence of methane operated in a fixed-bed reactor with either ZSM-5 support or a Mo—Fe/ZSM-5 catalyst. Horizontal axis values are temperature (e.g., 850, 950) in ° C. and a catalyst identifier (e.g., ZSM-5, FeMo1) using a disclosed process.

The same gasification reaction when performed under identical conditions on the same catalyst without methane in the gas feed showed contrasting results. As high as 70 mole % methane was seen in the product gas mixture with H$_2$ yield averaging at 17% at 850° C. and 950° C. CO and CO$_2$ yield averaged 19% and 11%, respectively, for 850° C. as seen in FIG. 6. At 950° C., CO yield increased to 25% and CO$_2$ decreased to 4%. However, average methane yield was more than 50% of the total moles obtained in the product gas at both 850° C. and 950° C. Hydrogen mole % in biomass that was used for the study was almost equal to the mole % of carbon (ref. FIG. 6). Biomass gasification typically yields H$_2$:CO at less than or close to 1. The synergy between methane and biomass reacting together on an active catalyst like FeMo/ZSM-5 was apparent from the multifold increase in the hydrogen yield.

The presence of methane in the gas feed suggested an equilibrium shift in some of the typical gasification reactions with steam methane reforming possibly occurring on the active sites of Mo and Fe. Both molybdenum (Mo) and iron (Fe) are known to be moderately oxophilic, having higher binding affinities to oxygen than Zn, Ni, and Cu but lower oxygen binding affinities than Ti, V, and Sc. Mo is slightly more oxophilic than Fe (0.6 and 0.4), thus giving it the capability to activate the C—OH and C=O bonds abundantly present in the complex array of aromatics in lignin component of the hardwood biomass.

Effect of Lignin Structure and Temperature on Methane-Driven Biomass Gasification The loosely-bonded oxygen and hydroxyl groups from lignin on the surface of hardwood pellets potentially react with the hydrogen obtained from devolatilization gases of biomass to produce $H_2O$ adsorbates at active sites of Mo and Fe. Methane in the feed reacts with the $H_2O$ adsorbates on the surface sites undergoing high-temperature steam methane reforming to produce hydrogen and carbon monoxide. Without wishing to be bound by theory, $H_2O$ adosrbates would then evolve by selective adsorption of lignocellulosic oxygenates like alcohols, phenols, furfurals, ethers, and acids. High temperature thermal cracking of lignoceullosic components to single chain phenols, furfurals, and alcohols allows for passage through microporous ZSM-5 channels and selective adsorption of iron and molybdenum active sites in the ZSM-5 framework. The presence of Fe and Mo in metallic form on acidic ZSM-5 helps shift the SMR reaction forward, thus producing more $H_2$ and CO. Reverse SMR is one of the main reactions occurring in biomass gasification reaction chemistry. Although reverse SMR is a highly exothermic reaction with $\Delta H_{rxn, 298K}$ of $-206$ kJ/mol, in the presence of methane in a gas feed, reaction equilibrium seems to shift to forming hydrogen and carbon monoxide. This likely scenario explains the more than 85% yield of hydrogen in the gas feed with a very high $H_2$:CO ratio of 7.5 in one experiment.

Figure 10:
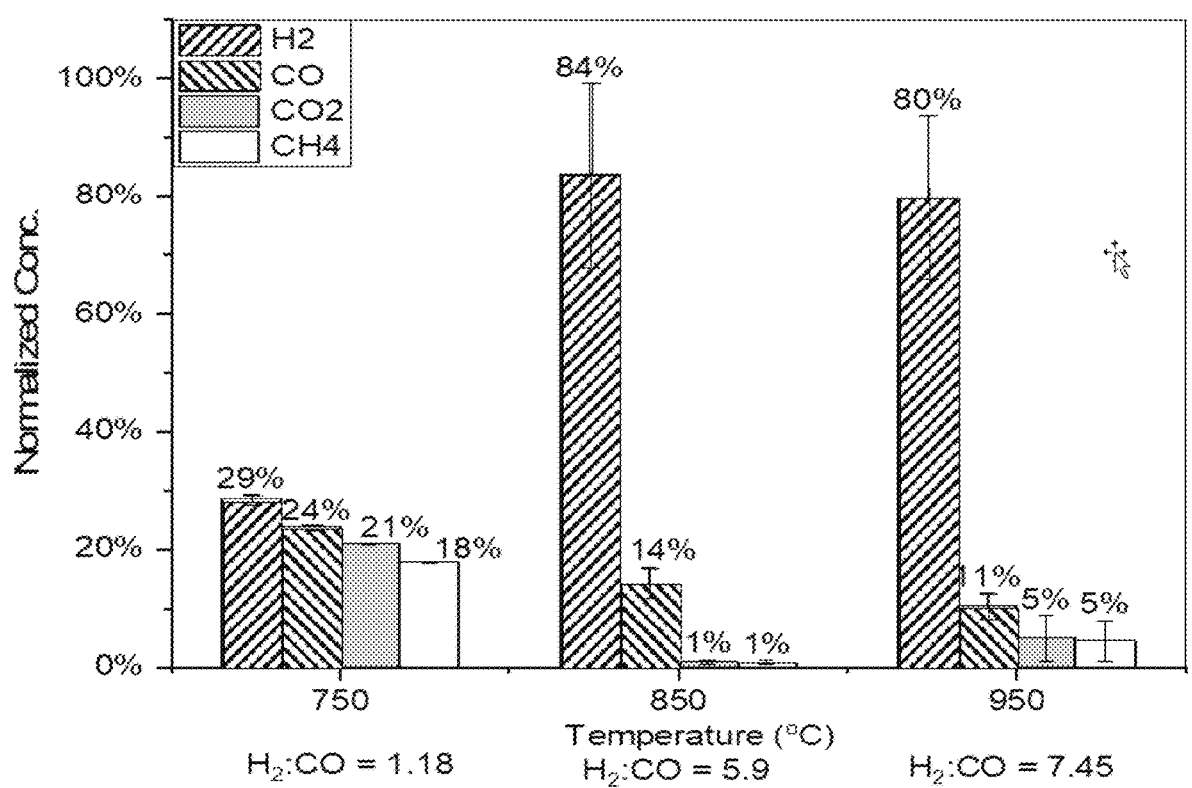
FIG. 10 shows representative methane-activated (5 vol %) biomass gasification at 750, 850, and 950° C. using a FeMo1 catalyst using a disclosed process.
Figure 11:
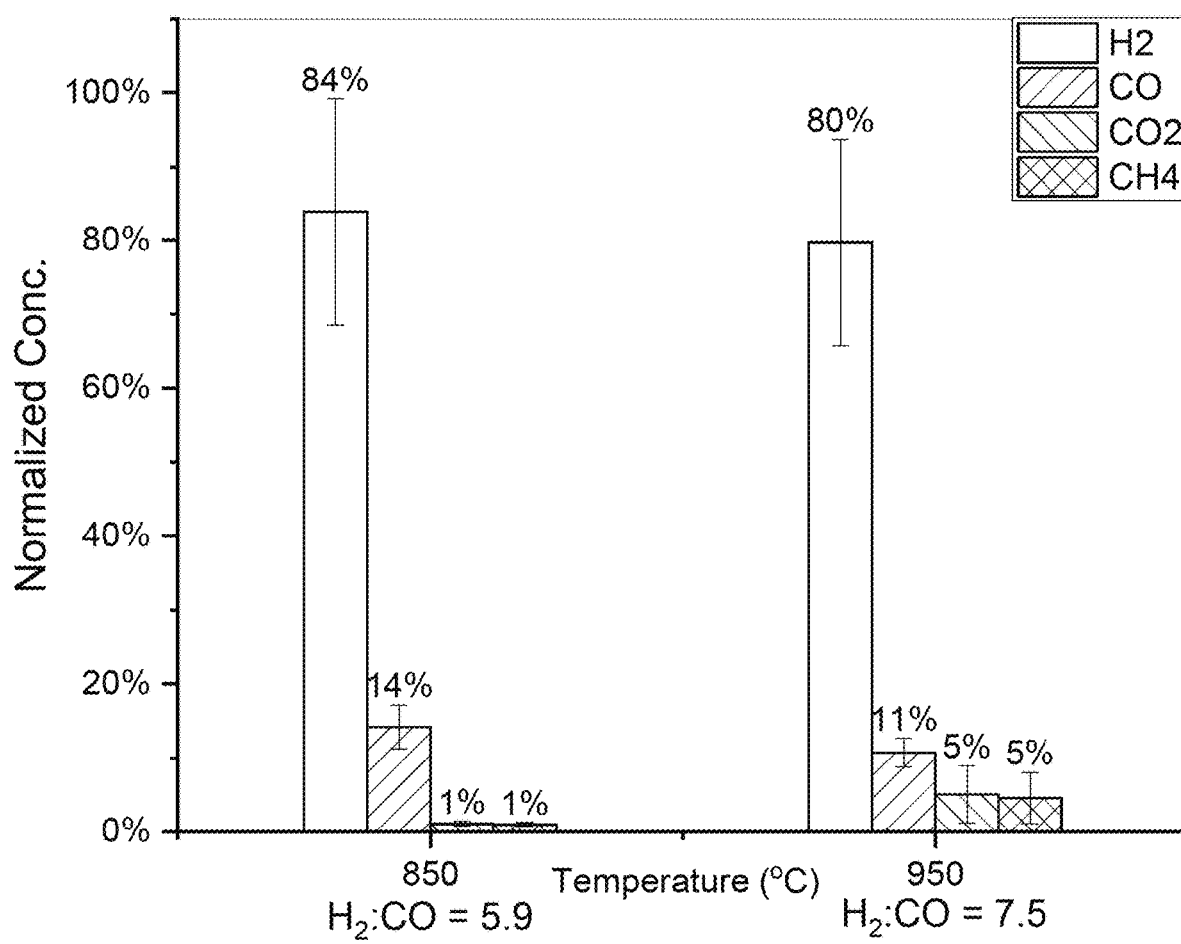
FIG. 11 shows representative methane-activated (10 vol %) biomass gasification at 750, 850, and 950° C. using a FeMo1 catalyst using a disclosed process.

The effect of temperature and methane concentration on biomass gasification was compared at 750° C., 850° C. and 950° C. in the presence of 5 mole % $CH_4$. As seen in FIG. 10, methane-activated biomass gasification reaction produces an $H_2$:CO ratio of 1.18, which is higher than that obtained from fixed-bed biomass gasification, but which is still not suitable for hydrogen-rich syngas production. Product gas compositions obtained from methane-activated biomass gasification reactions at 850° C. and 950° C. with 10 vol % $CH_4$ in gas feed on FeMo1 catalyst are shown in FIG. 11. As seen in FIG. 10, $H_2$:CO ratio drops sharply when the methane concentration is increased to 10 mole % at 950° C., whereas the decrease in $H_2$:CO ratio is not as steep at 850° C. The decrease in $H_2$:CO from 7.4 at 950° C. to 3.7 when methane concentration was increased from 5 vol % to 15 vol % may be due to partial catalyst deactivation and reaction kinetics. Fe—Mo/ZSM-5 catalyst has a tendency to form carbon nanotubes due to carbon deposition. It appears from the $H_2$:CO trend that optimum methane concentration in the gas feed gives hydrogen-rich syngas. When excess methane is available in the reaction atmosphere, high temperature methane decomposition leads to coke deposition on the catalyst. However, it is important to note that catalysts subjected to higher methane concentrations are not completely deactivated since the $H_2$:CO ranges from 3.7 to 5 for 10-15 vol % $CH_4$ at 850° C. and 950° C. Without catalyst and without methane in the gas feed, the $H_2$:CO ratio reached a maximum of 0.9 which is typical for biomass gasification. Another possible reason for the decrease in $H_2$:CO are the adverse effects of high gas feed methane concentrations on other hydrogen producing reactions, including the water-gas shift. This may be possibly due to gradual increase in Fe:O ratio at the mineral-Fe interface when the temperature increases from 700° C. to 950° C., leading to the loss of active sites on the surface and consequently to a decrease in hydrogen production and a slight increase in carbon monoxide production.

Standard deviation and 95% confidence interval for biomass gasification without methane and methane activated biomass gasification are shown in Table 5 below.

TABLE 5

Statistical Analysis for Product Composition of Syngas Components

| Temperature (° C.) | $CH_4$ Gas Feed Concentration (Vol %) | Syngas Species | Average Yield | Standard Deviation | Confidence Interval |
|---|---|---|---|---|---|
| 850 | 0 | $H_2$ | 16.47 | 0.11 | ±0.15 |
| | | CO | 18.63 | 4.64 | ±6.43 |
| | | $CO_2$ | 10.81 | 2.51 | ±3.48 |
| | | $CH_4$ | 54.09 | 7.26 | ±10.06 |
| | 5 | $H_2$ | 72.64 | 15.33 | ±21.2 |
| | | CO | 12.29 | 2.96 | ±4.1 |
| | | $CO_2$ | 0.90 | 0.32 | ±0.45 |
| | | $CH_4$ | 0.81 | 0.29 | ±0.4 |
| | 10 | $H_2$ | 81.58 | 0.78 | ±0.88 |
| | | CO | 16.42 | 0.44 | ±0.49 |
| | | $CO_2$ | 1.05 | 0.61 | ±0.69 |
| | | $CH_4$ | 0.94 | 0.55 | ±0.62 |
| | 15 | $H_2$ | 68.26 | 13.28 | ±18.41 |
| | | CO | 16.14 | 0.79 | ±1.10 |
| | | $CO_2$ | 2.77 | 0.29 | ±0.40 |
| | | $CH_4$ | 2.49 | 0.26 | ±0.36 |
| 950 | 0 | $H_2$ | 16.35 | 1.26 | ±1.43 |
| | | CO | 23.78 | 8.11 | ±9.17 |
| | | $CO_2$ | 4.60 | 3.29 | ±3.73 |
| | | $CH_4$ | 55.27 | 11.93 | ±13.50 |
| | 5 | $H_2$ | 74.90 | 13.98 | ±19.37 |
| | | CO | 10.04 | 1.94 | ±2.69 |
| | | $CO_2$ | 4.73 | 3.86 | ±5.35 |
| | | $CH_4$ | 4.26 | 3.48 | ±4.82 |
| | 10 | $H_2$ | 63.30 | 20.41 | ±28.29 |
| | | CO | 16.83 | 6.64 | ±9.21 |
| | | $CO_2$ | 0.82 | 0.61 | ±0.85 |
| | | $CH_4$ | 0.74 | 0.55 | ±0.76 |
| | 15 | $H_2$ | 70.84 | 1.57 | ±2.18 |
| | | CO | 18.93 | 1.45 | ±2.00 |
| | | $CO_2$ | 2.13 | 3.01 | ±4.17 |
| | | $CH_4$ | 3.83 | 0.00 | 0 |

Example 6: Addition of Carbon Dioxide to Reactor Gas Feed

As discussed previously, methane-activated biomass gasification produces hydrogen rich gas and thus has direct application as a potential hydrogen source. With the addition of 1 vol % $CO_2$ in the methane-biomass synergistic reaction environment, synthesis gas can be produced with an $H_2$:CO ratio of between 1.5 and 2.4. It was observed that an $H_2$:CO ratio of ~2 was obtained at 850° C. and 950° C. with both zeolite and carbon nanofiber support. An observed decrease in hydrogen production and balanced syngas composition was probably the result of in situ bi-reforming in a single stage reactor.

The addition of small amount of carbon dioxide helped consume excess $H_2$ produced via synergistic steam methane reforming. In the presence of hydrogen adsorbates and atomic hydrogen on neighboring catalyst sites, carbon dioxide undergoes thermal activation to form formates which convert primarily to carbon monoxide (CO). This phenomenon is also termed as dry reforming. Note that CO concentration only marginally increased from 14.2% for methane-biomass reaction to 16.3% for the methane-carbon dioxide-biomass reaction. Carbon dioxide conversion to carbon monoxide through dry reforming roughly consumes 2 hydrogen atoms adsorbed from neighboring sites while producing only 1 atomic hydrogen adsorbate. Furthermore, zeolite support produces lower gas yields, in general, compared to the carbon nanofiber catalyst supports.

Looking closely at the product gas composition, methane composition seems to be low compared to carbon dioxide concentration, given that the methane feed was 5 vol % versus 1 vol % carbon dioxide. This indicates that water gas shift reaction (WGS) may be occurring independently of $CO_2$ dry reforming on some of the unoccupied Fe active sites. Although SMR-driven $CO_2$ dry reforming consumes hydrogen, the water gas shift reaction may form some hydrogen and consume CO thus keeping the $H_2$:CO ratio around 2. Adding more carbon dioxide to the gas feed may hinder the WGS and SMR reactions by inertly occupying most of the catalyst active sites, leading to a decreased $H_2$:CO ratio or to increased carbon dioxide concentration in the product gas thus defeating the purpose of carbon dioxide addition altogether.

In a typical experiment, 5× less carbon dioxide than methane was used in the gas feed in order to strategically consume only part of the excess hydrogen to produce synthesis gas ($H_2$:CO~2), since this is otherwise difficult to obtain from biomass. The complex series of reactions occurring on Fe—Mo active sites at high temperature produce nearly ideal syngas. FIG. 14 shows a comparison plot of biomass gasification composition obtained by methane activation versus methane-carbon dioxide activation at 850° C. (The catalyst used in this study was 0.5% Fe-4% Mo/ZSM-5.

Effect of Temperature on Methane-$CO_2$ Activated Biomass Gasification

Reaction temperature has a profound effect on syngas composition, especially on the $H_2$:CO ratio obtained by methane-carbon dioxide activated biomass gasification. The $H_2$:CO ratio increased from 0.96 at 750° C. to 2 at 900° C. There is no significant difference between the $H_2$:CO ratios at 850° C. and 900° C. At 750° C., the gas yield from methane-carbon dioxide activated biomass gasification is only 37.5%, while liquid yield, which can be categorized as tar, was 54 mmol. Tar was collected in a condenser after the reaction, weight was measured, and carbon balance calculations were performed in order to obtain tar yield. Thus, most of the biomass present in the reactor before the start of the temperature ramp was converted to tar at this temperature. At 850° C., the gas yield increased substantially from 37.5 mol % to 88 mol % and moles of liquid decreased from 54 mmol to 10 mmol.

Figure 18:
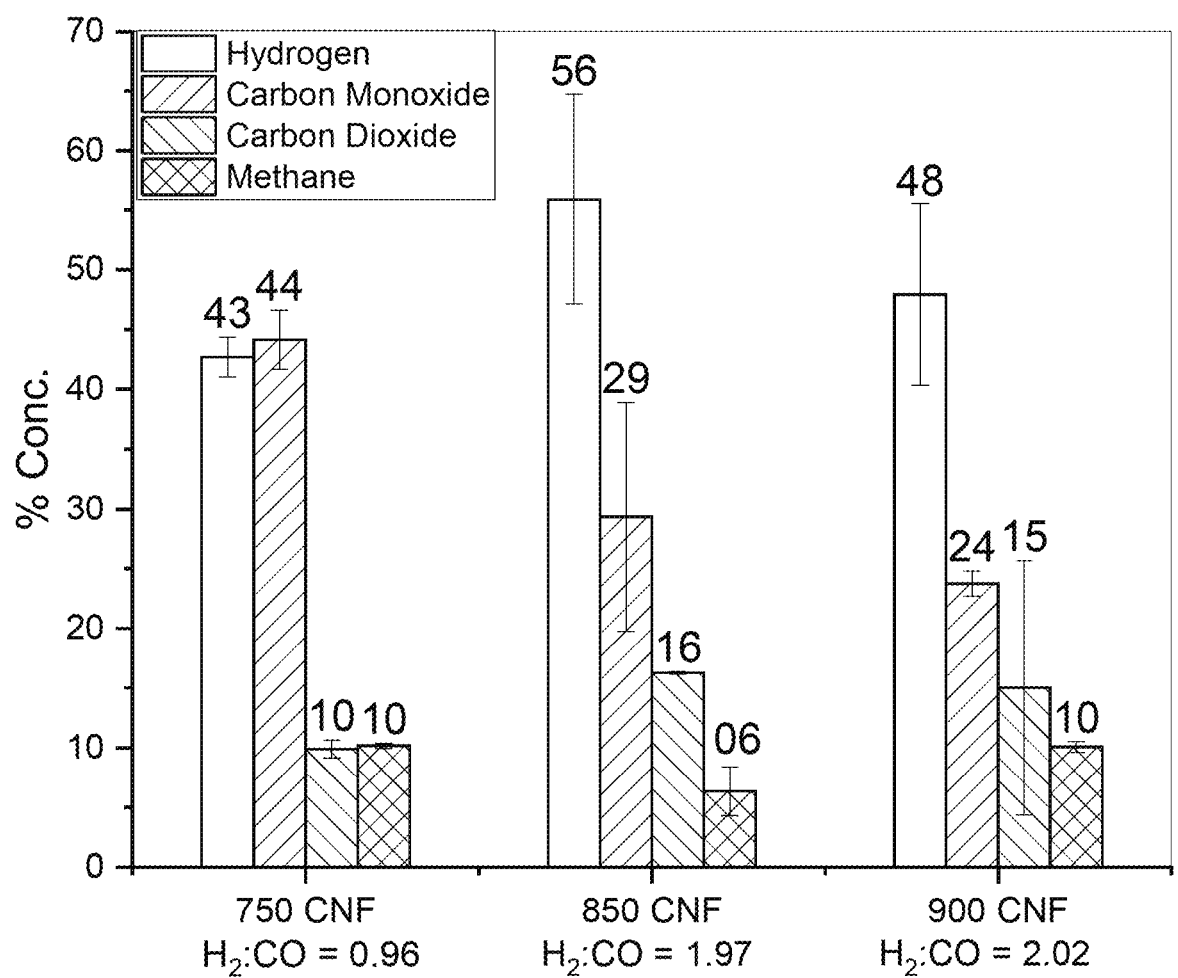
FIG. 18 shows representative data comparing syngas composition and $H_2/CO$ ratio at 750, 850, and 900° C. with gas feed composition as follows: $CH_4$=10 sccm, $CO_2$=2 sccm, $N_2$=188 sccm, and catalyst 0.5% Fe-4% Mo/CNF using a disclosed process.
Figure 19A:
FIGS. 19A-19B shows representative SEM images of FeMo catalysts on CNF.
Figure 19B:
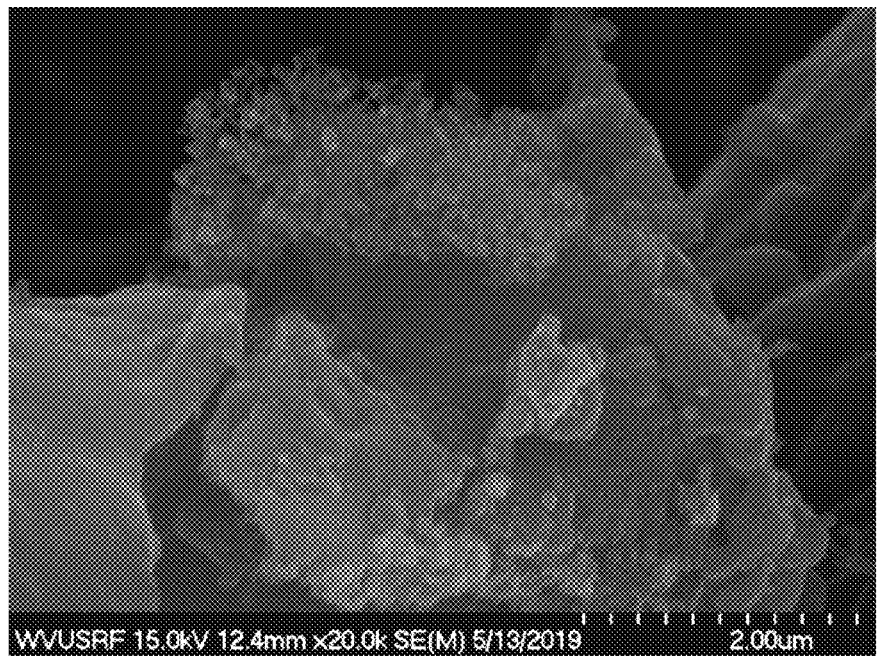

When the temperature was further increased to 900° C., gas yield increased to 98.5% while the liquid yield decreased to 2 mmol. Temperature thus has a significant effect on the gas and tar yield and higher temperature generally gives >90% gas yield. However, if the reaction temperature is above 850° C., the reaction kinetics do not change significantly with temperature. This is evident since similar $H_2$:CO ratios are obtained at 850° C. and 900° C. as shown in FIG. 18 (1.97 and 2.02, respectively). Unexpectedly, for several tests conducted on both FeMo-ZSM-5 and FeMo-CNF catalysts, the $H_2$:CO ratio was low, at around 1.4 to 1.8. This shows that increasing the temperature beyond 850° C. can have a detrimental effect on the activity of catalysts. High temperature generally leads to rapid sintering in a ZSM-5 based catalyst, although not as much on the CNF catalyst. Higher temperatures also lead to cracking of high molecular weight compounds (i.e., liquid tar), thus causing ash and coke deposition. Although the coke and ash deposition is generally low on the CNF catalyst, it could be observed SEM image of CNF catalyst after 3 rounds of use. It is likely that coke deposition also caused blocking of active sites for CNF-based catalysts. The coke deposition phenomenon on the FeMo-CNF catalyst subjected to three rounds of the 900° C. methane-carbon dioxide-biomass reaction is shown in FIG. 19. FIG. 19A shows the CNF catalyst at 10 μm and FIG. 19B shows a closer view (2 μm) of the same area. Probable coke deposition occurs on an original metal site. The shape of the coke deposition may represent carbon nanotube deposition. It was observed in a previous study on methane activated biomass gasification that coke deposition increased with temperature from 850° C. to 950° C. while the $H_2$:CO ratio only slightly increased from 6 to 7. Without wishing to be bound by theory, high temperature is better from a thermodynamic standpoint since both $CO_2$ reforming and steam methane reforming are endothermic reactions.

Thermodynamics is a dominant factor when reaction temperature is less than 800° C. as can be seen in FIG. 18 for the reaction at 750° C. The best results in terms of $H_2$:CO ratio, gas yield, and minimizing tar formation were obtained at reaction temperatures of 850° C. and above. However, the trade-off between higher gas yield and catalyst deactivation is the deciding factor for the reaction temperature. Given coke deposition over multiple reaction runs on the CNF catalyst, 850° C. was chosen as the optimum temperature for methane-carbon dioxide-biomass reaction to obtain syngas with an $H_2$:CO ratio of 2.

Example 7: Reactor Configurations

Biomass Versus Coal Gasification

Biomass gasification was conducted in a fixed-bed reactor at 900° C. and compared to coal gasification in a bubbling fluidized bed reactor at 900° C. (FIG. 5). In general, $H_2$:CO ratio was higher for coal gasification, at 3.23, and results for biomass in a fixed bed reactor were somewhat inconsistent although generally having lower $H_2$:CO ratios (0.35 and 0.91), reflecting a need for process optimization. Other Examples provided herein vary reactor type, catalyst, catalyst support, feed gases, and the like to improve yield of desired gases as well as reproducibility.

Biomass Gasification Using Different Reactor Configurations

Figure 21A:
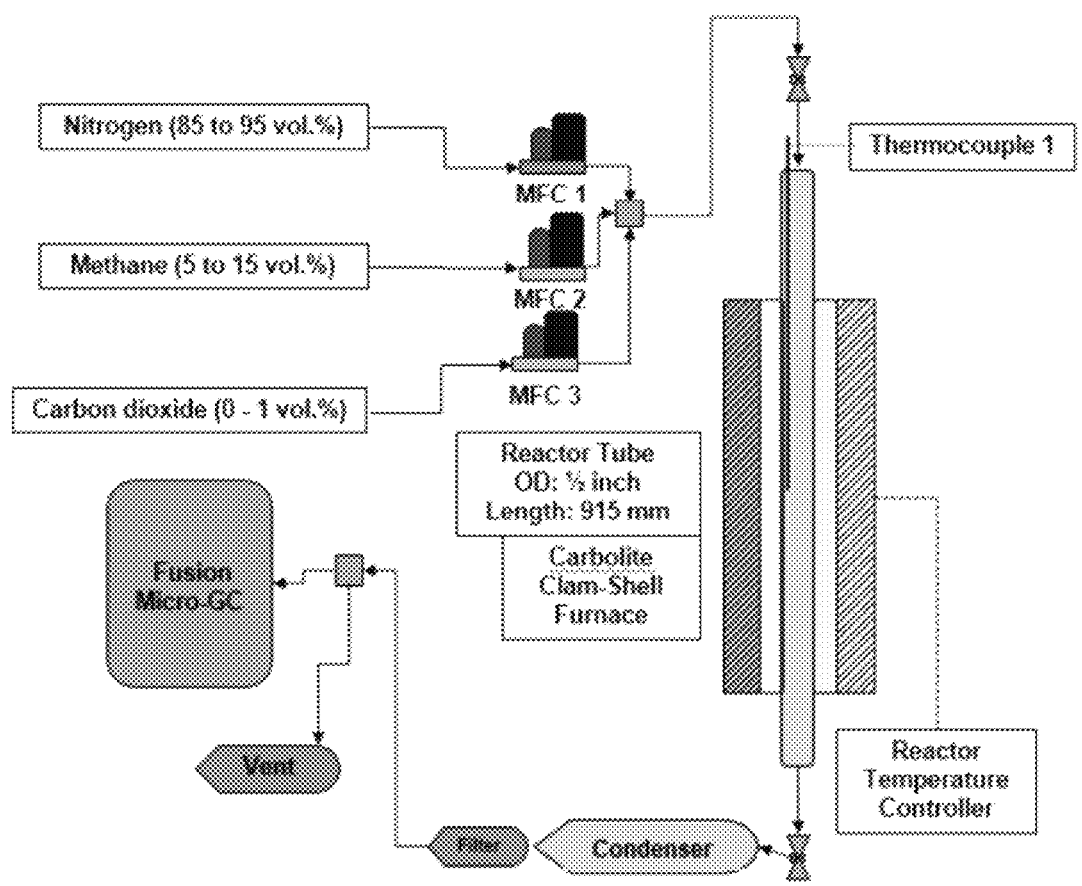
FIGS. 21A-21B shows a schematic of a disclosed reactor configuration useful in the methods and processes disclosed herein.
Figure 21B:
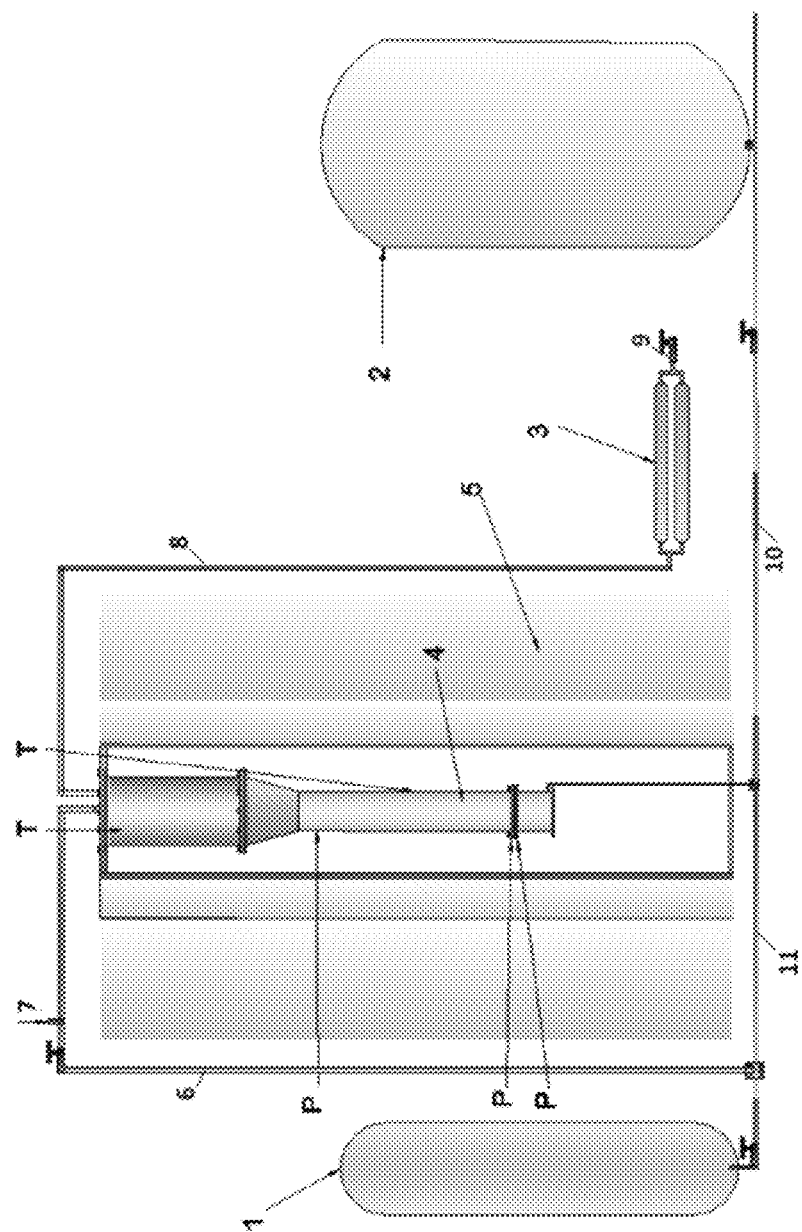

FIG. 21 shows several different reactors useful for conducting the processes disclosed herein at a commercial scale. FIG. 21A shows a fixed-bed reactor configuration and FIG. 21B shows a bubbling fluidized bed reactor configuration. A comparison of the same reaction run in a fixed bed reactor and a bubbling fluidized bed reactor is shown in FIG. 26 (biomass gasification only; see first and second sets of lines). For reactions with no added methane or carbon dioxide in the feed gas, hydrogen yield is higher compared to carbon monoxide than with a fixed bed reactor ($H_2$:CO ratios of 0.91 and 0.35, respectively), while carbon dioxide and methane yields are lower.

Example 8: Side Products Including Tar, Char, and Coke

Coke Deposition on Catalyst

When using 0.5% and 1.5% Fe-promoted Mo/ZSM-5 surfaces, coke formation was observed during co-feeding of biomass and methane. However, biomass gasification in the absence of methane, coking was not observed on either catalyst. This indicates that some of the methane in the gas feed is decomposed at high temperatures to form coke and produce hydrogen due to the presence of Fe active sites on ZSM-5. A stoichiometric amount of hydrogen formed from methane decomposition was accounted for based on coke formed from methane decomposition. The calculation for hydrogen obtained from biomass-methane synergy was calculated in mole % as follows:

$$H_{2(prod)} = H_{2(total)} - H_{2(coke)} \quad \text{Equation 5}$$

$H_2$:CO ratios obtained for various concentrations of methane and reaction temperatures were calculated after accounting for hydrogen obtained possibly from methane decomposition. Very little or no tar was recovered from the gas-liquid separator at the bottom of the vertical tubular reactor. However, small concentrations of ethane, ethylene, and acetylene were seen in the product analysis on the micro-GC. FIG. 23 shows coke deposition on agglomerated ZSM-5 crystals at 5 μm (FIG. 23A) and 30 μm (FIG. 23B).

Gas, Tar, and Char Formation

Overall carbon balance for the methane activated biomass gasification was determined starting with inert gas and methane moles prior to the temperature ramp, as well as molar volume occupied by the gas inside the tubular fixed bed reactor based on reaction temperature and pressure. All of the biomass carbon was recovered using TGA studies of spent catalyst for coke and char characterization. The amount of condensed tar was estimated using a hexane solvent wash of the reactor tube and condenser. Mole % and yields of individual products were calculated based on gas moles obtained in the product. Coke deposition occurred on the catalyst and hydrogen from methane decomposition was not considered to be hydrogen produced from methane-biomass synergy. Yield was calculated as follows:

Yield (mole %) = number of moles of species/total product gas moles   Equation 6

Figure 7:
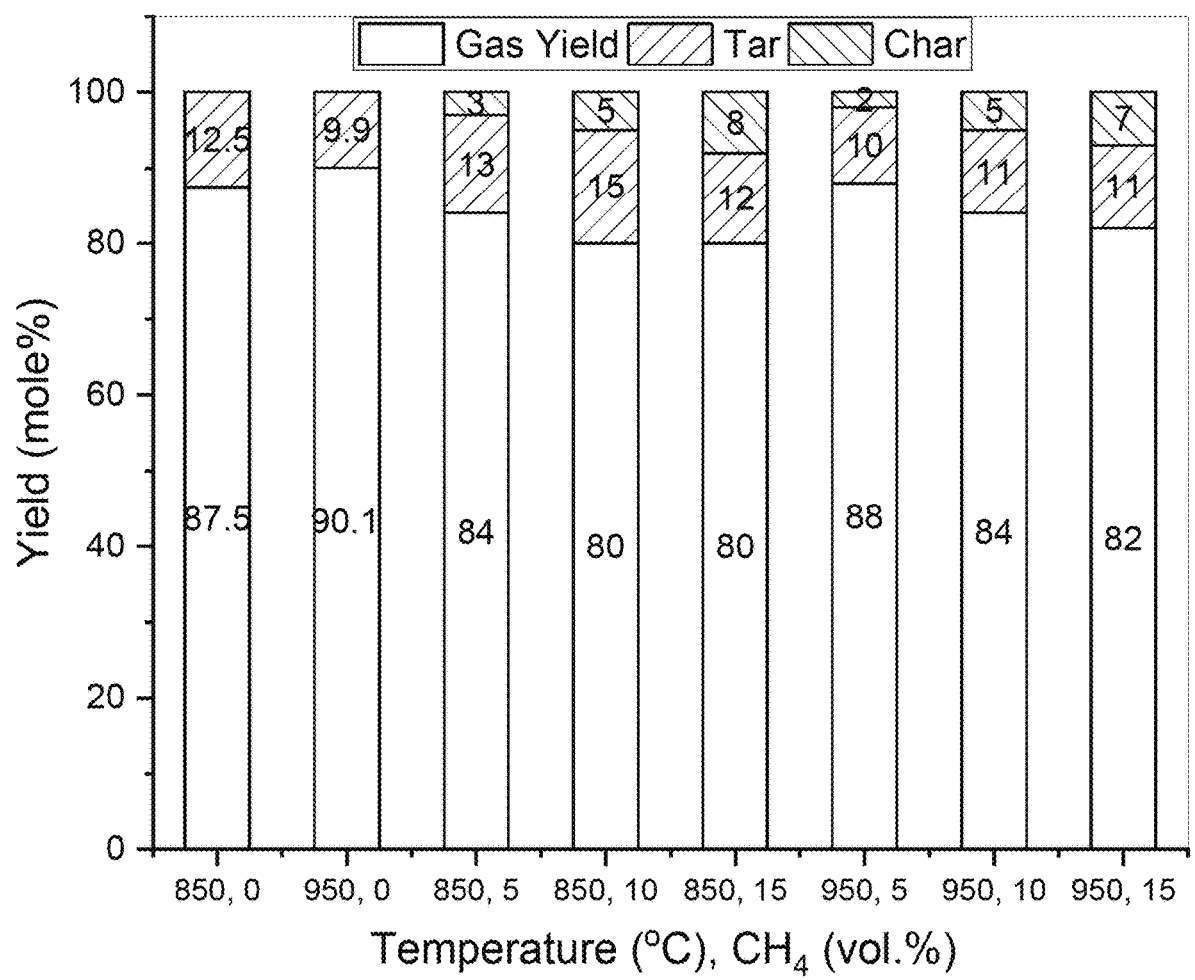
FIG. 7 shows representative gas, tar, and char yields obtained via biomass gasification with and without methane using a disclosed method as described herein. Horizontal axis values are temperature (e.g., 850, 950) in ° C. and a methane gas feed concentration (e.g., 0, 5, 10, 15 vol %) using a disclosed process.

It was also observed that normalized product gas composition and mole % calculated from yield of individual species based on gas moles were similar; these are thus used interchangeably in the discussion that follows. It was observed that all the experimental tests produced greater than or equal to 80 mole % product gas. Tar mole % ranged between 10 to 15% while char was only about 2 to 8 mole %. Product gas yield from methane activated biomass gasification can be termed as biomass conversion obtained through the reaction. Gas yield, tar, and char composition of the biomass carbon balance are presented in FIG. 7. It was observed that product gas yield was 88 mole % for reactions at 950° C. and 84 mole % for reactions at 850° C. It was observed that gas yield substantially increased from 37.5 mole % at 750° C. (not shown) to 84 mole % at 850° C. and further to 88 mole % at 950° C. However, gas yield decreased slightly from 84 mole % to 80 mole % at 850° C. when gas feed methane concentration was increased from 5 to 15 vol %. A similar trend was also observed at 950° C. as gas yield decreased from 88 mole % to 82 mole % when methane concentration was increased from 5 to 15 vol %. A marginal increase in char yield from 3 mole % to 8 mole % at 850° C. and 2 mole % to 7 mole % at 950° C. was also observed when methane concentration was increased from 5 to 15 vol. %. This could be explained by catalyst deactivation possibly occurring due to high methane coverage on Fe and Mo active sites leading to a paucity of sites available for the methane-biomass reaction. Moreover, without methane in the gas feed, biomass conversion was much higher on the FeMo1 catalyst (87.5% at 850° C. and 90% at 950° C.) compared to methane activated biomass gasification tests. However, >80 mole % product gas yield is an indication that low methane concentration leads to high methane yields and biomass conversion since Fe and Mo are conducive to methane activation and biomass hydrodeoxygenation. Gas yield, char, and tar components from in biomass gasification using the FeMo1 catalyst with and without methane activation are presented in Tables 6 and 7, below, and FIG. 7.

TABLE 6

Gas Yield for No-Methane Biomass Gasification

| Temperature (° C.) | Mol % Gas |
|---|---|
| 850 | 87.5 |
| 950 | 90.1 |

TABLE 7

Amount of Coke on Catalyst (mg)

| Temperature (° C.) | CH₄ Gas Feed Concentration (Vol %) | Catalyst FeMo1 | FeMo2 |
|---|---|---|---|
| 850 | 5 | 75.6 | 51.5 |
|  | 10 | 135 | 169.2 |
|  | 15 | 246 | 267.3 |
| 950 | 5 | 68.2 | — |
|  | 10 | 136 | — |
|  | 15 | 204.5 | — |

Coking on the catalyst was between 10-30 wt % of the original weight of catalyst after reduction. Under identical conditions, biomass gasification in the absence of methane in the gas feed yielded almost no recoverable coke on the FeMo1 catalyst. No weight loss was seen in the catalyst before and after calcination. It can be concluded that coke deposition on both FeMo1 and FeMo2 catalysts was due to methane decomposition when 5-15% methane was used in the gas feed. The amount of coke from each test using methane is shown in Table 7. No considerable coke formation on the catalyst was observed for biomass gasification without methane, indicating that the aromatic components of lignin with branched functional groups including carbonyl carbons (C=O) and hydroxyl carbons (C—OH) undergo surface reactions by latching onto ZSM-5 acidic sites. Much of the oxygen from the biomass likely reacted on the surface with the available hydrogen to undergo reverse SMR without external methane (Equation 2).

Example 9: Reaction Mechanism and Kinetics

The following reaction pathways are proposed to illustrate the interactions disclosed herein. Reactant molecules are associatively absorbed on a single metal site (Fe or Mo) for simplification. The Langmuir-Hinshelwood adsorption mechanism is considered in this analysis (see Table 8 below, where * represents an active site). Note that not all listed steps may occur in a given variation of the disclosed process:

TABLE 8

Proposed Reaction Mechanism

| Reaction | Description |
|---|---|
| $CH_{4(g)} + * \underset{k_{-1}}{\overset{k_1}{\rightleftharpoons}} CH_4*$ | Step 1—Methane adsorption on the active site |
| $[R\text{—}C\text{—}OH]_{(g)} + * \underset{k_{-2}}{\overset{k_2}{\rightleftharpoons}} [R\text{—}C\text{—}O*H]$ | Step 2—Selective adsorption of functional group oxygen atom of the lignocellulosic biomass on Fe or Mo |
| $H_{2(g)} + * \underset{k_{-3}}{\overset{k_3}{\rightleftharpoons}} 2H*$ | Step 3—Gas phase hydrogen dissociation on catalyst surface |
| $[R\text{—}C\text{—}O*H] + \frac{1}{2}H_{2(g)} \underset{k_{-4}}{\overset{k_4}{\rightleftharpoons}} [R\text{—}C^+\text{—}O^{-*}H_2]$ | Step 4—Coordination of adsorbed oxygen with $H_2$ present in the gas phase |
| $[R\text{—}C^+\text{—}O^{-*}H_2] \underset{k_{-5}}{\overset{k_5}{\rightleftharpoons}} R' + H_2O*$ | Step 5—$H_2O$ molecule breaks off from the phenolic carbon and forms steam adsorbate |
| $CH_4* + H_2O* + * \xrightarrow{k_6} CHO** + 2H_{2(g)} + H*$ | Step 6—First elementary step of methane reforming with steam adsorbate |
| $CHO** + * \underset{k_{-7}}{\overset{k_7}{\rightleftharpoons}} CO* + H* + *$ | Step 7—Intermediate CHO* converting to CO* and H* adsorbates |
| $[R\text{—}C\text{—}O*H] + H* \underset{k_{-8}}{\overset{k_8}{\rightleftharpoons}} [R\text{—}C^+\text{—}O^{-*}H_2]$ | Step 8—Further phenolic oxygens coordinate with H* atom adsorbate |
| $CO* + H_2O* \xrightarrow{k_9} CO_2* + H_2*$ | Step 9—Water gas shift reaction |
| $CO_2** + H* \underset{k_{-10}}{\overset{k_{10}}{\rightleftharpoons}} COOH** + *$ | Step 10—First step in $CO_2$ reforming of methane |
| $COOH** + H* + 2* \underset{k_{-11}}{\overset{k_{10}}{\rightleftharpoons}} CHO** + OH* + 2*$ | Step 11—Displacement step where hydroxyl group breaks from COOH** to form CHO* using hydrogen from methane |
| $CHO** + 3* \underset{k_{-12}}{\overset{k_{11}}{\rightleftharpoons}} CO** + H* + 2*$ | Step 12—Hydrogen detaches from CHO** |
| $CO** \underset{k_{-13}}{\overset{k_{12}}{\rightleftharpoons}} CO_{(g)} + 2*$ | Step 13—CO** release into gas phase |
| $CO* \underset{k_{-14}}{\overset{k_{13}}{\rightleftharpoons}} CO_{(g)} + *$ | Step 14—CO* desorption |
| $CO_2* \underset{k_{-15}}{\overset{k_{14}}{\rightleftharpoons}} CO_{2(g)} + *$ | Step 15—$CO_2*$ desorption |
| $2H* \underset{k_{-16}}{\overset{k_{15}}{\rightleftharpoons}} H_{2(g)} + *$ | Step 16—H* atom adsorbates combine to form gas phase $H_2$ |
| $H_2* \underset{k_{-17}}{\overset{k_{16}}{\rightleftharpoons}} H_{2(g)} + *$ | Step 17—$H_2*$ desorption |

Figure 22A:
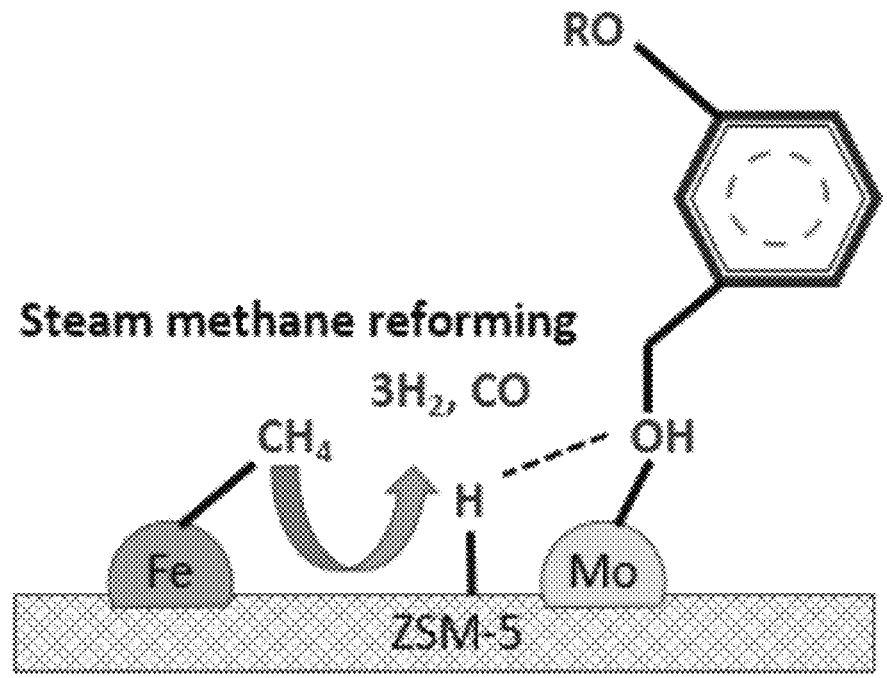
FIGS. 22A-22B shows a schematic of processes disclosed herein.
Figure 22B:
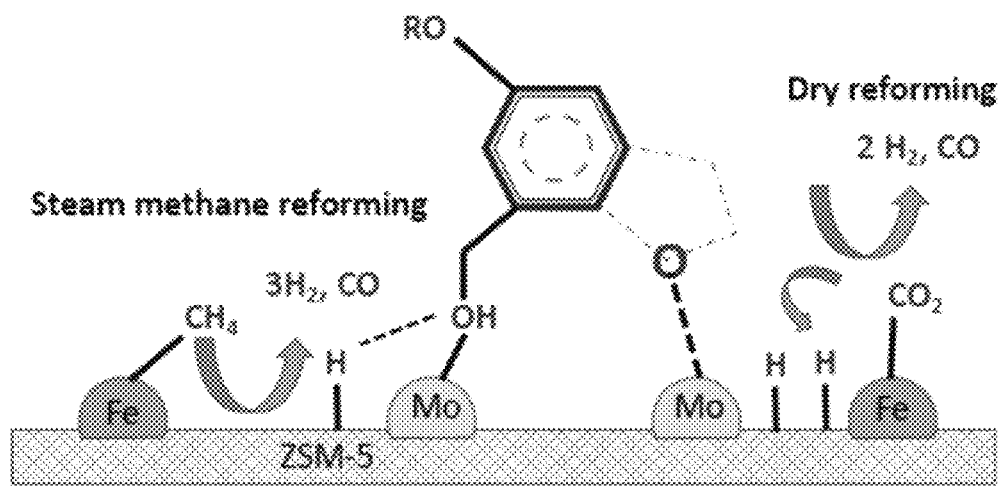

[R—C—OH] is a type of bond that is present in the lignin component of hardwood biomass. C—OH bonds can be activated on either Fe or Mo active sites (see FIG. 22), which interact with the surface and with methane as described above. The common properties of all methane concentrations and iron loadings were a high $H_2$:CO ratio, 1-5 mole % $CO_2$, $CH_4$ yield 50-90% less than conventional biomass gasification, and high hydrogen mole % in the gas yield.

This pathway can explain the major distinction between biomass gasification, methane dissociation, methane SMR, and synergistic methane-biomass gasification. Based on the experimental data, the following assumptions can be made for the above mechanistic model. The rate constant $k_{17} \gg k_{-17}$, which implies that desorption of $H_2$ in gaseous form from the surface is fast step. On the contrary, based on the product composition, it could be argued that the rate constant $k_{-15} \gg k_{15}$ and rate constant $k_{-14} \gg k_{14}$, implying that both $CO_2$ and CO are highly stable on the surface, respectively. This could be due to the oxygen in CO and $CO_2$ binding strongly with oxophilic Fe/Mo metals on the surface. This could also be the reason behind the 50-90% lower yields obtained for CO and $CO_2$. Elementary Step 16 shows two surface hydrogen atoms forming $H_2^*$. Desorption of the surface $H_2$ appears to be relatively easy if the assumption for Elementary Step 16 is true. Among the fast, non-equilibrium reaction steps 6 and 9, the rate of formation of $CHO^*$, $H_2$, and surface adsorbed $H^*$ must be higher than that of $CO_2^*$ and $H_2^*$ formation ($k_6 \gg k_9$), as apparent from the very low $CO_2$ yield. Experimental studies indicate that water gas shift (WGS) does not contribute significantly to the gas yield apparent from low $CO_2$ yield in the gas phase. Surface adsorbed atomic hydrogen ($H^*$) is potentially located near other $H^*$ adsorbates, thus combining to form more hydrogen ($H_2$) in the gas phase. Based on high hydrogen yields in the gas phase, it can be said that $k_{16} \gg k_{-16}$. The remaining Elementary Steps 1, 4, 5, 7, and 9 could all function as the rate limiting steps. However, among these five steps, reactions 4 and 7 are most likely to be the rate limiting steps due to the stability and binding energy of [R—$C^+$—$O^{-*}H$] on the given surface. The mechanistic pathway proposed above for unique SMR reaction explains the high $H_2$ yield (>80 mole %) in the product gas (see also FIG. 22A).

With methane-carbon dioxide activation, reaction mechanism changes, as it involves additional reaction steps including adsorption of carbon dioxide, dry reforming of carbon dioxide with hydrogen (see FIG. 22B), and conversion to carbon monoxide, as well as desorption of carbon dioxide as shown in Table 8. Methane-carbon dioxide activated based biomass gasification involves both steam methane reforming and dry reforming with hydrogen. The rates of forward reaction for both steps must be higher than for the reverse reactions. Reverse SMR and dry reforming are thermodynamically less likely at the given reaction temperatures since they are endothermic in nature. The rate of reaction for further conversion of $COOH^{}$ to $CHO^{}$ can be faster than the reverse reaction since methane-carbon dioxide activated biomass reaction produces higher concentration of CO than the methane-biomass reaction. Similarly, higher CO concentrations compared to $H_2$ in the methane-carbon dioxide-biomass reaction could be due to hydrogenation of complex aromatics and heavy hydrocarbons which generally come out as tar.

This could due to higher turnover frequency for $COOH^{}$ conversion to $CHO^{}$. Without wishing to be bound by theory, the reason behind the drastic reduction in hydrogen to carbon monoxide ratio from 6 to 2 at 850° C. could also be due to slow steam methane reforming. The influence of adding carbon dioxide on steam methane reforming can be understood by qualitative analysis of Fe—Mo active sites on the catalyst. Carbon dioxide likely competes with methane for Fe active, with Mo active sites being largely occupied by oxygen. A gas phase methane and steam adsorbate reaction is unlikely, compared to the reaction of adsorbed methane and steam adsorbate. This could explain why the thermodynamically-challenging carbon dioxide activation is evidently feasible. Small amounts of hydrogen in atomic form produced by steam methane reforming and water gas shift reactions are consumed for dry reforming, thus largely driving the reaction forward. Forward reaction rates of coordination of adsorbed oxygen with gas-phase $H_2$ and phenolic oxygen coordination with $H^*$ atom adsorbates are much higher than the corresponding reverse reactions. This means that oxygen present in the form of alcohols, phenols, carboxylic acids, and carbonyl functional groups in biomass largely occupies the oxophilic Mo active sites. The adsorption of methane on Fe active could be somewhat hindered because carbon dioxide may occupy some Fe active sites that could have otherwise adsorbed methane. Thus, the hydrogen to carbon monoxide ratio in methane-carbon dioxide activated biomass gasification is always close to 2 but less than 2 in some instances.

Example 10: Gasification Using Biomass with Coal and/or Plastic

Materials and Methods

In this example, the gasification was carried out as described herein, with the modifications as specifically noted in the following: gasification was carried at 800° C. for 45 minutes under $N_2$ atmosphere. The Southern Pine was selected as biomass feedstock, the Illinois No. 6 Bituminous Coal was selected as coal feedstock, and the Mixed Waste Plastics feedstock was prepared according Table 4 in FOA 0002376 with arcylic as other plastic. All feedstocks were dried at 100° C. overnight before gasification.

Biomass and Coal Co-Gasification

Biomass and coal with three different biomass loading levels (25%, 50%, and 75%) were selected as feedstocks for exemplary gasification using the methods disclosed herein. FIG. 27 shows the gas composition obtained from the gasification of biomass and coal mixtures at 800° C. The mixture with 50% biomass loading (50B:50C) showed highest syngas concentration of 86% in the product gas, with high $H_2$ and CO concentrations (~33%, 15%). That indicates better hydrodeoxygenation, hydrogenolysis reactions and conversion of cleaved oxygen to CO, $CO_2$ syngas components. 75% biomass loading mixture (75B:25C) showed comparable syngas yield 82%, however, the desired products $H_2$ (~16%) and CO (~9%) concentration were much lower. 25% biomass loading mixture (25B:75C) showed the lowest syngas concentration (73%), with the lowest desired products $H_2$ (~15%) and CO (~7%) concentration. Meanwhile, $H_2$:CO ratio obtained from 50% biomass loading mixture is 2.2, which is higher than that from 50B:50C mixture (1.79) and 25% biomass loading mixture (1.97). Table 9 below shows the overall carbon balance in the form of gas yield, liquid tar, and solids residue along with proportion of unaccounted carbon. The higher biomass loading the higher gas yield and lower solids residue. As the highest desired products $H_2$ and CO production, 50% biomass loading was selected for further co-gasification with waste plastics blend.

TABLE 9

Overall carbon balance calculated for gasification of biomass-coal, biomass-coal-plastics mixture and catalytic gasification of biomass-coal-plastics feed.

| Feedstorck | | Gas yield Amount (g) wt. % dry basis | Liquid tar yield Amount (g) wt. % dry basis | Solid residue (coke/char) Amount (g) wt. % dry basis | Unaccounted carbon Amount (g) wt. % dry basis |
|---|---|---|---|---|---|
| Biomass-Coal(25%-75%) | | 27.5 | 10 | 60 | 2.5 |
| Biomass-Coal(50%-50%) | | 28 | 23.5 | 43.5 | 5 |
| Biomass-Coal(75%-25%) | | 35 | 22.5 | 36 | 6.5 |
| Biomass-Coal-Plastic (50%-37.5%-12.5%) | | 35.6 | 11.1 | 50 | 3.3 |
| Biomass-Coal-Plastic (50%-25%-25%) | | 46 | 10.6 | 40 | 3.5 |
| Biomass-Coal-Plastic (50%-12.5%-37.5%) | | 53.2 | 10.8 | 34 | 2 |
| Catalytic biomass-coal-plastics gasification | | | | | |
| Biomass-Coal-Plastic (50%-12.5%-37.5%) | 0.5% Fe-4% $Mo_2C$—GNS | 62.5 | 10.5 | 24 | 3 |
| | 5% Fe-4% $Mo_2C$—CNF | 68.5 | 10.2 | 19 | 2.3 |
| | FeOOH—$SO_4$ | 75 | 17.5 | 6 | 1.5 |

Biomass/Plastic/Coal Co-Gasification

Per the immediately preceding study above pertaining to biomass-coal gasification, 50% biomass was mixed with a blend of coal and waste plastics in the following ratio: 75/25 coal/plastics (50B-37.5C-12.5P), 50/50 coal/plastics (50B-25C-25P), and 25/75 coal/plastics (50B-12.5C-37.5P). As shown in Table 9, addition of plastics to the biomass-coal mix leads to increase in the gas yield as the amount of plastics increases. Increasing the plastics/coal ratio significantly increases the gas yield from 35% to 53% and the solids residue decreases from 50% to 34%. High coal content in the feed leads to significantly higher solids residue in the form of char and low conversion to syngas. The results also indicate that gasification conversion of coal to syngas is poor without the addition of external gasifying agent such as steam. Interestingly, it can be observed from Table 9 that yield of liquid heavy aromatic compounds remain largely unchanged with variation in coal and plastics composition. Liquid tar yield is only affected by the biomass composition in the feed as observed in the carbon balance of biomass-coal gasification. The gasification composition of biomass-coal-waste plastics, 50B-37.5C-12.5P and 50B-12.5C-37.5P had higher syngas concentration of 76% and 72% and with higher $H_2$ and CO concentrations. Comparative syngas composition and overall carbon balance shown in FIG. 28 and Table 1 clearly indicate that optimum gasification feedstock should have following composition: biomass>plastics>coal. Following feed mixture was thus selected for further catalytic gasification studies: 50% biomass-12.5% coal-37.5 plastics (50B-12.5C-37.5P).

Catalytic Gasification of Biomass/Plastic/Coal

Three catalysts, i.e., 0.5% Fe-4% $Mo_2C$-GNS, 5% Fe-4% $Mo_2C$-CNF, and FeOOH—$SO_4$ were selected for use with an exemplary biomass-coal-plastics mixture (50B-12.5C-37.5P) gasification, with ¾ mass ratio for catalyst/mixture. Graphene supported 0.5% Fe-4% $Mo_2C$-GNS and carbon nanofiber supported 5% Fe-4% $Mo_2C$-CNF catalysts showed excellent activity for biomass gasification and in-situ regeneration capability (see: Lalsare, A. D., et al., Appl. Catal. B: Environ. (2021) 282:119537; 119537, ISSN 0926-3373; https://doi.org/10.1016/j.apcatb.2020.119537). FeOOH—$SO_4$ catalyst showed high activity for coal conversion with moderate yield of oils (see: Pradhan, V. R., et al., Energy & Fuels (1993) 7(4):446-454). FIG. 29 shows the comparative syngas composition and syngas concentration for the catalytic gasification compared with non-catalytic gasification of biomass-coal-plastics mix. Syngas concentration in the product gas increases from 72% to 85-87% with catalytic gasification. However, $CH_4$ and $CO_2$ concentration increased slightly with addition of the catalyst. As shown in Table 9, the gas yield increases substantially with addition of the catalyst to the reacting mixture, and the solid residue decreased, especially over FeOOH—$SO_4$ catalyst. Gas yield increased to 62% with 0.5% Fe-4% $Mo_2C$-GNS catalyst, 69% with 5% Fe-4% $Mo_2C$-CNF catalyst, and 75% with the FeOOH—SO4 catalyst. The liquid tar yield increased to 17.5% with FeOOH—$SO_4$ indicating higher liquefaction of the solid feedstock, and solid residue is only 6%.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method for producing syngas, the method comprising:
    (a) contacting a first reactant with a catalyst;
    (b) placing the first reactant, the catalyst, and a second reactant in a reactor;
    (c) reacting the first reactant and the second reactant at a first temperature for a first period of time to produce a product gas mixture; and
    (d) collecting the product gas mixture;
   wherein the first reactant comprises a source of biomass;
   wherein the catalyst comprises at least one metal atom, metal oxide, or metal ion;
   wherein the second reactant comprises a coal, a plastic, or a combination thereof; and
   wherein the product gas mixture comprises a syngas.

2. The method of claim 1, wherein the biomass comprises a lignocellulosic material.

3. The method of claim 1, wherein the biomass comprises agricultural waste, forestry waste, wood, sawdust, a byproduct of lumber milling, waste material from the manufacture of wood products, a plant grown for energy production purposes, or a combination thereof.

4. The method of claim 1, wherein the biomass comprises from about 45 to about 55 wt % oxygen.

5. The method of claim 1, wherein the metal atom or metal ion comprises iron and molybdenum.

6. The method of claim 1, wherein the catalyst comprises a catalyst support.

7. The method of claim 6, wherein the catalyst support comprises a metal oxide, a zeolite, a carbon product, or a combination thereof.

8. The method of claim 7, wherein the zeolite comprises a ZSM zeolite.

9. The method of claim 7, wherein the carbon product comprises nanoparticles, fullerenes, carbon filaments, single-walled carbon nanotubes, multi-walled carbon nanotubes, carbon nanofibers, graphene-based materials, or a combination thereof.

10. The method of claim 9, wherein the carbon product comprises carbon nanofibers.

11. The method of 6, wherein the metal atom or metal ion comprises iron in an amount of from about 0.1 to about 10 wt % of the total weight of the catalyst and the catalyst support and molybdenum in an amount of from about 0.12 to about 6 wt % of the total weight of the catalyst and catalyst support.

12. The method of claim 11, wherein the metal atom or metal ion comprises iron in an amount of 0.1 wt % to 6 wt % and molybdenum in an amount of 0.5 wt % to 6 wt % of the total weight of the catalyst and catalyst support.

13. The method of claim 11, wherein the metal atom or metal ion comprises iron in an amount of 1.5 wt % and molybdenum in an amount of 4 wt % of the total weight of the catalyst and catalyst support.

14. A method for producing syngas, the method comprising:
(a) placing or continuously feeding a source of biomass in a reactor;
(b) providing a flow of feed gas through the reactor;
(c) reacting the source of biomass and the feed gas at a first temperature for a first period of time to produce a product gas mixture; and
(d) collecting the product gas mixture;
wherein the product gas mixture comprises syngas;
wherein the source of biomass is contacted with a catalyst prior to reacting the source of biomass and the feed gas; and
wherein the catalyst is contacted with a catalyst support.

15. The method of claim 14, wherein the source of biomass comprises a lignocellulosic material.

16. The method of claim 15, wherein the source of biomass comprises agricultural waste, forestry waste, wood, sawdust, a byproduct of lumber milling, waste material from the manufacture of wood products, a plant grown for energy production purposes, or a combination thereof.

17. The method of claim 14, wherein the source of biomass comprises from about 45 to about 55 wt % oxygen.

18. The method of claim 1, wherein the syngas comprises hydrogen, carbon monoxide, carbon dioxide, methane, or a combination thereof.

19. The method of claim 18, wherein the syngas comprises about 80 mole % hydrogen.

20. The method of claim 14, wherein the syngas comprises hydrogen, carbon monoxide, carbon dioxide, methane, or a combination thereof.

* * * * *